US012627324B2

(12) United States Patent
Vaidya et al.

(10) Patent No.: US 12,627,324 B2
(45) Date of Patent: *May 12, 2026

(54) METHODS AND APPARATUS RELATING TO COMMUNICATING AND/OR USING MINIMUM FREQUENCY SEPARATION INFORMATION TO FACILITATE CARRIER AGGREGATION AND/OR DUAL CONNECTIVITY

(71) Applicant: Charter Communications Operating, LLC, St. Louis, MO (US)

(72) Inventors: Maulik Vaidya, Escondido, CA (US); Ahmad Reza Hedayat, Carlsbad, CA (US); Frank Azcuy, Miami, FL (US); Amitav Mukherjee, Elk Grove, CA (US); Marcus Maranhao, Irvine, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/793,935

(22) Filed: Aug. 4, 2024

(65) Prior Publication Data

US 2024/0396581 A1      Nov. 28, 2024

Related U.S. Application Data

(63) Continuation of application No. 17/877,455, filed on Jul. 29, 2022, now Pat. No. 12,057,872.

(51) Int. Cl.
| | |
|---|---|
| *H04B 1/10* | (2006.01) |
| *H04W 72/0453* | (2023.01) |
| *H04W 88/06* | (2009.01) |

(52) U.S. Cl.
CPC .......... *H04B 1/10* (2013.01); *H04W 72/0453* (2013.01); *H04B 2001/1045* (2013.01); *H04B 2001/1054* (2013.01); *H04W 88/06* (2013.01)

(58) Field of Classification Search
CPC .......... H04B 1/06; H04B 1/10; H04B 1/1027; H04B 2001/1045; H04B 2001/1054;
(Continued)

(56) References Cited

U.S. PATENT DOCUMENTS

| | | | | | |
|---|---|---|---|---|---|
| 5,898,928 | A | * | 4/1999 | Karlsson ............... | H04W 16/04 |
| | | | | | 455/452.2 |
| 6,980,810 | B1 | * | 12/2005 | Gerakoulis .......... | H04W 92/02 |
| | | | | | 455/442 |

(Continued)

*Primary Examiner* — James M Perez
(74) *Attorney, Agent, or Firm* — Straub & Straub; Michael P. Straub; Stephen T. Straub

(57) ABSTRACT

A master node (MN) communicating with a UE using resource of a first band of unlicensed spectrum sends an addition request to a selected secondary node, to request resources for supporting the UE in a second band of unlicensed spectrum. The addition request includes minimum frequency separation information and optionally a baseline reference frequency. The minimum frequency separation information communicated in the addition request, indicates a minimum amount of frequency separation to be maintained between the communication resources in the first band of unlicensed spectrum used for communications with the UE and communication resource in the second band of unlicensed spectrum to be used for communications with the UE. The secondary node selects a channel within the second band of unlicensed spectrum to use for communications with the UE, which will satisfy the minimum frequency separation requirement communicated in the addition request and avoid IDC problems for the UE.

20 Claims, 34 Drawing Sheets

(58) Field of Classification Search
CPC .. H04B 2001/1072; H04B 7/02; H04B 7/022;
H04B 7/024; H04W 72/04; H04W
72/044; H04W 72/0453; H04W 88/02;
H04W 88/06; H04W 36/0005; H04W
36/0055; H04W 36/0069; H04W
36/00692; H04L 5/003; H04L 5/0032;
H04L 5/0035
See application file for complete search history.

(56) References Cited

U.S. PATENT DOCUMENTS

| | | | | | |
|---|---|---|---|---|---|
| 9,397,785 | B1* | 7/2016 | Zhang | | H04L 1/0041 |
| 10,397,794 | B2* | 8/2019 | Suzuki | | H04W 74/004 |
| 10,516,510 | B2* | 12/2019 | Sköld | | H04L 5/003 |
| 10,598,763 | B2* | 3/2020 | Kellum | | H04B 7/086 |
| 10,819,551 | B2* | 10/2020 | Berggren | | H04W 72/0453 |
| 11,026,229 | B2* | 6/2021 | Kazmi | | H04W 72/0453 |
| 11,159,284 | B2* | 10/2021 | Sköld | | H04W 72/20 |
| 11,252,709 | B2* | 2/2022 | Mukherjee | | H04W 72/04 |
| 11,290,314 | B2* | 3/2022 | Berggren | | H04L 27/2666 |
| 11,374,614 | B1* | 6/2022 | Mukherjee | | H04W 88/06 |
| 11,659,533 | B2* | 5/2023 | Hafeez | | H04B 17/345 |
| | | | | | 370/252 |
| 11,800,418 | B2* | 10/2023 | Paladugu | | H04W 36/322 |
| 11,997,614 | B2* | 5/2024 | Al-Mufti | | H04W 52/243 |
| 12,057,872 | B2* | 8/2024 | Vaidya | | H04L 5/001 |
| 12,058,715 | B2* | 8/2024 | Abotabl | | H04J 11/004 |
| 12,213,118 | B2* | 1/2025 | Hafeez | | H04L 5/0073 |
| 12,335,202 | B2* | 6/2025 | Vaidya | | H04W 72/0446 |
| 12,369,065 | B2* | 7/2025 | Vintola | | H04L 5/005 |
| 2010/0041384 | A1* | 2/2010 | Kazmi | | H04W 8/22 |
| | | | | | 455/67.11 |
| 2012/0063373 | A1* | 3/2012 | Chincholi | | H04L 5/0064 |
| | | | | | 370/281 |
| 2013/0303217 | A1* | 11/2013 | Tao | | H04L 5/0035 |
| | | | | | 455/501 |
| 2014/0023156 | A1* | 1/2014 | Zhang | | H04L 69/22 |
| | | | | | 375/260 |
| 2014/0274094 | A1* | 9/2014 | Abdelmonem | | H04L 41/069 |
| | | | | | 455/452.1 |
| 2015/0071263 | A1* | 3/2015 | Yang | | H04W 72/0446 |
| | | | | | 370/336 |
| 2015/0148090 | A1* | 5/2015 | Shimomura | | H04W 72/54 |
| | | | | | 455/515 |
| 2015/0189668 | A1* | 7/2015 | Abdelmonem | | H04B 17/345 |
| | | | | | 370/252 |
| 2016/0081090 | A1* | 3/2016 | Jung | | H04L 5/0007 |
| | | | | | 370/329 |
| 2016/0227416 | A1* | 8/2016 | Suzuki | | H04W 72/1215 |
| 2016/0323885 | A1* | 11/2016 | Kazmi | | H04W 76/27 |
| 2017/0134882 | A1* | 5/2017 | Kao | | H04W 72/1215 |
| 2017/0245243 | A1* | 8/2017 | Siomina | | H04W 76/14 |
| 2017/0272213 | A1* | 9/2017 | Sköld | | H04L 5/001 |
| 2018/0020452 | A1* | 1/2018 | Yerramalli | | H04W 72/0453 |
| 2018/0249469 | A1* | 8/2018 | Park | | H04W 72/0446 |
| 2018/0295637 | A1* | 10/2018 | Manolakos | | H04W 72/54 |
| 2019/0053091 | A1* | 2/2019 | Vintola | | H04L 5/003 |
| 2020/0076549 | A1* | 3/2020 | Sköld | | H04L 5/003 |
| 2020/0112953 | A1* | 4/2020 | Bendlin | | H04W 88/14 |
| 2020/0136881 | A1* | 4/2020 | Berggren | | H04L 27/2675 |
| 2021/0099332 | A1* | 4/2021 | Berggren | | H04W 72/0453 |
| 2021/0258959 | A1* | 8/2021 | Kazmi | | H04W 52/367 |
| 2022/0022057 | A1* | 1/2022 | He | | H04W 24/02 |
| 2022/0030650 | A1* | 1/2022 | Yang | | H04W 76/15 |
| 2022/0110123 | A1* | 4/2022 | Adachi | | H04W 72/0453 |
| 2022/0279532 | A1* | 9/2022 | Barac | | H04W 72/27 |
| 2022/0345895 | A1* | 10/2022 | Al-Mufti | | H04W 16/10 |
| 2023/0058594 | A1* | 2/2023 | Awad | | H04W 72/12 |
| 2023/0171828 | A1* | 6/2023 | Wang | | H04W 52/367 |
| | | | | | 370/329 |
| 2023/0246757 | A1* | 8/2023 | Das | | H04L 5/0044 |
| | | | | | 370/329 |
| 2023/0308929 | A1* | 9/2023 | Vintola | | H04L 5/003 |
| 2023/0413356 | A1* | 12/2023 | Wu | | H04W 76/27 |
| 2024/0039565 | A1* | 2/2024 | Vaidya | | H04W 72/0453 |
| 2024/0039682 | A1* | 2/2024 | Vaidya | | H04W 72/0446 |
| 2024/0040551 | A1* | 2/2024 | Vaidya | | H04W 76/15 |
| 2024/0214827 | A1* | 6/2024 | Wang | | H04W 48/16 |
| 2024/0244547 | A1* | 7/2024 | Ghanbarinejad | | H04L 5/0035 |
| 2024/0284419 | A1* | 8/2024 | Ouchi | | H04W 72/0446 |
| 2024/0396581 | A1* | 11/2024 | Vaidya | | H04W 72/001 |
| 2025/0056287 | A1* | 2/2025 | Liu | | H04W 24/10 |
| 2025/0219774 | A1* | 7/2025 | Zheng | | H04L 5/14 |
| 2025/0294535 | A1* | 9/2025 | Lei | | H04W 72/51 |
| 2025/0317268 | A1* | 10/2025 | Vaidya | | H04W 72/0446 |

* cited by examiner

| IE/GROUP NAME | PRESENCE | RANGE | IE TYPE AND REFERENCE | SEMANTICS DESCRIPTION |
|---|---|---|---|---|
| CHOICE NG-RAN Node Resource Coordination Information | M | | | |
| >EUTRA | | | | |
| >>EUTRA Resource Coordination Information | | | 9.2.2.34 3GPP TS 38.423 V16.8.0 (2021-12) | E-UTRA resource coordination information |
| >NR | | | | |
| >>NR Resource Coordination Information | | | 9.2.2.35 3GPP TS 38.423 V16.8.0 (2021-12) | NR resource coordination information |

| FIGURE 9A |
|---|
| FIGURE 9B |
| FIGURE 9C |

FIGURE 9

| FIGURE 10A |
| --- |
| FIGURE 10B |
| FIGURE 10C |
| FIGURE 10D |

FIGURE 10

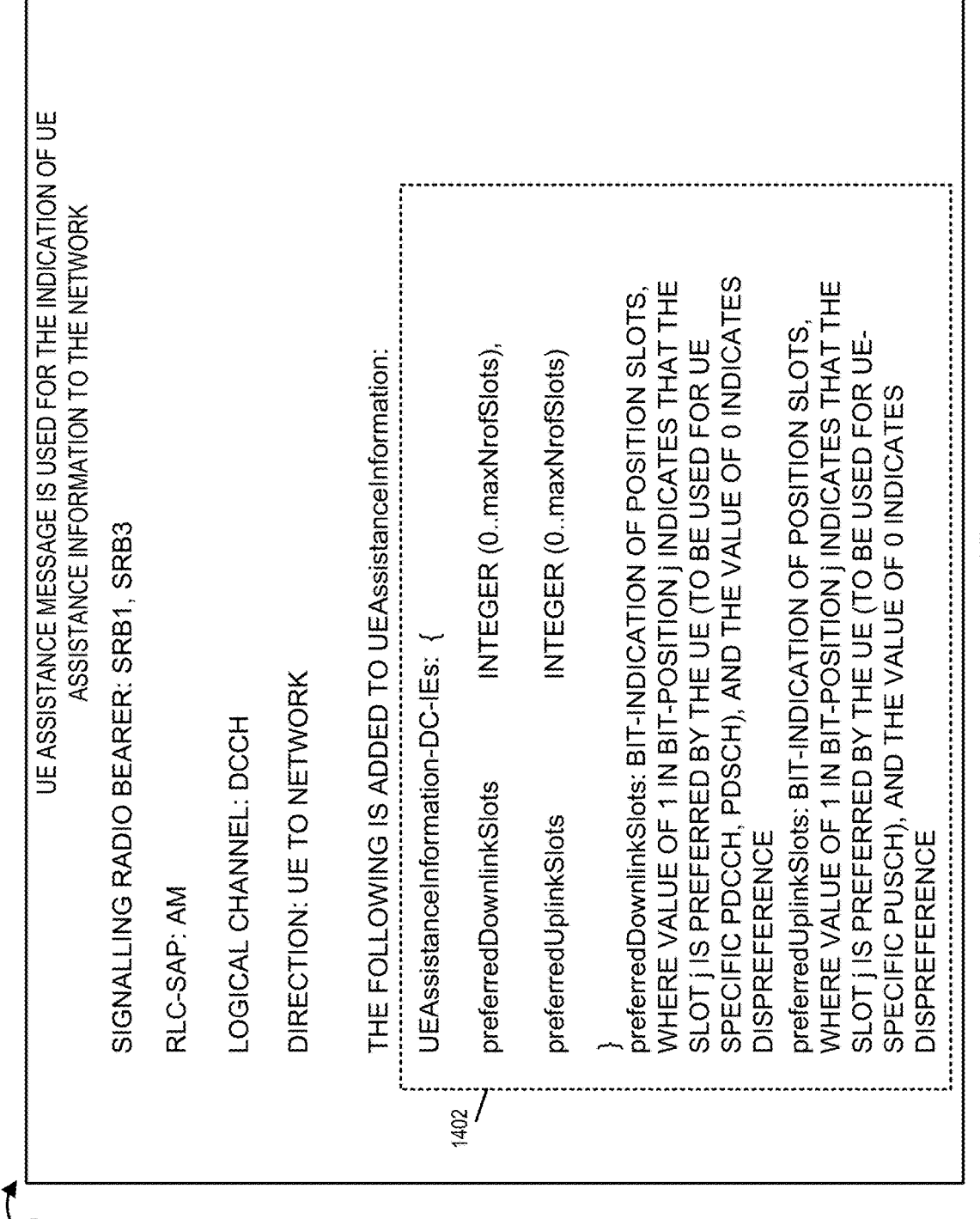

UE ASSISTANCE MESSAGE IS USED FOR THE INDICATION OF UE ASSISTANCE INFORMATION TO THE NETWORK

SIGNALLING RADIO BEARER: SRB1, SRB3

RLC-SAP: AM

LOGICAL CHANNEL: DCCH

DIRECTION: UE TO NETWORK

THE FOLLOWING IS ADDED TO UEAssistanceInformation:

UEAssistanceInformation-DC-IEs: { preferredDownlinkSlots        INTEGER (0..maxNrofSlots), preferredUplinkSlots          INTEGER (0..maxNrofSlots)

}
preferredDownlinkSlots: BIT-INDICATION OF POSITION SLOTS, WHERE VALUE OF 1 IN BIT-POSITION j INDICATES THAT THE SLOT j IS PREFERRED BY THE UE (TO BE USED FOR UE SPECIFIC PDCCH, PDSCH), AND THE VALUE OF 0 INDICATES DISPREFERENCE preferredUplinkSlots: BIT-INDICATION OF POSITION SLOTS, WHERE VALUE OF 1 IN BIT-POSITION j INDICATES THAT THE SLOT j IS PREFERRED BY THE UE (TO BE USED FOR UE-SPECIFIC PUSCH), AND THE VALUE OF 0 INDICATES DISPREFERENCE

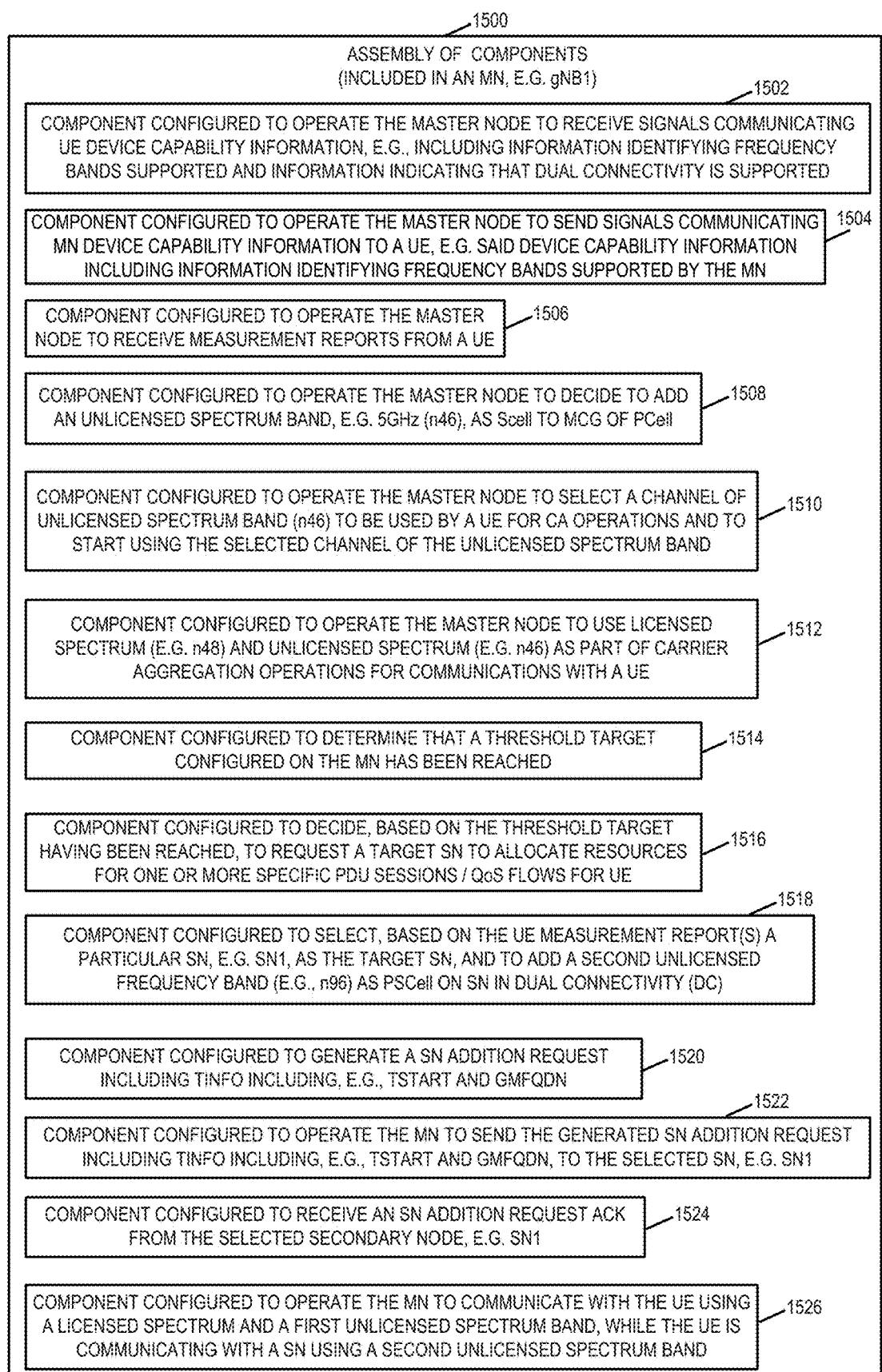

1500

ASSEMBLY OF COMPONENTS
(INCLUDED IN AN MN, E.G. gNB1)

1502
COMPONENT CONFIGURED TO OPERATE THE MASTER NODE TO RECEIVE SIGNALS COMMUNICATING UE DEVICE CAPABILITY INFORMATION, E.G., INCLUDING INFORMATION IDENTIFYING FREQUENCY BANDS SUPPORTED AND INFORMATION INDICATING THAT DUAL CONNECTIVITY IS SUPPORTED

1504
COMPONENT CONFIGURED TO OPERATE THE MASTER NODE TO SEND SIGNALS COMMUNICATING MN DEVICE CAPABILITY INFORMATION TO A UE, E.G. SAID DEVICE CAPABILITY INFORMATION INCLUDING INFORMATION IDENTIFYING FREQUENCY BANDS SUPPORTED BY THE MN

1506
COMPONENT CONFIGURED TO OPERATE THE MASTER NODE TO RECEIVE MEASUREMENT REPORTS FROM A UE

1508
COMPONENT CONFIGURED TO OPERATE THE MASTER NODE TO DECIDE TO ADD AN UNLICENSED SPECTRUM BAND, E.G. 5GHz (n46), AS Scell TO MCG OF PCell 1510
COMPONENT CONFIGURED TO OPERATE THE MASTER NODE TO SELECT A CHANNEL OF UNLICENSED SPECTRUM BAND (n46) TO BE USED BY A UE FOR CA OPERATIONS AND TO START USING THE SELECTED CHANNEL OF THE UNLICENSED SPECTRUM BAND 1512
COMPONENT CONFIGURED TO OPERATE THE MASTER NODE TO USE LICENSED SPECTRUM (E.G. n48) AND UNLICENSED SPECTRUM (E.G. n46) AS PART OF CARRIER AGGREGATION OPERATIONS FOR COMMUNICATIONS WITH A UE 1514
COMPONENT CONFIGURED TO DETERMINE THAT A THRESHOLD TARGET CONFIGURED ON THE MN HAS BEEN REACHED 1516
COMPONENT CONFIGURED TO DECIDE, BASED ON THE THRESHOLD TARGET HAVING BEEN REACHED, TO REQUEST A TARGET SN TO ALLOCATE RESOURCES FOR ONE OR MORE SPECIFIC PDU SESSIONS / QoS FLOWS FOR UE 1518
COMPONENT CONFIGURED TO SELECT, BASED ON THE UE MEASUREMENT REPORT(S) A PARTICULAR SN, E.G. SN1, AS THE TARGET SN, AND TO ADD A SECOND UNLICENSED FREQUENCY BAND (E.G., n96) AS PSCell ON SN IN DUAL CONNECTIVITY (DC)

1520
COMPONENT CONFIGURED TO GENERATE A SN ADDITION REQUEST INCLUDING TINFO INCLUDING, E.G., TSTART AND GMFQDN

1522
COMPONENT CONFIGURED TO OPERATE THE MN TO SEND THE GENERATED SN ADDITION REQUEST INCLUDING TINFO INCLUDING, E.G., TSTART AND GMFQDN, TO THE SELECTED SN, E.G. SN1

1524
COMPONENT CONFIGURED TO RECEIVE AN SN ADDITION REQUEST ACK FROM THE SELECTED SECONDARY NODE, E.G. SN1

1526
COMPONENT CONFIGURED TO OPERATE THE MN TO COMMUNICATE WITH THE UE USING A LICENSED SPECTRUM AND A FIRST UNLICENSED SPECTRUM BAND, WHILE THE UE IS COMMUNICATING WITH A SN USING A SECOND UNLICENSED SPECTRUM BAND

FIGURE 15

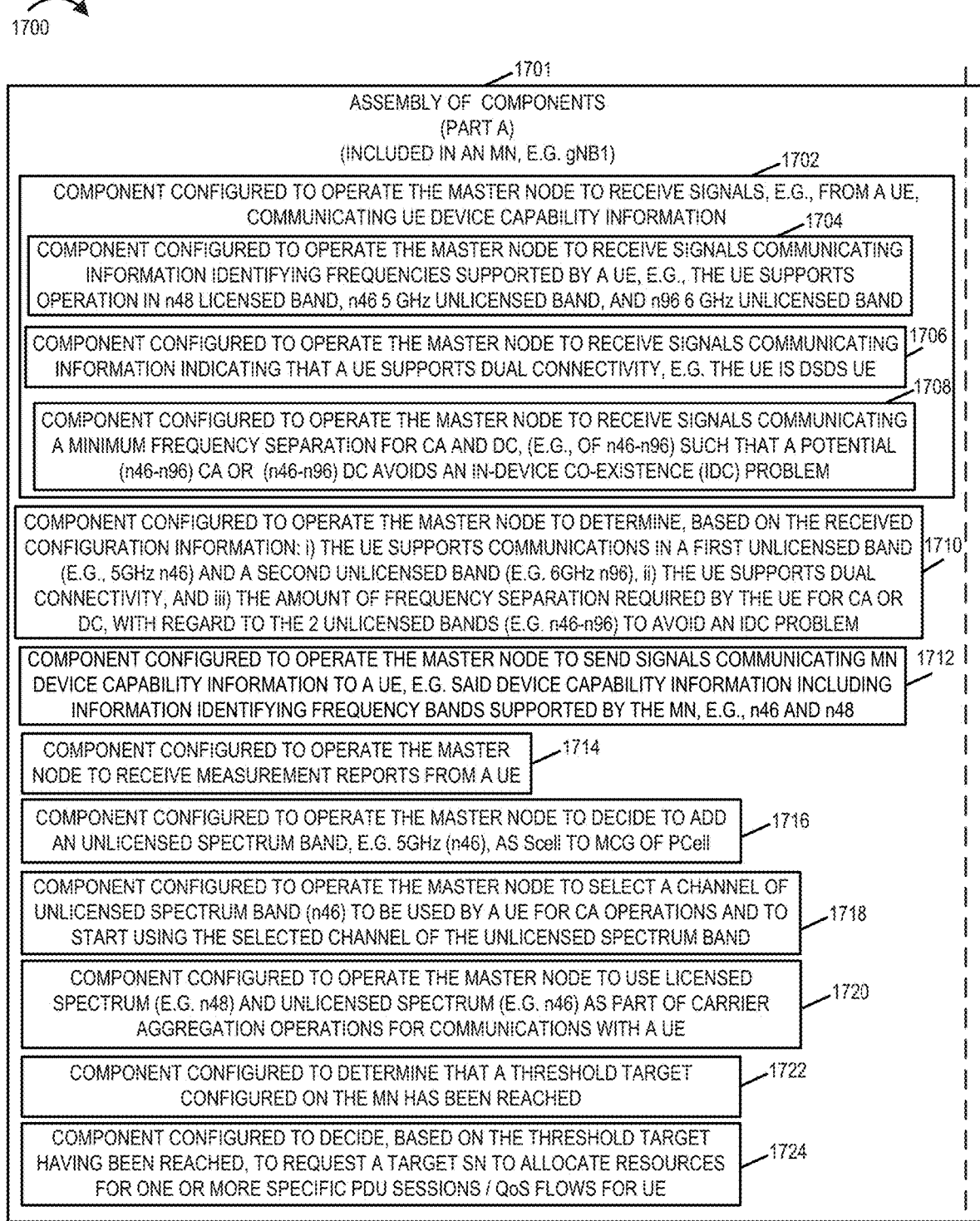

1700

1701

ASSEMBLY OF COMPONENTS
(PART A)
(INCLUDED IN AN MN, E.G. gNB1)

1702

COMPONENT CONFIGURED TO OPERATE THE MASTER NODE TO RECEIVE SIGNALS, E.G., FROM A UE, COMMUNICATING UE DEVICE CAPABILITY INFORMATION

1704

COMPONENT CONFIGURED TO OPERATE THE MASTER NODE TO RECEIVE SIGNALS COMMUNICATING INFORMATION IDENTIFYING FREQUENCIES SUPPORTED BY A UE, E.G., THE UE SUPPORTS OPERATION IN n48 LICENSED BAND, n46 5 GHz UNLICENSED BAND, AND n96 6 GHz UNLICENSED BAND

1706

COMPONENT CONFIGURED TO OPERATE THE MASTER NODE TO RECEIVE SIGNALS COMMUNICATING INFORMATION INDICATING THAT A UE SUPPORTS DUAL CONNECTIVITY, E.G. THE UE IS DSDS UE

1708

COMPONENT CONFIGURED TO OPERATE THE MASTER NODE TO RECEIVE SIGNALS COMMUNICATING A MINIMUM FREQUENCY SEPARATION FOR CA AND DC, (E.G., OF n46-n96) SUCH THAT A POTENTIAL (n46-n96) CA OR (n46-n96) DC AVOIDS AN IN-DEVICE CO-EXISTENCE (IDC) PROBLEM

COMPONENT CONFIGURED TO OPERATE THE MASTER NODE TO DETERMINE, BASED ON THE RECEIVED CONFIGURATION INFORMATION: i) THE UE SUPPORTS COMMUNICATIONS IN A FIRST UNLICENSED BAND (E.G., 5GHz n46) AND A SECOND UNLICENSED BAND (E.G. 6GHz n96), ii) THE UE SUPPORTS DUAL CONNECTIVITY, AND iii) THE AMOUNT OF FREQUENCY SEPARATION REQUIRED BY THE UE FOR CA OR DC, WITH REGARD TO THE 2 UNLICENSED BANDS (E.G. n46-n96) TO AVOID AN IDC PROBLEM

1710

COMPONENT CONFIGURED TO OPERATE THE MASTER NODE TO SEND SIGNALS COMMUNICATING MN DEVICE CAPABILITY INFORMATION TO A UE, E.G. SAID DEVICE CAPABILITY INFORMATION INCLUDING INFORMATION IDENTIFYING FREQUENCY BANDS SUPPORTED BY THE MN, E.G., n46 AND n48

1712

COMPONENT CONFIGURED TO OPERATE THE MASTER NODE TO RECEIVE MEASUREMENT REPORTS FROM A UE

1714

COMPONENT CONFIGURED TO OPERATE THE MASTER NODE TO DECIDE TO ADD AN UNLICENSED SPECTRUM BAND, E.G. 5GHz (n46), AS Scell TO MCG OF PCell

1716

COMPONENT CONFIGURED TO OPERATE THE MASTER NODE TO SELECT A CHANNEL OF UNLICENSED SPECTRUM BAND (n46) TO BE USED BY A UE FOR CA OPERATIONS AND TO START USING THE SELECTED CHANNEL OF THE UNLICENSED SPECTRUM BAND

1718

COMPONENT CONFIGURED TO OPERATE THE MASTER NODE TO USE LICENSED SPECTRUM (E.G. n48) AND UNLICENSED SPECTRUM (E.G. n46) AS PART OF CARRIER AGGREGATION OPERATIONS FOR COMMUNICATIONS WITH A UE

1720

COMPONENT CONFIGURED TO DETERMINE THAT A THRESHOLD TARGET CONFIGURED ON THE MN HAS BEEN REACHED

1722

COMPONENT CONFIGURED TO DECIDE, BASED ON THE THRESHOLD TARGET HAVING BEEN REACHED, TO REQUEST A TARGET SN TO ALLOCATE RESOURCES FOR ONE OR MORE SPECIFIC PDU SESSIONS / QoS FLOWS FOR UE

Figure 18:
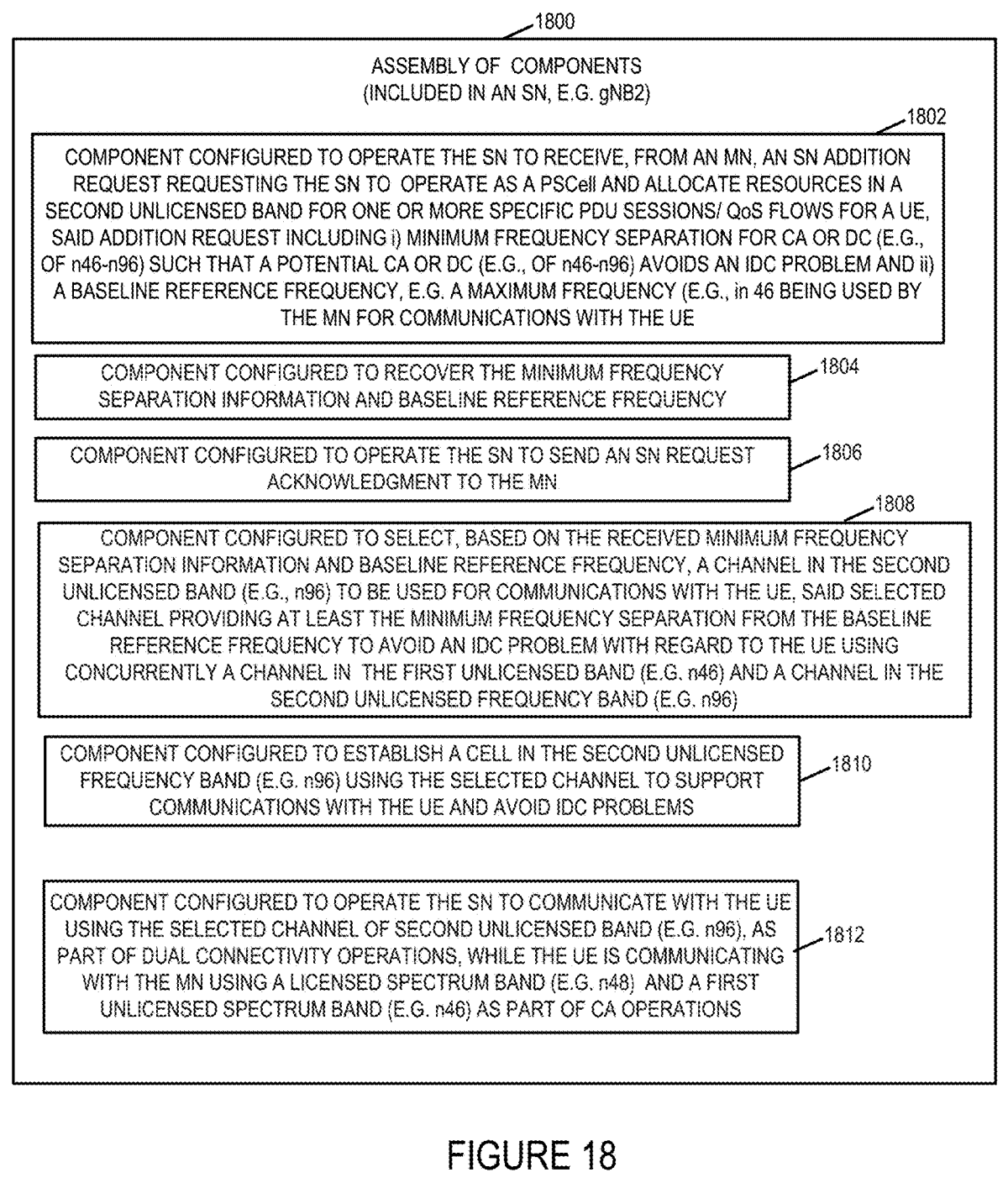

ASSEMBLY OF COMPONENTS
(INCLUDED IN AN SN, E.G. gNB2)

1802

COMPONENT CONFIGURED TO OPERATE THE SN TO RECEIVE, FROM AN MN, AN SN ADDITION REQUEST REQUESTING THE SN TO OPERATE AS A PSCell AND ALLOCATE RESOURCES IN A SECOND UNLICENSED BAND FOR ONE OR MORE SPECIFIC PDU SESSIONS/ QoS FLOWS FOR A UE, SAID ADDITION REQUEST INCLUDING i) MINIMUM FREQUENCY SEPARATION FOR CA OR DC (E.G., OF n46-n96) SUCH THAT A POTENTIAL CA OR DC (E.G., OF n46-n96) AVOIDS AN IDC PROBLEM AND ii) A BASELINE REFERENCE FREQUENCY, E.G. A MAXIMUM FREQUENCY (E.G., in 46 BEING USED BY THE MN FOR COMMUNICATIONS WITH THE UE COMPONENT CONFIGURED TO RECOVER THE MINIMUM FREQUENCY SEPARATION INFORMATION AND BASELINE REFERENCE FREQUENCY

1804

COMPONENT CONFIGURED TO OPERATE THE SN TO SEND AN SN REQUEST ACKNOWLEDGMENT TO THE MN

1806

1808

COMPONENT CONFIGURED TO SELECT, BASED ON THE RECEIVED MINIMUM FREQUENCY SEPARATION INFORMATION AND BASELINE REFERENCE FREQUENCY, A CHANNEL IN THE SECOND UNLICENSED BAND (E.G., n96) TO BE USED FOR COMMUNICATIONS WITH THE UE, SAID SELECTED CHANNEL PROVIDING AT LEAST THE MINIMUM FREQUENCY SEPARATION FROM THE BASELINE REFERENCE FREQUENCY TO AVOID AN IDC PROBLEM WITH REGARD TO THE UE USING CONCURRENTLY A CHANNEL IN THE FIRST UNLICENSED BAND (E.G. n46) AND A CHANNEL IN THE SECOND UNLICENSED FREQUENCY BAND (E.G. n96)

COMPONENT CONFIGURED TO ESTABLISH A CELL IN THE SECOND UNLICENSED FREQUENCY BAND (E.G. n96) USING THE SELECTED CHANNEL TO SUPPORT COMMUNICATIONS WITH THE UE AND AVOID IDC PROBLEMS

1810

COMPONENT CONFIGURED TO OPERATE THE SN TO COMMUNICATE WITH THE UE USING THE SELECTED CHANNEL OF SECOND UNLICENSED BAND (E.G. n96), AS PART OF DUAL CONNECTIVITY OPERATIONS, WHILE THE UE IS COMMUNICATING WITH THE MN USING A LICENSED SPECTRUM BAND (E.G. n48) AND A FIRST UNLICENSED SPECTRUM BAND (E.G. n46) AS PART OF CA OPERATIONS

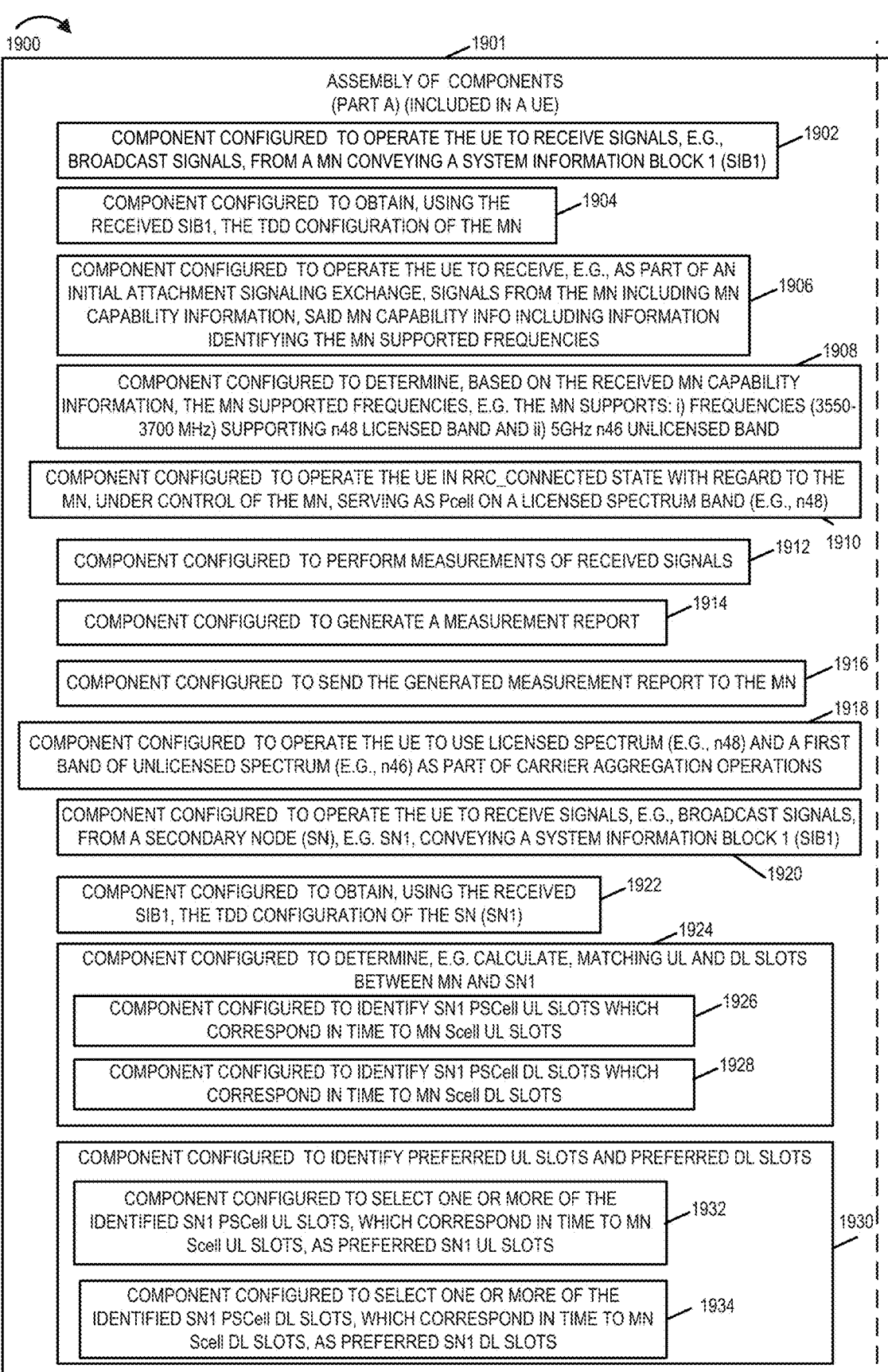

1900

1901

ASSEMBLY OF COMPONENTS
(PART A) (INCLUDED IN A UE)

COMPONENT CONFIGURED TO OPERATE THE UE TO RECEIVE SIGNALS, E.G., BROADCAST SIGNALS, FROM A MN CONVEYING A SYSTEM INFORMATION BLOCK 1 (SIB1) — 1902

COMPONENT CONFIGURED TO OBTAIN, USING THE RECEIVED SIB1, THE TDD CONFIGURATION OF THE MN — 1904

COMPONENT CONFIGURED TO OPERATE THE UE TO RECEIVE, E.G., AS PART OF AN INITIAL ATTACHMENT SIGNALING EXCHANGE, SIGNALS FROM THE MN INCLUDING MN CAPABILITY INFORMATION, SAID MN CAPABILITY INFO INCLUDING INFORMATION IDENTIFYING THE MN SUPPORTED FREQUENCIES — 1906

COMPONENT CONFIGURED TO DETERMINE, BASED ON THE RECEIVED MN CAPABILITY INFORMATION, THE MN SUPPORTED FREQUENCIES, E.G. THE MN SUPPORTS: i) FREQUENCIES (3550-3700 MHz) SUPPORTING n48 LICENSED BAND AND ii) 5GHz n46 UNLICENSED BAND — 1908

COMPONENT CONFIGURED TO OPERATE THE UE IN RRC_CONNECTED STATE WITH REGARD TO THE MN, UNDER CONTROL OF THE MN, SERVING AS Pcell ON A LICENSED SPECTRUM BAND (E.G., n48) — 1910

COMPONENT CONFIGURED TO PERFORM MEASUREMENTS OF RECEIVED SIGNALS — 1912

COMPONENT CONFIGURED TO GENERATE A MEASUREMENT REPORT — 1914

COMPONENT CONFIGURED TO SEND THE GENERATED MEASUREMENT REPORT TO THE MN — 1916

COMPONENT CONFIGURED TO OPERATE THE UE TO USE LICENSED SPECTRUM (E.G., n48) AND A FIRST BAND OF UNLICENSED SPECTRUM (E.G., n46) AS PART OF CARRIER AGGREGATION OPERATIONS — 1918

COMPONENT CONFIGURED TO OPERATE THE UE TO RECEIVE SIGNALS, E.G., BROADCAST SIGNALS, FROM A SECONDARY NODE (SN), E.G. SN1, CONVEYING A SYSTEM INFORMATION BLOCK 1 (SIB1) — 1920

COMPONENT CONFIGURED TO OBTAIN, USING THE RECEIVED SIB1, THE TDD CONFIGURATION OF THE SN (SN1) — 1922

COMPONENT CONFIGURED TO DETERMINE, E.G. CALCULATE, MATCHING UL AND DL SLOTS BETWEEN MN AND SN1 — 1924

COMPONENT CONFIGURED TO IDENTIFY SN1 PSCell UL SLOTS WHICH CORRESPOND IN TIME TO MN Scell UL SLOTS — 1926

COMPONENT CONFIGURED TO IDENTIFY SN1 PSCell DL SLOTS WHICH CORRESPOND IN TIME TO MN Scell DL SLOTS — 1928

COMPONENT CONFIGURED TO IDENTIFY PREFERRED UL SLOTS AND PREFERRED DL SLOTS — 1930

COMPONENT CONFIGURED TO SELECT ONE OR MORE OF THE IDENTIFIED SN1 PSCell UL SLOTS, WHICH CORRESPOND IN TIME TO MN Scell UL SLOTS, AS PREFERRED SN1 UL SLOTS — 1932

COMPONENT CONFIGURED TO SELECT ONE OR MORE OF THE IDENTIFIED SN1 PSCell DL SLOTS, WHICH CORRESPOND IN TIME TO MN Scell DL SLOTS, AS PREFERRED SN1 DL SLOTS — 1934

FIGURE 19A

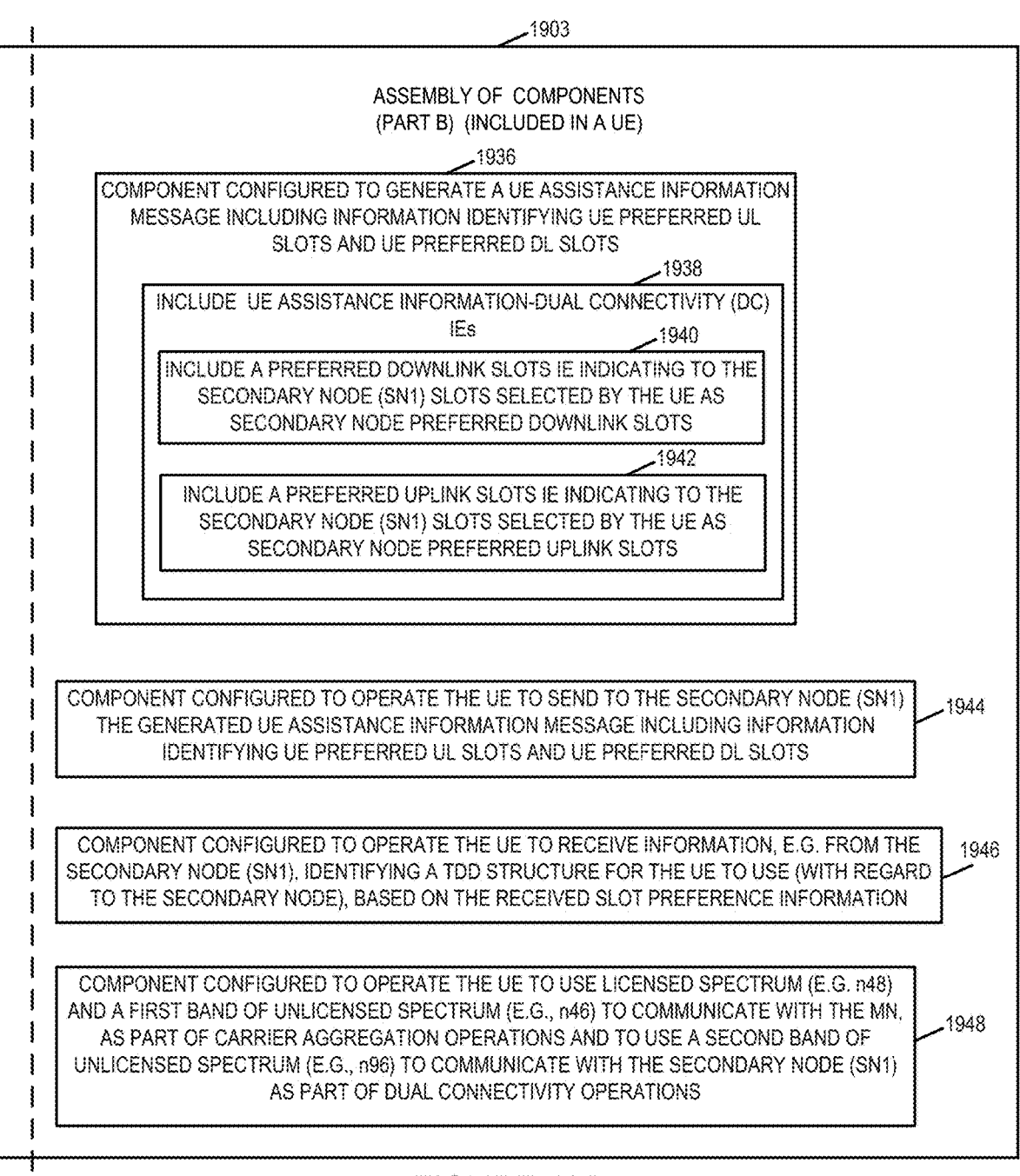

1903

ASSEMBLY OF COMPONENTS
(PART B) (INCLUDED IN A UE)

1936

COMPONENT CONFIGURED TO GENERATE A UE ASSISTANCE INFORMATION MESSAGE INCLUDING INFORMATION IDENTIFYING UE PREFERRED UL SLOTS AND UE PREFERRED DL SLOTS

1938

INCLUDE UE ASSISTANCE INFORMATION-DUAL CONNECTIVITY (DC) IEs

1940

INCLUDE A PREFERRED DOWNLINK SLOTS IE INDICATING TO THE SECONDARY NODE (SN1) SLOTS SELECTED BY THE UE AS SECONDARY NODE PREFERRED DOWNLINK SLOTS

1942

INCLUDE A PREFERRED UPLINK SLOTS IE INDICATING TO THE SECONDARY NODE (SN1) SLOTS SELECTED BY THE UE AS SECONDARY NODE PREFERRED UPLINK SLOTS

COMPONENT CONFIGURED TO OPERATE THE UE TO SEND TO THE SECONDARY NODE (SN1) THE GENERATED UE ASSISTANCE INFORMATION MESSAGE INCLUDING INFORMATION IDENTIFYING UE PREFERRED UL SLOTS AND UE PREFERRED DL SLOTS
1944

COMPONENT CONFIGURED TO OPERATE THE UE TO RECEIVE INFORMATION, E.G. FROM THE SECONDARY NODE (SN1), IDENTIFYING A TDD STRUCTURE FOR THE UE TO USE (WITH REGARD TO THE SECONDARY NODE), BASED ON THE RECEIVED SLOT PREFERENCE INFORMATION
1946

COMPONENT CONFIGURED TO OPERATE THE UE TO USE LICENSED SPECTRUM (E.G. n48) AND A FIRST BAND OF UNLICENSED SPECTRUM (E.G., n46) TO COMMUNICATE WITH THE MN, AS PART OF CARRIER AGGREGATION OPERATIONS AND TO USE A SECOND BAND OF UNLICENSED SPECTRUM (E.G., n96) TO COMMUNICATE WITH THE SECONDARY NODE (SN1) AS PART OF DUAL CONNECTIVITY OPERATIONS
1948

METHODS AND APPARATUS RELATING TO COMMUNICATING AND/OR USING MINIMUM FREQUENCY SEPARATION INFORMATION TO FACILITATE CARRIER AGGREGATION AND/OR DUAL CONNECTIVITY

RELATED APPLICATIONS

The present application is a continuation of U.S. patent application Ser. No. 17/877,455 filed on Jul. 29, 2022 which published as U.S. Patent Application Publication No.: US 2024-0039565 A1 on Jan. 1, 2024 and which is hereby expressly incorporated by reference in its entirety.

FIELD

The present application relates to wireless communications, and more particularly, to methods and apparatus for controlling, managing and/or eliminating in-device-coexistence (IDC) problems with respect to using multiple unlicensed spectrum bands, e.g., as part of dual connectivity operations.

BACKGROUND

New Radio Unlicensed (NR-U) technology was normatively specified by 3GPP in Rel-16 standards for operation in unlicensed spectrum world-wide. NR-U technology was defined to operate in: Frequency Range 1 (FR1) from 410 MHZ-7.125 GHz and Frequency Range 2 (FRS) from 24.250-71 GHz. NR-U technology was defined to work in the following modes: a) License-assisted via Carrier Aggregation (CA), b) License-assisted via Dual Connectivity (DC), and c) Standalone. Both License-assisted via Carrier Aggregation (CA) mode and License-assisted via Dual Connectivity (DC) mode require a licensed carrier as the primary carrier (PCell or PSCell). Although, not explicitly mentioned, it was understood that when operating in License-assisted via Carrier Aggregation (CA) mode or License-assisted via Dual Connectivity (DC) mode, only a single unlicensed band was employed.

In the USA, 2.4 GHz and 5 GHz bands have long been used for unlicensed access (mostly via WiFi—and IEEE 802.11 technology). Although in the USA, FCC did not mandate Listen-Before-Talk (LBT) mechanism for these bands, regulators in other parts of the world (e.g., EU) did mandate it. Moreover, LBT was a key mandatory mechanism In IEEE 802.11 a/b/g/n/ac specifications.

In the USA, the Federal Communications Commission (FCC) recently ruled on making additional spectrum available for unlicensed use. (See FCC R&O on Unlicensed use of 6 GHz band.) With the above-mentioned ruling, there are three spectrum bands available for unlicensed use: i) 2.4 GHz, ii) 5 GHz (3GPP defines this band as n46 (See 3GPP TS 38.10101, NR; User Equipment (UE) radio transmission and reception Part 1: Range 1 Standalone, V17.3.0); and iii) 6 GHz (3GPP defines this band as n96 (See 3GPP TS 38.10101, NR; User Equipment (UE) radio transmission and reception Part 1: Range 1 Standalone, V17.3.0).

As such, aggregation, when using 3GPP NR-U, of channels (e.g., 20 MHz per channel) across these bands is also possible. However, give the uncertainty around channel access (due to LBT), without additional techniques, a device (e.g., a UE) may end up transmitting data (in the uplink direction) to a base station (e.g., a gNB) whilst receiving data (in the downlink direction). Given the close proximity (in the frequency domain) of the unlicensed bands (mentioned above, e.g., n46 and n96) in the FR1 range, this can result in self-interference at the UE. A similar issue may arise at the base station (e.g., gNB) side as well.

Based on the above description there is a need for new methods and apparatus to prevent self-interference problems in environments in which a UE may be communicating using multiple unlicensed bands concurrently.

SUMMARY

Methods and apparatus for facilitating user equipment (UE) communications using resources from two bands of unlicensed spectrum, e.g., 5 GHz n46 and 6 GHz n96, while avoiding in-device coexistence problems are described. A master node (MN) communicating with the UE using resource of a first band of unlicensed spectrum sends an addition request to a selected secondary node, to request resources for supporting the UE in a second band of unlicensed spectrum. The addition request includes minimum frequency separation information and optionally a baseline reference frequency. The minimum frequency separation information communicated in the addition request is based on received device capability information from the UE. Different UEs may, and sometimes do, have different requirements for minimum frequency separation to avoid an in-device coexistence (IDC) problem. The minimum frequency separation information communicated in the addition request, indicates a minimum amount of frequency separation to be maintained between the communication resources in the first band of unlicensed spectrum used for communications with the UE and communication resource in the second band of unlicensed spectrum to be used for communications with the UE. In some embodiments, the baseline reference frequency includes a edge value, e.g. a maximum frequency value, of the resources being used for communications with the UE in the first communications band of unlicensed spectrum. The secondary node selects a channel within the second band of unlicensed spectrum to use for communications with the UE, which will satisfy the minimum frequency separation requirement communicated in the addition request. For sake of generalization, some of the methods described herein are applicable when 5 GHz B46 (that is LTE LAA at 5 GHz) and 6 GHz n96 are used.

The selection of a channel in the second band of unlicensed spectrum, which satisfies the minimum frequency separation requirement, ensures that concurrent communications between: i) the master node and the UE using the first band of unlicensed spectrum and ii) the secondary node and the UE using the selected channel of the second band of unlicensed spectrum will not cause an IDC problem. Therefore, due to the controlled frequency separation based on UE capabilities, an in-device coexistence (IDC) problem is avoided.

An exemplary communications method, in accordance with some embodiments, comprises: receiving at a master node (MN) first UE capability information from a first UE communicating frequency information indicating a minimum frequency separation to be used to limit possible in-device-coexistence (IDC) interference at the first UE; sending a secondary node (SN) addition request to a secondary node including minimum frequency separation information to be maintained when allocating one or more frequencies to be used by the first UE; and operating the MN to communicate with the first UE over a first channel while the secondary node communicates with the first UE over a second channel which is separated from said first channel by at least said minimum frequency separation.

Numerous variations on the described methods and apparatus are possible and while several embodiments are described in detail it should be appreciated that the full set of detailed steps need not be used in all embodiments with many of the features and determinations being useful even if not used with the other features and steps.

The detailed description which follows describes additional features, details and embodiments which can be used alone or in combination.

BRIEF DESCRIPTION OF THE FIGURES

FIG. 8 comprises the combination of FIG. 8A and FIG. 8B.

FIG. 9 comprises the combination of FIG. 9A, FIG. 9B and FIG. 9C.

FIG. 10 comprises the combination of FIG. 10A, FIG. 10B, FIG. 10C and FIG. 10D.

FIG. 14 is a drawing of exemplary format for an exemplary UE assistance message including the novel UE Assistance Information Dual Connectivity Information Elements: preferred downlink slots and preferred uplink slots, in accordance with an exemplary embodiment.

FIG. 15 is a drawing of an exemplary assembly of components which may be included in a master node (MN), e.g., a MN of FIG. 12 implementing steps of the exemplary method of FIG. 8.

FIG. 18 is a drawing of an exemplary assembly of components which may be included in a secondary node (SN), e.g., a SN of FIG. 13 implementing steps of the exemplary method of FIG. 9.

FIG. 19A is a drawing of a first part of an exemplary assembly of components which may be included in a user equipment (UE), e.g., a UE of FIG. 11 implementing steps of the exemplary method of FIG. 10.

FIG. 19B is a drawing of a second part of an exemplary assembly of components which may be included in a user equipment (UE), e.g., a UE of FIG. 11 implementing steps of the exemplary method of FIG. 10.

FIG. 19 comprises the combination of FIG. 19A and FIG. 19B.

DETAILED DESCRIPTION

In dual connectivity, a master node (MN) adds a secondary node (SN) by sending a Secondary Node (S-Node) Addition Request including groups of Information Elements (IEs) that specify various details. Among the IEs communicated is Multi-Radio Dual Connectivity (MR-DC) Resource Coordination Information IE.

Multi-Radio Dual Connectivity (MR-DC) Resource Coordination Information IE is present in: S-Node Addition Request, S-Node Modification Request, S-Node Modification Required and S-Node Modification Confirm.

Figure 1:
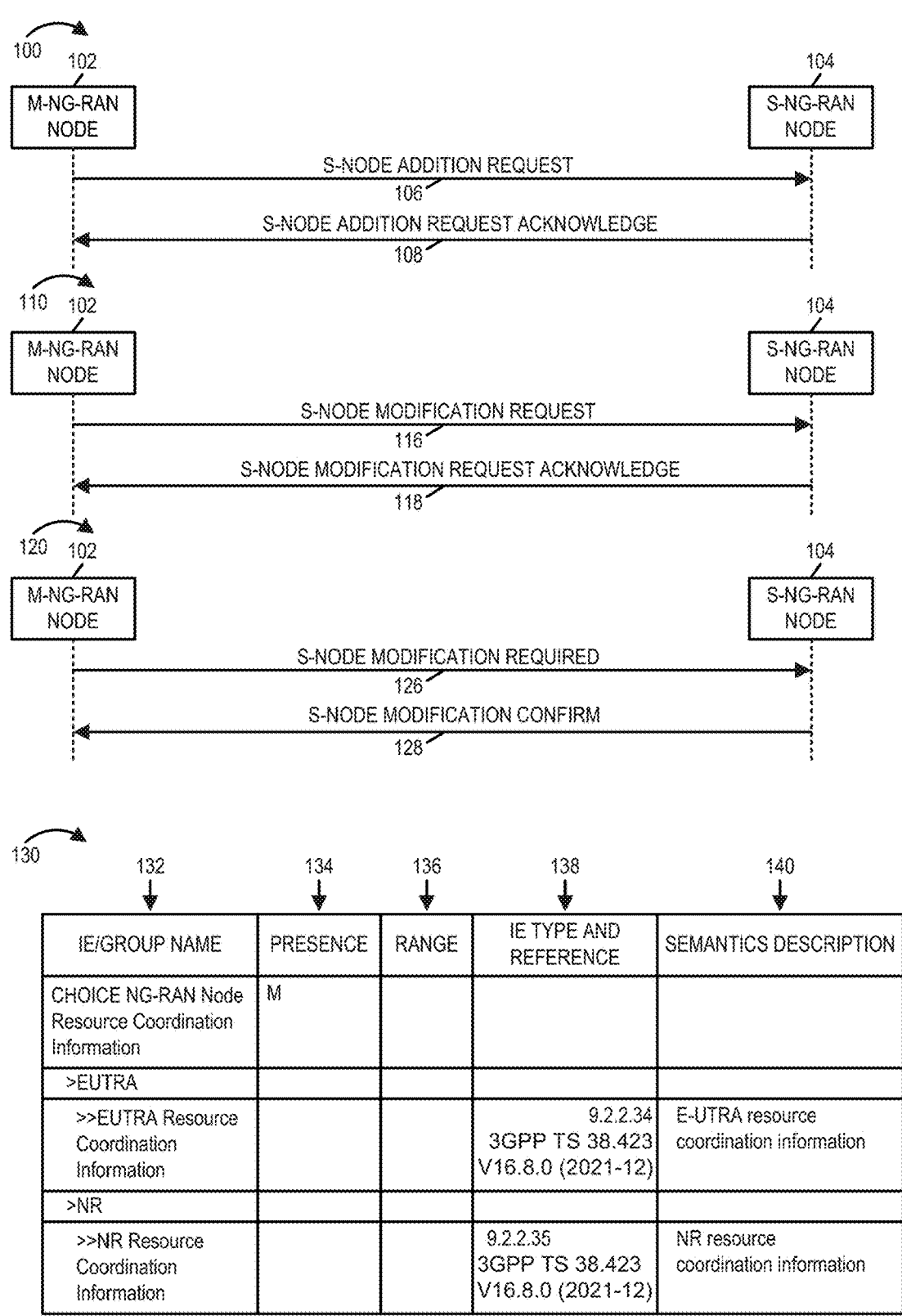
FIG. 1 includes drawings illustrating exemplary signaling exchanges between a Master Next Generation Radio Access Network (M-NG-RAN) node and a Secondary Next Generation Radio Access Network (S-NG-RAN) node, and a table illustrating the prior art Multi-Radio-Dual Connectivity (MR-DC) Resource Coordination IE.

FIG. 1 includes drawings 100, 110 and 120 illustrating exemplary signaling exchanges between a Master Next Generation Radio Access Network (M-NG-RAN) node 102 and a Secondary Next Generation Radio Access Network (S-NG-RAN) node and a table 130 illustrating the prior art MR-DC Resource Coordination IE. Drawing 100 illustrates the M-NG-RAN node 102 sending a S-Node Addition request message 106 to the S-NG-RAN node 104, and the S-NG-RAN node sending a S-Node Addition Request Acknowledgment message 108 to the M-NG-RAN node 102. Drawing 110 illustrates the M-NG-RAN node 102 sending a S-Node Modification Request message 116 to the S-NG-RAN node 104, and the S-NG-RAN node sending a S-Node Modification Request Acknowledgment message 118 to the M-NG-RAN node 102. Drawing 120 illustrates the M-NG-RAN node 102 sending a S-Node Modification Required message 126 to the S-NG-RAN node 104, and the S-NG-RAN node sending a S-Node Modification Confirm message 128 to the M-NG-RAN node 102. MR-DC Resource Coordination Information IE is present in S-Node Addition Request message 106, S-Node Modification Request message 116, S-Node Modification Required message 126 an S-Node Modification Confirm message.

MR-DC Resource Coordination IE table 130 includes a first column 132 including IE/Group name information, a second column 134 indicating presence information, a third column 136 indicating range, a fourth column indicating IE type and reference, and a fourth column 140 including semantics description information. The MR-DC Resource Coordination information is used to coordinate resource utilization between the M-NG-RAN node and the S-NG-RAN node. The E-UTRA Resource Coordination IE indicates LTE resource allocation at ng-eNB used at the gNB to coordinate utilization between M-NG-RAN node and S-NG-RAN node. The NR Resource Coordination Information IE indicates resources within the bandwidth of the ng-eNB sPCell which are not available for use by the ng-eNB and is used at the ng-eNB to coordinate resource utilization between the gNB and the ng-eNB.

In various embodiments in accordance with an exemplary embodiment of the present invention, a novel MR-DC Resource Coordination IE, is modified with respect to a prior art MR-DC Resource Coordination IE, such that the novel MR-DC Resource Coordination IE includes novel information elements, e.g., a Tinfo IE or a minimum frequency separation IE. The novel IEs communicated from a master node (using a first band of unlicensed spectrum) to the secondary node (using a second band of unlicensed spectrum), provisions the secondary node with information to: synchronize its TDD timing with respect to the master node or select a particular channel to be used by the secondary node which is sufficiently distant from the channel being used by the master node, to eliminate or reduce in-device-coexistence in the UE that would otherwise be present due to using multiple unlicensed bands for communications with a user equipment, which operating in dual connectivity mode.

In a dynamic Time Division Duplexing (TDD) system such a New Radio (NR) or New Radio—Unlicensed (NR-U), the transmission pattern in time-domain is understood between UE and gNB via two primary means: method a) UE transmits/receives according to resource allocations as indicated by gNB on Physical Downlink Control Channel (PDCCH) (Layer 1 (PHY) signalling); or method b) a combination of semi-static cell-specific and UE-specific configuration provided via radio resource control (RRC) signaling along with a UE-Group common Layer 1 (PHY) signalling.

Figure 2:
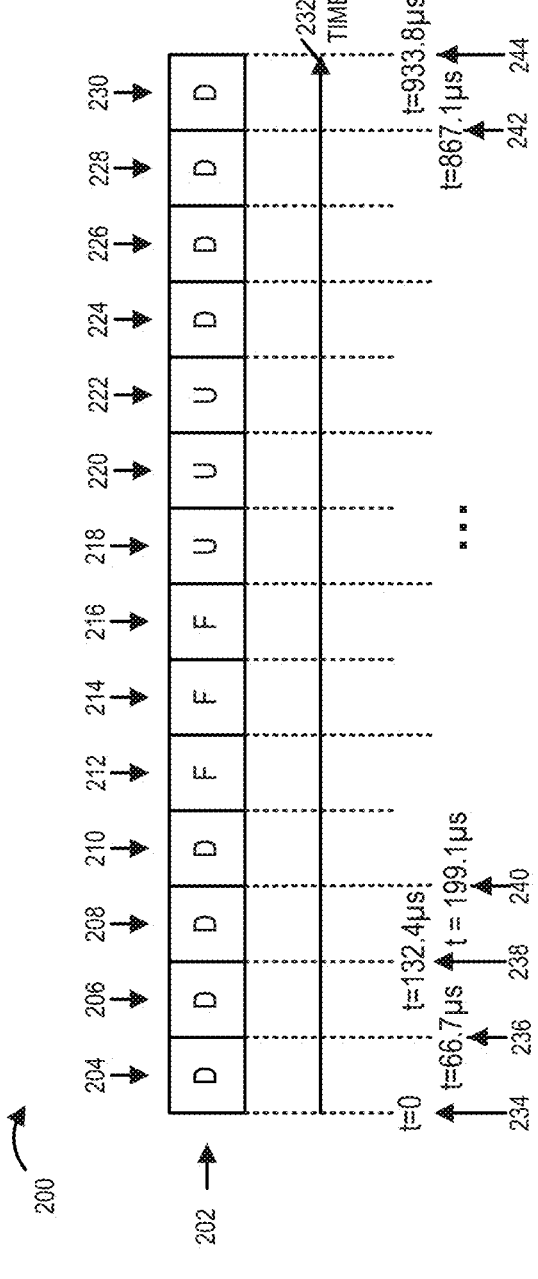
FIG. 2 illustrates and exemplary Orthogonal Frequency Division Multiplexing (OFDM) symbol pattern in a Time Division Duplexing Configuration, e.g. corresponding to a master node (MN), which is a gNB, where: D represents Downlink direction (gNB->UE), U represents Uplink direction (UE->gNB), F represents Flexible symbol (or slot).

In either case, a per direction transmission pattern (e.g., number of slots) along with other relevant transmission characteristics, e.g., periodicity, sub-carrier spacing, etc. is required to be understood between UE and gNB. Depicted pictorially, the end result could look something like drawing 200 of FIG. 2, for an exemplary Orthogonal Frequency Division Multiplexing (OFDM) symbol pattern where: D represents Downlink direction (gNB->UE), U represents Uplink direction (UE->gNB), F represents Flexible symbol (or slot), implying that he directionally is set by gNB as part of Layer 1 signaling (using either of the two methods (method a or method b) described above, and sub-carrier spacing of 15 kHz (p=0) with inter-symbol time of 66.7 µs is used such that 1st Orthogonal Symbol (OS) (D) starts at time t=0, followed by 2nd OS (D) after 66.7 µs, followed by 3rd OS (D) 66.7 µs after 2nd OS and so on. Drawing 200 illustrates 14 exemplary orthogonal symbols (204, 206, 208, 210, 212, 214, 216, 218, 220, 222, 224, 226, 228, 230). Row 202 indicates the symbol pattern identifying which symbols are downlink symbols, which symbols are flexible symbols, and which symbols are uplink symbols in accordance with the exemplary TDD configuration. First symbol 204 start time 234 is t=0 µs. Second symbol 206 start time 236 is t=66.7 µs. Third symbol 208 start time 238 is t=132.4 µs. Fourth symbol 210 start time 240 is t=199.1 µs. Fourteenth symbol 230 start time is t=867.1 µs. Fourteenth symbol 230 end time is t=933.8 µs.

When a contention based mechanism is employed for unlicensed spectrum access, transmission in either direction (DL or UL) requires clearance of Listen-Before-Talk (LBT) (i.e. sensing operation should indicate no contention). Such uncertainty, coupled with a timing mis-alignment may result in self-interference issue especially when more than one gNBs, are involved in transmit/receive toward the same user equipment (UE) for the same operator.

Figure 3:
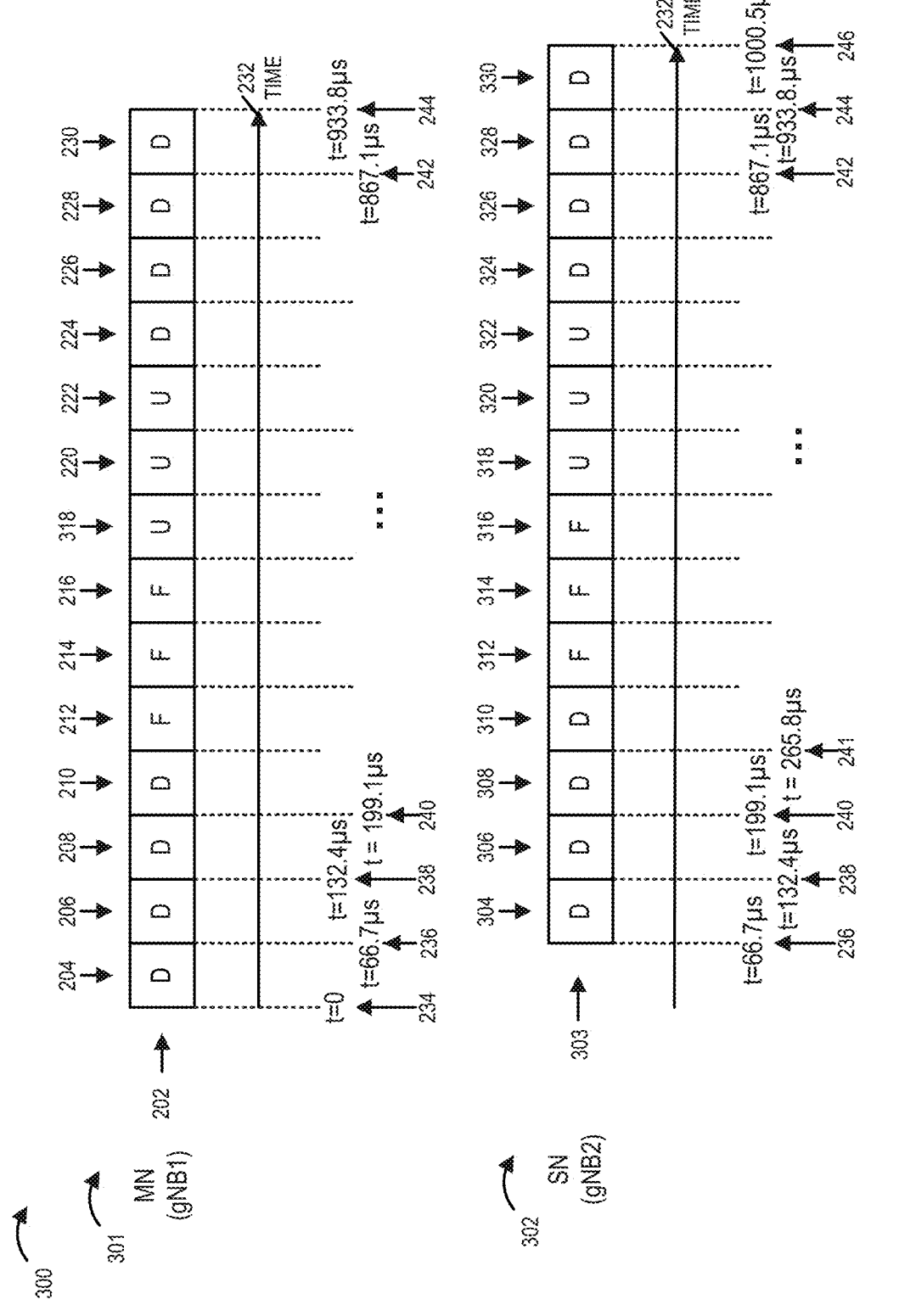
FIG. 3 illustrates an example in which the Time Division Duplexing (TDD) pattern for a master node (MN) is offset in time with respect to a TDD pattern for a corresponding secondary node (SN), resulting in potential in-device-coexistence (IDC) problems for a user equipment (UE) operating in a dual connectivity mode of operation.

The example of drawing 300 of FIG. 3 illustrates the issue (e.g., a potential self-interference issue when more than one gNBs are involved in transmit/receive toward the same UE, and there is a timing misalignment with regard to TDD configurations, e.g., a DL symbol corresponding to a first gNB overlaps with an UL symbol corresponding to a second gNB) for a New Radio (NR) UE in Dual Connectivity (DC) transmission.

Drawing 300 includes drawing 301, which illustrates an exemplary TDD configuration with regard to a first gNB, gNB1, which is a master node (MN) communicating with a DSDS UE. The exemplary configuration for the MN shown in drawing 301 matches the configuration of FIG. 2. Drawing 300 further includes drawing 302 which illustrates an exemplary TDD configuration with regard to a second gNB, gNB2, with is a secondary node (SN). Drawing 302 illustrates 14 exemplary orthogonal symbols (304, 306, 308, 310, 312, 314, 316, 318, 320, 322, 324, 326, 328, 330). Row 303 indicates the symbol pattern identifying which symbols are downlink symbols, which symbols are flexible symbols, and which symbols are uplink symbols in accordance with the exemplary TDD configuration. First symbol 304 start time 236 is t=66.7 µs. Second symbol 306 start time 238 is t=66.7 µs. Third symbol 308 start time 240 is t=132.4 µs. Fourth symbol 310 start time 241 is t=265.8 µs. Thirteenth symbol 328 start time 242 is 867.1 µs. Fourteenth symbol 330 start time is t=933.8 µs. Fourteenth symbol 330 end time is t=1000.5 µs.

In comparing drawing 301 (corresponding to the MN) with drawing 302 (corresponding to the SN), note that the basic TDD configuration for the MN and SN, in terms of the ordered sequence of downlink (D), flexible (F), and uplink (U) symbols, are the same; however, there is a timing offset of 1 symbol time (66.7 µs) between the two TDD configurations.

Consider UE is RRC_Connected. UE is under the control of MN (gNB1) serving as Primary Cell (PCell) on a licensed spectrum band (e.g., n48). After some time, based on UE measurement reports, addition of 5 GHz (n46), an unlicensed spectrum band, as Secondary Cell (SCell) to Master Cell Group (MCG) of PCell is performed by the MN. After some time, based on UE measurement reports, addition of 6 GHz (e.g., n96), another unlicensed spectrum band, as Primary Secondary Cell (PSCell) to Secondary Cell Group (SCG) on Secondary Node (SN) in Dual Connectivity (DC) configuration is performed by the MN. In DC, MN and SN(s) perform, e.g., make, largely independent scheduling decisions, under the supervision of MN. Even though the MN provided its semi-static slot configuration to the SN, and even if SN mimics the configuration for its scheduling decision, the time at which the slot transmission start may be different. In the example of FIG. 3, if MN converts 5th OS 212 (F) to U, then it will be in conflict with SN1's instructions which schedules D (see slot 310) for the same UE. This results in self-interference at both UE and gNB.

In one exemplary embodiment, to solve the self-interference problem, a new Information Element (IE) Tinfo is introduced and used. The new IE Tinfo is exchanged between MN and SNs (SN1, SN2, SN3, . . . ) during S-NG-RAN node Addition preparation (See 3GPP TS 38.423. 'NG-RAN; Xn Application Protocol (XnAP)", V16.8.0 Clause 8.3.1.2).

In one exemplary realization of Tinfo IE, the Tinfo IE may, and sometimes does contain, but is not limited to, the following:

Tstart: Transmission Start Time, in UTC, representing the time this gNB (MN) started its transmission toward the UE, e.g., 2022-02-23T02:25:04Z; and GMFQDN: FQDN of grandmaster atomic clock used by this gNB (MN) as a reference, e.g., http://time.nist.gov for NTP.

This will allow SN1 (gNB2) to align its transmission timing by: ensuring that it (SN1) is time synchronized to the same grandmaster atomic clock (NIST's NTP in this case) as pointed to by GMFQDN and ensuing that Tstart together with information already available in Intended TDD_DL-UL_Configuration NR IE (See 3GPP TS 38.423. 'NG-RAN; Xn Application Protocol (XnAP)", V16.8.0 Clause 9.2.2.40) to achieve slot boundary alignment, shown in drawing 400 of FIG. 4) and/or symbol-level alignment.

Figure 4:
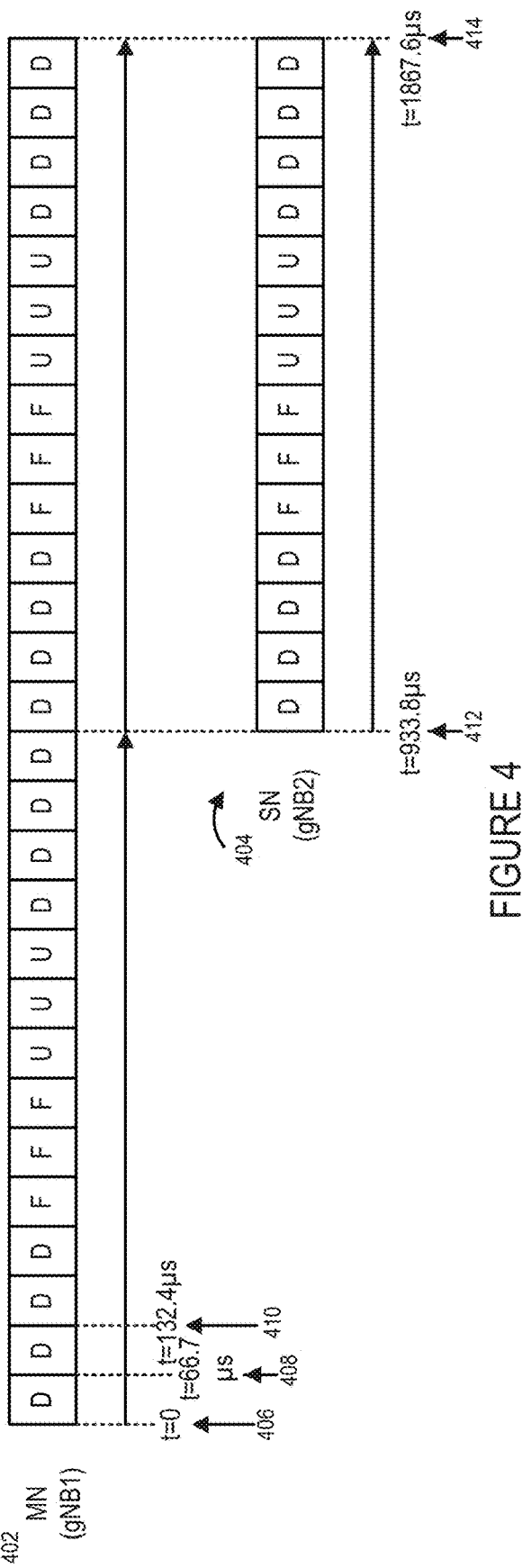
FIG. 4 is a drawing illustrating exemplary controlled slot boundary synchronization between a TDD configuration of a master node (MN) base station, e.g. gNB1, and a TDD configuration of a corresponding secondary node (SN) base station, e.g. gNB2, with regard to dual connectively for a user equipment (UE), in accordance with an exemplary embodiment of the present invention, resulting in dual connectivity (DC) operation for a UE without an IDC problem.

FIG. 4 is a drawing 400 illustrating exemplary controlled slot boundary synchronization between a TDD configuration of a master node (MN) base station, e.g., gNB1, and TDD configuration of secondary node (SN) base station, e.g., gNB2, with regard to dual connectively for a user equipment (UE). Drawing 402 of drawing 400 illustrates an exemplary recurring TDD configuration corresponding to an MN, e.g., gNB1, while illustrates two iterations (two slots) of a repeating pattern (D, D, D, F, F, F, U, U, U, D, D, D, D) of 14 successive symbols, each symbol having a duration of 66.7 µs. The first symbol starts at start time 406, which is t=0. The second symbol starts at time 408, which is t=66.7 µs. The third symbol starts at time 410, which is t=132.4 µs.

The MN decides to add an SN, e.g., to make more air link resources available to satisfy the level of service required by the UE, which supports dual connectivity.

The MN sends Tinfo, e.g., including a Tstart time and information identifying a clock, e.g., grandmaster atomic clock, used by the MN (gNB1) as its reference, to a selected secondary node, e.g., SN (gNB2). In various embodiments, the Tinfo is sent to a MN selected SN, as a novel information element (IE) included in an SN addition request message. The SN receiving the Tinfo, uses the Tinfo to perform slot and/or symbol alignment between the MN and SN. In some embodiments, prior to the SN addition request the SN has been using a different master clock than the master clock used by the MN for its reference, and as a result of the Tinfo, the SN changes the master clock that it uses as its reference (for communication with the UE), to the master clock being used by the MN. MN slot start time information, also communicated in the Tinfo, is used by the SN to align the start of the SN slot with the start of the MN slot. Thus, based on received Tinfo the SN sets or adjusts its slot and/or symbol timing/alignment, e.g., to match the MN, with regard to communications with the UE.

Drawing 404 of drawing 400 illustrates an exemplary recurring TDD configuration corresponding to the selected SN, e.g., gNB2, which illustrates one iteration (one slot) of the repeating pattern (D, D, D, F, F, F, U, U, U, D, D, D, D) of 14 successive symbols, each symbol having a duration of 66.7 µs. Note that at time 412 t=933.8 µs, the second slot for MN (gNB1) communications with the UE starts, and the first slot for newly added SN (gNB2) communications with the UE starts. At time 414 t=1867.6 µs, the second slot for MN (gNB1) communications with the UE ends, and the first slot for newly added SN (gNB2) communication with the UE ends. In various embodiments, the selection by the MN for an upcoming U symbol is communicated to the SN in advance, so that the SN can match the MNs selection.

In some embodiments, the MN communicates with the UE using one or more channels of a first band of unlicensed spectrum, e.g., 5 GHz n46, and the SN communicates, e.g., concurrently with the UE using one or more channels of a second band of unlicensed spectrum, e.g., 6 GHz n96, with the UE operating in dual connectivity mode. The setting or adjustment of the SN timing to intentionally align with the MN timing and the controlled matching of the recurring TDD configuration, e.g. pattern of downlink (D), flexible (F), and uplink (U) symbols in a slot, is beneficial in that the downlink or uplink with regard to the SN can be controlled to match the downlink or uplink of the MN, thus preventing a in-device coexistence (IDC) problem in the UE, which could otherwise result if downlink or uplink did not match between MN and SN with regard to the UE.

Figure 5:
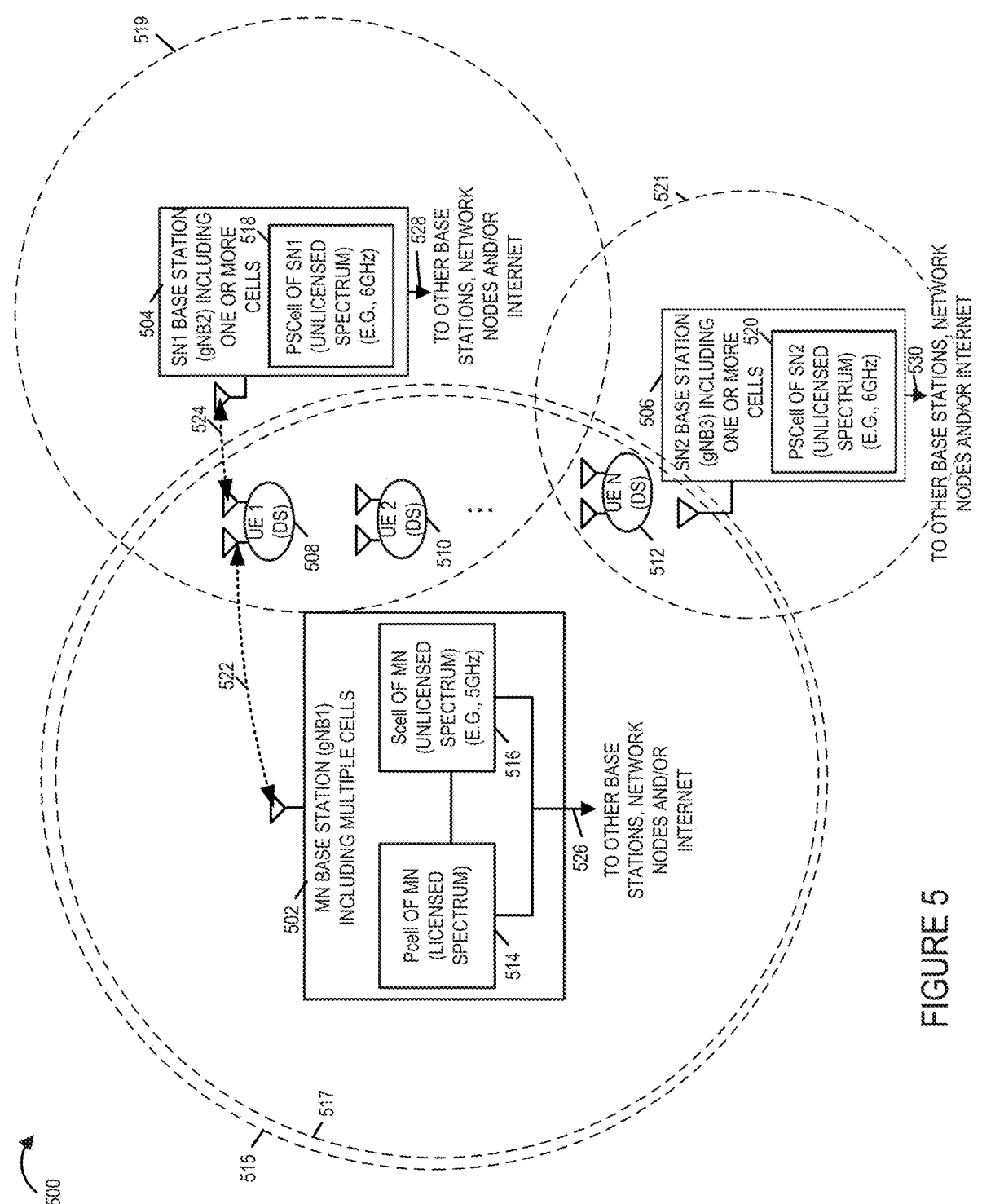
FIG. 5 is a drawing of an exemplary communications system in accordance with an exemplary embodiment.

FIG. 5 is a drawing of an exemplary communications system 500 in accordance with an exemplary embodiment. Exemplary communications system 500 includes a plurality of base stations including gNB1 502, gNB2 504, gNB3 506, coupled together, e.g., via a backhaul network and connections (526, 528, 530). The exemplary communications system 500 further including a plurality of user equipment (UE) devices including a plurality of dual SIM (DS) UEs including UE 1 508, UE 2 510 and UE N 512. The DS UEs (508, 510, . . . , 512) support dual connectivity. The first base station, gNB1 502, serves as a master node (MN) and includes multiple cells. The multiple cells include a Primary Cell (PCell) 514 of the MN which uses licensed spectrum, and a Secondary Cell (SCell) 516 of the MN, which uses a first band of unlicensed spectrum, e.g., a 5 GHz n48 band.

The second base station, gNB2 504, can, and sometimes does, serve as a secondary node (SN), e.g., SN1, with regard to the MN. The second base station, gNB2 504, referred to as SN1, includes one or more cells including Primary Secondary Cell (PSCell) 518 of SN1, which uses a second unlicensed band, e.g., 6 GHz n96.

The third base station, gNB3 506, can, and sometimes does, serve as a secondary node (SN), e.g., SN2, with regard to the MN. The third base station, gNB3 506, referred to as SN2, includes one or more cells including, e.g., Primary Secondary Cell (PSCell) 520 of SN2, which uses a second unlicensed band, e.g., 6 GHz n96.

Each cell has a corresponding wireless coverage area. PCell 514 of MN 502 has wireless coverage area 515. SCell 516 of MN 502 has wireless coverage area 517. PSCell 518 of SN1 504 has wireless coverage area 519. PSCell 520 of SN2 506 has wireless coverage area 521.

Exemplary UE 1 508 is communicating with PCell 514 of MN 502 using one or more channels of licensed spectrum (e.g., n48 band spectrum) and is communicating with SCell 516 of MN 502 using one or more channels of a first band of unlicensed spectrum (e.g., 5 GHz n46 band) as part of carrier aggregation (CA) operations. Exemplary wireless signals 522 represent the wireless signals between the MN (gNB1) 502 and UE 1508.

Exemplary UE 1 508 is also communicating with PSCell 518 of SN1 504 using one or more channels of a second band of unlicensed spectrum (e.g., 6 GHz n96 band spectrum), as part of dual connectivity (DC) operations. Exemplary wireless signals 524 represent the wireless signals between the SN1 (gNB2) 504 and UE 1 508.

In accordance with features of an exemplary embodiment, SN1 504, which has been added by MN 502, e.g., via an SN addition request, is controlled operate to prevent in-device coexistence problems for UE 1 508, with regard to the two unlicensed frequency bands (e.g., n46 and n96), while operating in dual connectivity mode.

In some embodiments, the SN addition request includes a novel Tinfo IE including an MN slot start time and information identifying a master clock reference used by the MN. SN1 504 uses the received Tinfo to set or align slot start time and/or symbol timing such that downlink and uplink symbols are synchronized, e.g., matched, between MN 502 and SN1 504 with regard to UE1 508 communications, thus eliminating an IDC problem at the UE with regard to the two bands of unlicensed spectrum.

In some embodiments, a UE, e.g., UE 1 508 communicates device capability information to the MN 502, said device capability information including information indicating a minimum amount of required frequency separation between CA or DC for preventing an IDC problem. In some such embodiments, the SN addition request, from the MN 502 to a selected SN, e.g., SN1 504 includes a novel IE including information indicating a minimum frequency separation to prevent an IDC problem and in some embodiments, a reference baseline frequency. In some embodiments the minimum frequency separation value communicated in the SN addition request is the value received from UE 1 508. In some embodiments the minimum frequency separation value communicated in the SN addition request is a value based on received device capability information from a plurality of UEs, e.g., the highest value (worst case value) from the set of UEs (UE 1 508, UE 2 510, . . . UE N 512) being serviced by MN 502. In some embodiments, the baseline reference frequency is the highest frequency being used by the UE1 508 in a first unlicensed frequency band (e.g., 5 GHz n46). The SN, e.g., SN 1 504, receiving the SN addition request from MN 502 including the IE communicating the information indicating a required minimum frequency separation to avoid an IDC problem, uses the information to select one or more channels (which at least satisfy the minimum frequency separation requirement) to be used for communications between SN1 504 and UE 1 508 in a second unlicensed frequency band (e.g., n96). Thus, SN1 504 operates using selected frequencies of a second unlicensed band (e.g., n96) which will not result in an IDC problem at the UE 1 508 with regard to concurrent communications between the MN 502 and UE 1 508, which are using particular frequencies of a first unlicensed band (e.g., n46).

In some other exemplary embodiments, a UE, e.g., UE 1 508, obtains TDD configuration information from both the MN 502 and a selected SN, e.g., SN 1 504. The UE, e.g., UE1 508 compares the two TDDs, identifying downlink slots within the SN TDD configuration which overlap with the downlink slots within the MN TDD configuration. The UE, e.g., UE1 508 also compares the two TDDs, identifying uplink slots within the SN TDD configuration which overlap with the uplink slots within the MN TDD configuration. The UE1 508 generates a set of preferred SN1 downlink slots (which are the matching downlink slots) and generates a set of preferred SN1 uplink slots (which are the matching uplink slots), and communicates the preferred DL and/or UL slot information to SN1 504, e.g., via one or more novel IEs in a UE assistance information message sent from the UE 1 508 to SN1 504. The SN 1 504 attempts to accommodate the UE preferences, e.g., establishing a TDD structure for communications with UE 1 508 which uses one or more of the UE indicated preferred slots. The SN1 504 communicates with the UE 1 508, using the established TDD structure, which uses UE preferred slots, and intentionally refrains from using slots which are not preferred and which could cause IDC problems if used. Thus, the UE 1 508 is able to communicate with MN using a first unlicensed spectrum (e.g., n46) while concurrently communicating with SN1 using a second unlicensed spectrum (e.g., n96) without experiencing IDC problems.

Figure 6:
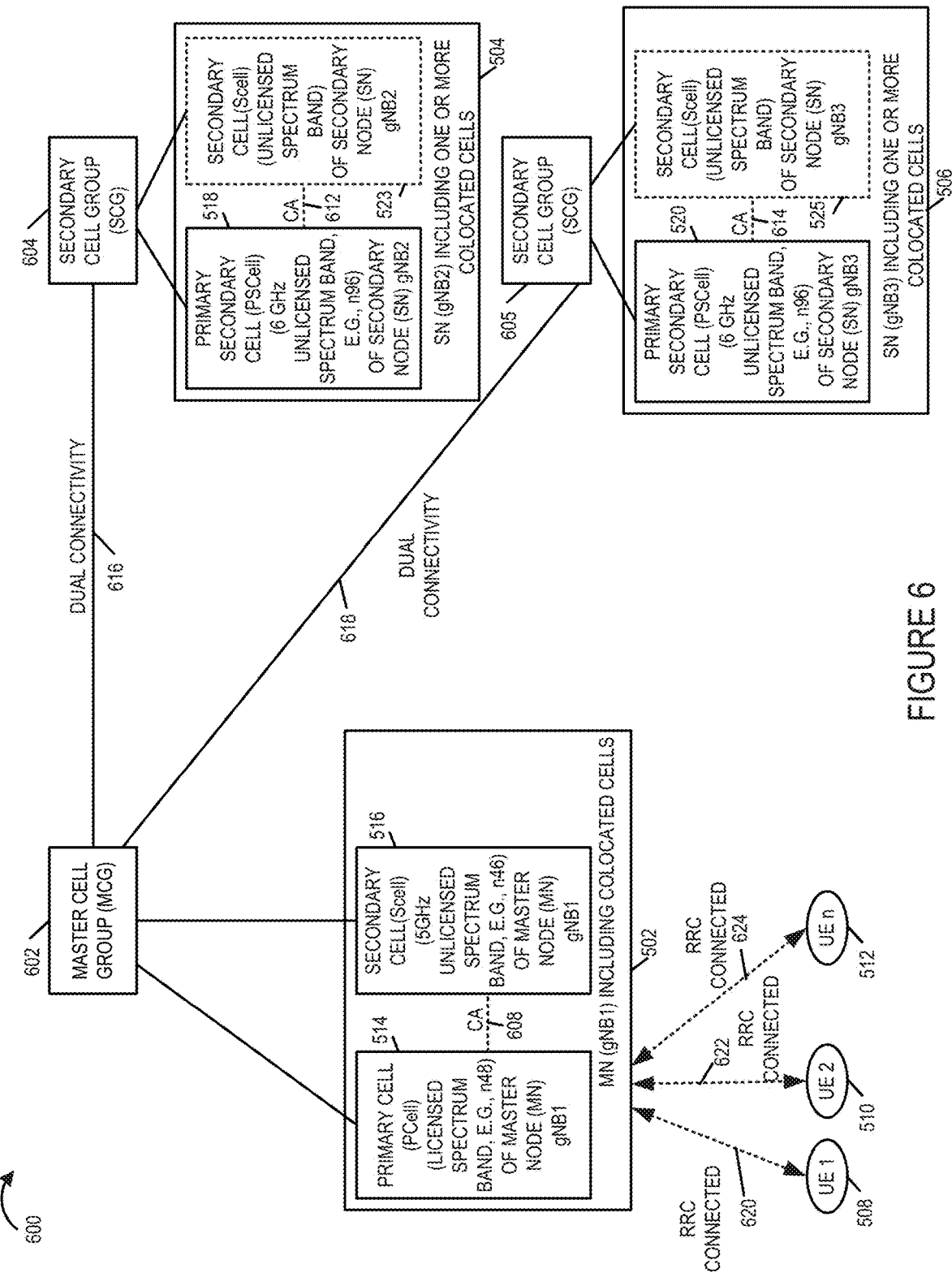
FIG. 6 is a drawing illustrating an exemplary communications system, exemplary cell groupings, and further illustrating potential carrier aggregation and dual connectivity.

FIG. 6 is a drawing 600 illustrating an exemplary communications system, exemplary cell groupings, and further illustrating potential carrier aggregation and dual connectivity. The exemplary communications system of FIG. 6 includes a plurality gNB base stations including gNB1 502, gNB2 504, and gNB3 506. The exemplary communications system of FIG. 6 further includes a plurality of user equipments (UEs), supporting dual connectivity including UE1 508, UE2 510 and UEn 512.

Base station gNB1 502 is a master node (MN). MN (gNB1) 502 includes collocated cells. MN (gNB1) 502 includes a primary cell (PCell) 514 using a licensed spectrum band, e.g., n48, and a secondary cell (Scell) 516 using a 5 GHz unlicensed spectrum band, e.g., n46. Primary cell (PCell) 514 and secondary cell (SCell) 516 are part of Master Cell Group (MCG) 602.

Base station gNB2 504 is a secondary node (SN). SN (gNB2) 504 includes one or more collocated cells. SN (gNB2) 504 includes a Primary Secondary Cell (PSCell) 518 using a 6 GHz unlicensed spectrum band, e.g., n96, and in some embodiments, a Secondary Cell (Scell) 523 using another unlicensed spectrum band. PSCell 518 and SCell 523 are part of secondary cell group (SCG) 604.

Base station gNB3 505 is a secondary node (SN). SN (gNB3) 506 includes one or more collocated cells. SN (gNB3) 506 includes a Primary Secondary Cell (PSCell) 520 using a 6 GHz unlicensed spectrum band, e.g., n96, and in some embodiments, a Secondary Cell (Scell) 525 using another unlicensed spectrum band. PSCell 520 and SCell 525 are part of secondary cell group (SCG) 605.

UE 1 508, UE 2 510, and UE n 512 are each RRC connected to PCell of MN (gNB1) 502, as indicated by bi-directions dotted line arrows (620, 622, 624), respectively. There can be, and sometimes is, Carrier Aggregation (CA) with regard to spectrum of PCell 514 and spectrum of SCell 516, as indicated by dotted line 608. Carrier Aggregation (CA), can be, and sometimes is, used to allow a UE, e.g., UE 1 508 to communicate with both PCell 514 and SCell 516 of MN 502.

There can be, and sometimes is, Carrier Aggregation (CA) with regard to spectrum of PSCell 518 and spectrum of SCell 523, as indicated by dotted line 612. There can be, and sometimes is, Carrier Aggregation (CA) with regard to spectrum of PSCell 520 and spectrum of SCell 525, as indicated by dotted line 614.

There can be, and sometimes is, dual connectivity operation for a UE, with regard to the master cell group and secondary cell group 604 as indicated by line 616. There can be, and sometimes is, dual connectivity operation for a UE, with regard to the master cell group 602 and secondary cell group 605 as indicated by line 618.

Figure 7:
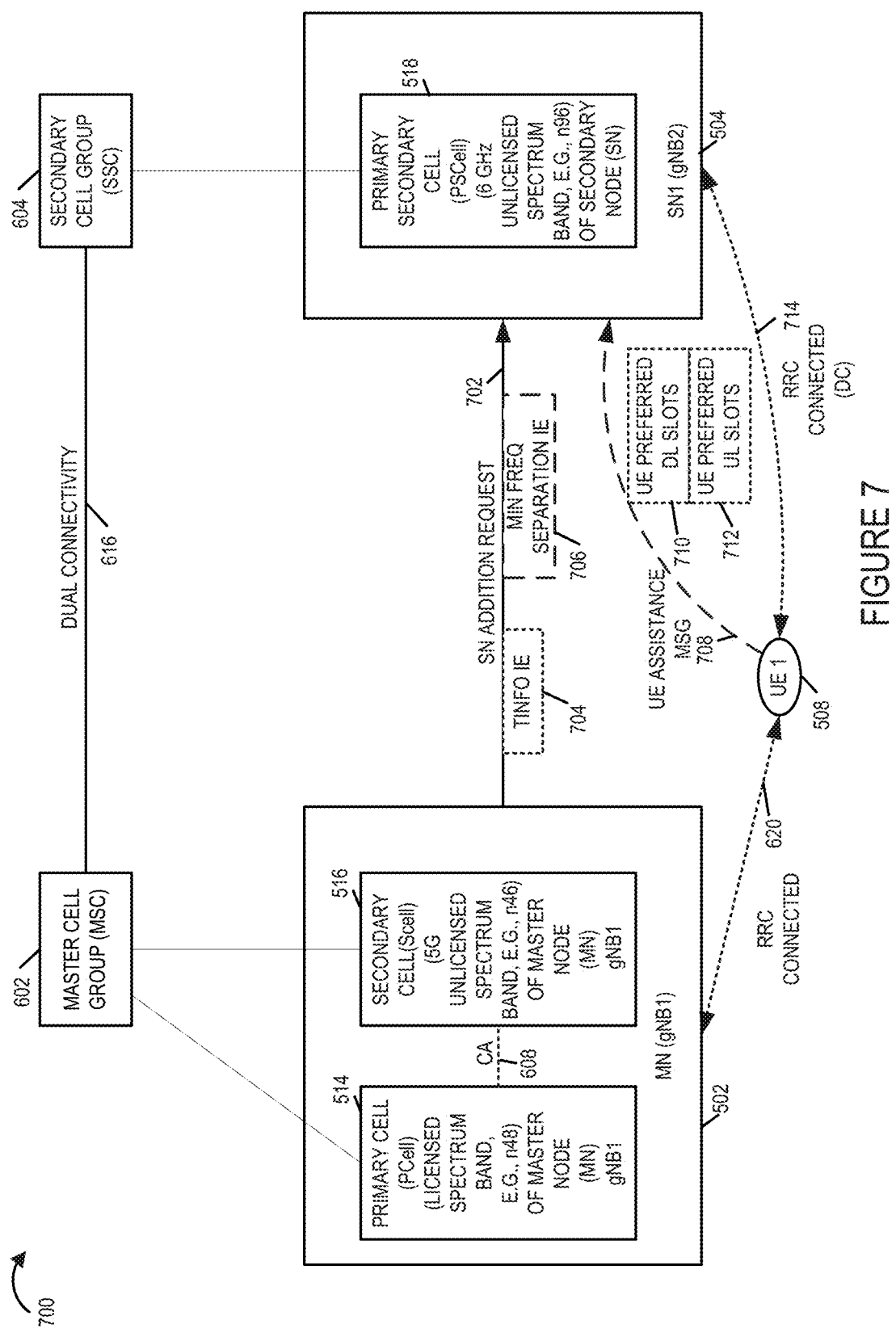
FIG. 7 is a drawing illustrating an exemplary communications system, exemplary cell groupings, exemplary novel signaling, in accordance with various embodiments of the present invention, and further illustrating carrier aggregation and dual connectivity operations.

FIG. 7 is a drawing 700 illustrating an exemplary communications system, exemplary cell groupings, exemplary novel signaling, in accordance with various embodiments of the present invention, and further illustrating carrier aggregation and dual connectivity operations. The exemplary communications system of FIG. 7, which is a simplified version of the system of FIG. 6, includes gNB1 502, gNB2 504 and UE 1 508, which supporting dual connectivity (DC) operations, is used to illustrate various features of various embodiments of the present invention. Consider that UE 1 508 is RRC connected to MN (gNB1) 502 communicating via PCell 514 using one or more channels of a licensed spectrum band, e.g., n48.

The MN 502 decides, e.g., based on available air link resources of PCell 514 and resource needs of UE 1 508, to implement carrier aggregation (CA) operations for UE 1, e.g., assigning UE1 508 air link resources, e.g., a channel, of SCell 516 unlicensed spectrum, e.g., in a n46 band. Thus, the UE1 508 subsequently communicates with PCell 514 of MN 502 using a licensed spectrum and SCell 516 of MN 502 using unlicensed spectrum.

The MN 502 subsequently decides, e.g., based on available air link resources of PCell 514, available air link resources of SCell 516 and resource needs of UE 1 508, to implement dual connectivity (DC) operation for UE 1. The MN 502 selects, based on measurements reports from UE1 508, a particular Secondary Node, e.g., SN1 (gNB2) 504, e.g., from among a plurality of alternative SNs. MN 502 generates and sends an SN addition request 702 to the selected SN, which is SN1(gNB2) 504. In some embodiments, the SN addition request 702 includes a novel Tinfo information element (IE) including a start time, e.g., slot start time for the MN TDD configuration, and information indicating a master clock being used by the MN. In some embodiments, the SN addition request 702 includes a novel information element (IE) including information indicating a minimum required frequency separation (based on UE1 508 deice capability information), e.g., for CA or DC, to avoid an IDC problem. In some embodiments, the UE 1 508 sends a UE assistance message 708 to SN 1 (gNB2) 504 which includes information, e.g., a novel IE, identifying UE preferred DL slots 710 and information, e.g., a novel IE, identifying UE preferred UL slots 712. The SN 504 uses the received information, e.g. Tinfo, minimum frequency separation information, or information identifying preferred DL and UL slots, to perform operations, e.g. adjust or set slot and/or symbol timing with regard to the PSCell 518 to synchronize with respect to the SCell 516 of the MN 502, to select a channel in the unlicensed spectrum of PSCell 518 to use which satisfies the minimum frequency separation from the channel being used in the Scell 516 of the MN 502, or to select preferred DL and/or UL slots to use for PSCell 518 which will match DL and/or UL slots being used by SCell 516 of MN 502. The operations performed, based on the received information, e.g., Tinfo, minimum frequency separation information, or information identifying preferred DL and UL slots, allows the SN1 502 to communicate with UE 1 508, as part of DC operations without causing an IDC problem, with regard to concurrent UE 1 508 communications with SCell 516 of MN 502.

UE1 508 subsequently communicates with PCell 514 of MN 502 using a licensed spectrum band (e.g., n48) and SCell 516 of MN 502 using one or more channels of a first unlicensed spectrum band (e.g., n46), e.g., as part of CA operations (see signaling 620), and the UE1 508 communicates with PSCell 518 of SN1 502 using one or more channels of a second unlicensed spectrum band (e.g., n96), as part of DC operations (see signaling 714).

Figure 8A:
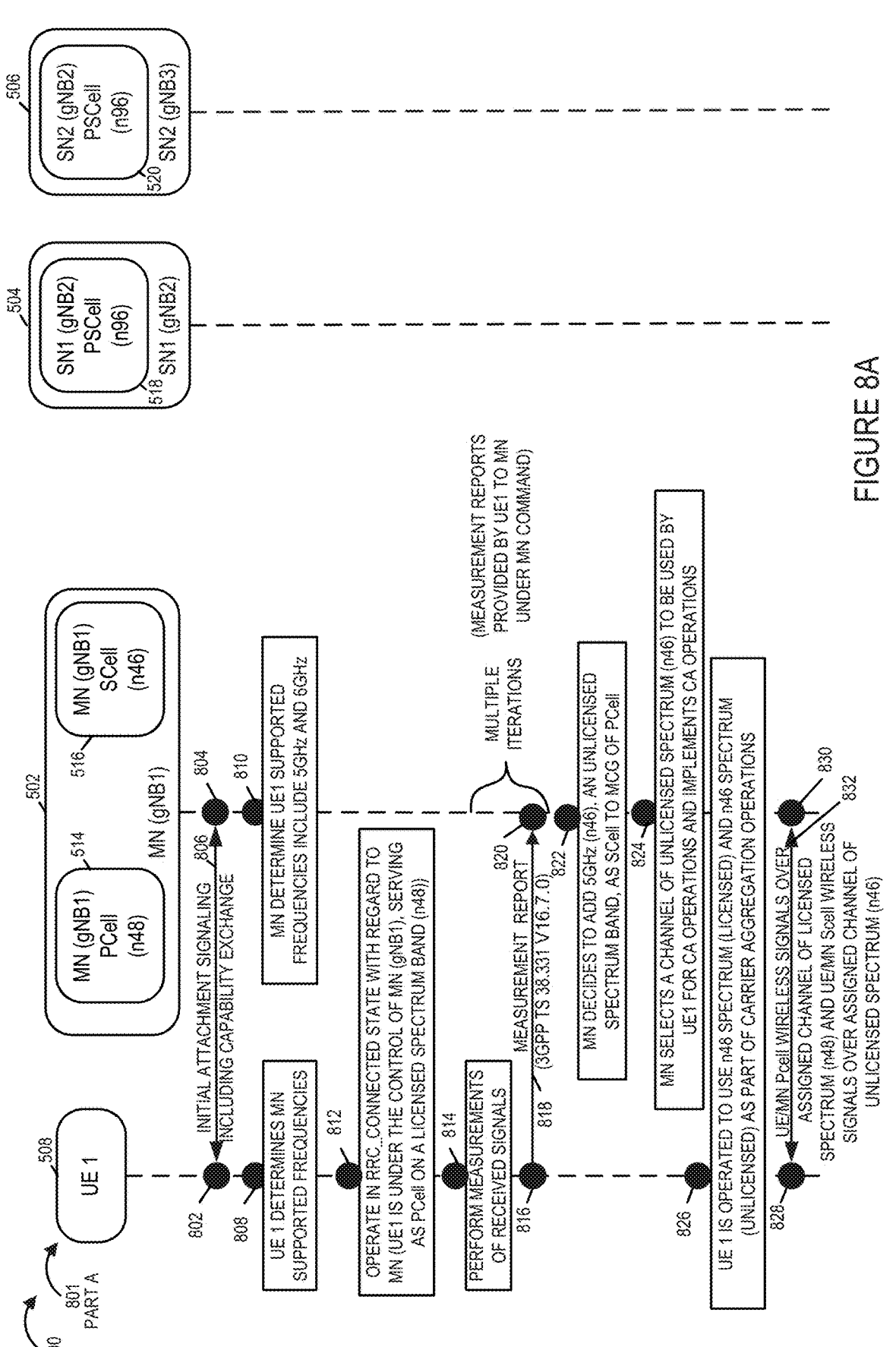
FIG. 8A is a first part of a signaling diagram of an exemplary communications method, in which an in-device co-existence (IDC) problem for a UE, operating in dual connectivity mode and using unlicensed spectrum, is avoided via slot and/or symbol timing synchronization of a secondary node TDD configuration to a master node TDD configuration, in accordance with an exemplary embodiment.
Figure 8B:
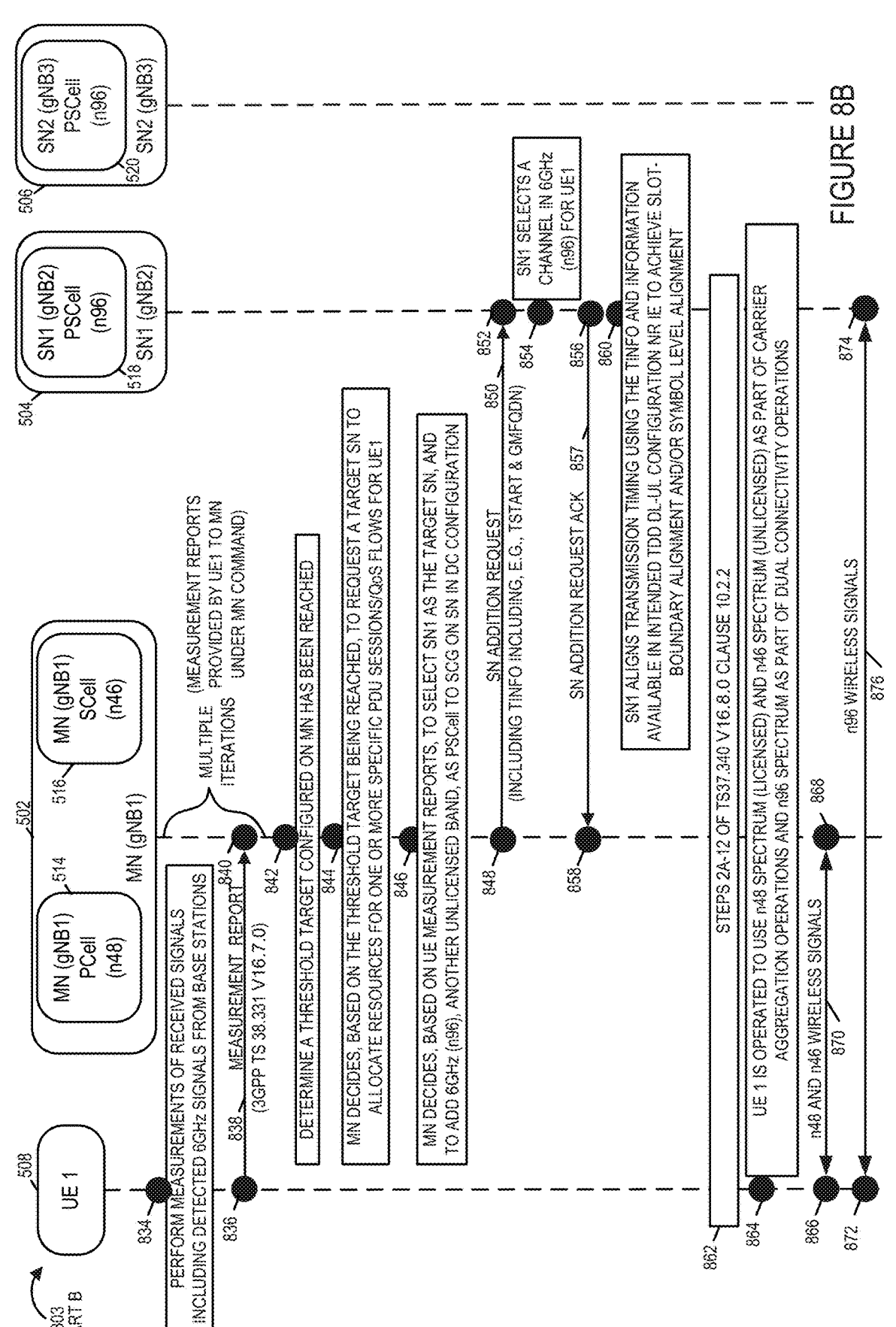
FIG. 8B is a second part of a signaling diagram of an exemplary communications method, in which an in-device co-existence (IDC) problem for a UE, operating in dual connectivity mode and using unlicensed spectrum, is avoided via slot and/or symbol timing synchronization of a secondary node TDD configuration to a master node TDD configuration, in accordance with an exemplary embodiment.

FIG. 8, comprising the combination of FIG. 8A and FIG. 8B, is a signaling diagram 800 of an exemplary communications method, in which an in-device co-existence (IDC) problem for a UE, operating in dual connectivity mode and using unlicensed spectrum, is avoided via slot and/or symbol timing synchronization of a secondary node TDD configuration to a master node TDD configuration, in accordance with an exemplary embodiment.

In step 802 and 804 UE 1 508 and the master node (MN) 502, which is gNB1, communicate, e.g., receive and transmit, initial attachment signaling 806 including capability information. Thus, device capability information is exchanged between UE 1 508 and MN 502 as part of initial attachment operations. In step 808 UE 1 508 determines MN 502 supported frequencies. In step 810 MN 502 determines UE 1 508 supported frequencies include 5 GHz and 6 GHz. In step 812 UE 508 is operated in RRC_Connected state with regard to MN. UE 1 508 is under the control of MN (gNB1), serving a PCell on a licensed spectrum band (n48). In step 814 UE 1 performs measurement of received signals, e.g., from one or more base stations. In step 816 UE 1 508 generates and sends a measurement report 818 to MN (gNB1) 502 based on the measurements of the received signals. In some embodiments, the measurement report 818 is in accordance with 3GPP TS 38.331 V16.7.0. In step 820 the MN (gNB1) 502 receives the communicated measurement report 818 and recovers the communicated information. Multiple iterations of steps 814, 816 and 820 are performed. Thus, measurements reports are provided by UE 1 508 to MN (gNB1) 502 under MN command.

In step 822 MN (gNB1) 502 decides to add 5 GHz (n46), an unlicensed spectrum band, as SCell to MCG of PCell. In step 824 the MN (gNB1) 502 selects a channel of unlicensed spectrum (n46) to be used for UE 1 508 for carrier aggregation (CA) operations and implements CA operations.

In step 826 the UE 1 508 is operated to use n48 spectrum (licensed) and n46 spectrum (unlicensed) as part of carrier aggregation operations. In step 828 and step 830 UE 1 508 and MN (gNB 1) 502 are operated to send and receive wireless signals 832. The wireless signals include UE1/MN PCell wireless signals over assigned channel of licensed spectrum (n48) and UE1/MN SCell wireless signals over assigned channel of unlicensed spectrum (n46). Thus, in step 830 MN (gNB1) 502 communicates with UE1 508 using both licensed spectrum (n48) and unlicensed spectrum (n46) as part of carrier aggregation (CA) operations.

In step 834 UE 1 performs measurements of received signals including detected 6 GHz signals from base stations. In step 836 UE 1 508 generates and sends a measurement report 838 to MN (gNB1) 502 based on the measurements of the received signals. In some embodiments, the measurement report 838 is in accordance with 3GPP TS 38.331 V16.7.0. In step 840 the MN (gNB1) 502 receives the communicated measurement report 838 and recovers the communicated information. Multiple iterations of steps 834, 836 and 840 are performed. Thus, measurements reports 838 are provided by UE 1 508 to MN (gNB1) 502 under MN command.

In step 842 the MN (gNB1) 502 determines that a threshold target configured on the MN has been reached. In some embodiments, the threshold target is an air link resource target. In some embodiments, the licensed spectrum (n48) and unlicensed spectrum (n46) being used as part of CA operation for communications between MN (gNB1) 502 and UE1 508 are congested. In step 844, the MN (gNB1) 502 decides, based on the threshold target having been reached, to request a target secondary node (SN) to allocate resources for one or more specific protocol data unit (PDU) session/Quality of Service (QoS) flows for UE 1 508. In some embodiments, the MN (gNB1) 502 is unable to allocate enough air link resources to UE1 508 to satisfy the airlink resource needs of UE1 508 to maintain a QoS level to which UE1 508 subscribes without requesting a secondary node to allocate resource to UE1 508.

In step 846 the MN (gNB1) 502 decides, based on UE measurement reports, to select SN1 (gNB2) 504, e.g., from among a plurality of potential SNs including SN1 (gNB2) 504 and SN2 (gNB3) 506, as the target SN to which an SN addition request (850) is to be sent, and to add 6 GHz (n96), another unlicensed band, as PSCell to SCG on SN in DC configuration. In various embodiments, a UE1 measurement report 838, upon which the selection of step 846 is based, indicates that UE1 508 has detected as signal in a second unlicensed frequency band (e.g., n96) from SN1 504 having a received power level at or above a minimum acceptance level. In some embodiments SN1 504 is selected in step 846 from among a plurality of alternative nodes (SN1 504, SN2 506) operating in the second unlicensed frequency band (e.g., n96).

In step 848 MN (gNB1) 502 generates and send SN addition request message 850 including Tinfo including, e.g., Tstart and GMFQDN, to SN1 (gNB2) 504. In various embodiments, the SN addition request 850 include and information element (IE) Tinfo, which his exchanged between MN (gNB1) 502 and SN1 (gNB2) 504 during Secondary—Next Generation Radio Access Network (S-NG-RAN) Node Addition Preparation operations. In some embodiments, the Information Element (IE) Tinfo includes Tstart, where Tstart is the Transmission Start Time in Universal Coordinated (UTC), representing the time the MN (gNB1) 502 started its transmission to UE1 508. In some embodiments the IE Tinfo includes GMFQDN, where GMFQDN is the Fully Qualified Domain Name (FQDN) of GrandMaster atomic clock used by the MN (gNB1) 502

In step 852 SN1 (gNB2) 504 receives the SN addition request 850 including Tinfo and recovers the communicated information. Thus, in step 852, SN1 (gNB2) 504 receives from MN (gNB1) 502 secondary node addition request 850 corresponding to UE 1 508, said addition request including timing information including at least one of: i) start time (TSTART) information or ii) Grand Master Fully Qualified Domain Name (GMFQDN) information, and recovers the communicated information.

In step 854 the SN1 (gNB2) 504 selects a channel in a second unlicensed frequency band, e.g., 6 GHz (n96), for UE1 508 to use. In step 856 SN1 (gNB2) 504 sends SN addition request acknowledgment 857 to MN (gNB1) 502 in response to the received SN addition request 850 including timing information. In step 858 the MN (gNB1) 502 receives the SN addition request acknowledgment 857.

In step 860 SN1 (gNB2) 504 aligns transmission timing using the Tinfo and information available in intended TDD DL-UL configuration NR IE to achieve slot-boundary alignment and/or symbol level alignment. Thus in step 860 SN1 (gNB2) 504 performs timing alignment (e.g., shifts of defines a slot boundary to align it with the start time indicated in the received timing information and/or shifts or defines a symbol boundary to aligns it with a start time indicated in the received timing information) at SN1 (gNB) 504 for transmission to the first UE to align transmission time for transmission to the first UE, said transmission timing including one or more of: i) slot boundary alignment or ii) symbol level alignment. In some embodiments, the timing alignment refers to SN1 504 Primary Secondary Cell (PSCell) 518 transmission timing for communication with UE 1 508 being aligned to MN 502 Secondary Cell (SCell) 516 transmission timing for communication with UE1 508. In some embodiments, the PSCell 518 of SN1 504 uses a second unlicensed band (e.g., 6 GHz—n96) and the SCell 516 of the MN 502 uses a first unlicensed band (e.g., 5 GHz—n46). In some embodiments, the first and second unlicensed bands are adjacent unlicensed bands.

In some embodiments, the step 860 of operating SN1 504 to perform timing alignment includes aligning downlink (DL) and uplink (UL) communications at SN1 504 with downlink (DL) and uplink (UL) communications at MN 502 and thereby avoid an in-device coexistence (IDC) problem (which would otherwise exist at UE1 508 due to concurrent UE1 508 communications with MN 502 using the first unlicensed band and SN1 504 using the second unlicensed band (e.g., overlap of DL communications to UE1 508 in one of the first and second unlicensed band with UL communications from the first UE in the other one of the first and second unlicensed bands.)) UE1 508 supports dual connectivity (DC). In various embodiments, UE1 508 includes a first Subscriber Identity Module (SIM) and a second SIM, e.g., the UE1 508 is a Dual SIM Dual Standby (DSDS) UE device, and the first SIM is used for communications with MN 502 and the second SIM is used for communication with SN1 504.

In some embodiments, the step 860 of operating SN1 504 to perform timing alignment at SN1 504 for transmissions to UE1 508 includes using the received timing information including in the SN addition request 850 to adjust timing at SN1 504 to align or more of: i) slot boundary at SN1 504 with a slot boundary at MN 502 and/or ii) symbol level boundaries at SN1 504 with symbol level boundaries at MN 502. In some embodiments, the step 860 of operating SN1 504 to perform timing alignment at SN1 504 for transmissions to UE1 508 includes using information available in intended TDD DL-UL confirmation NR information element to adjust timing at SN1 504 to align or more of: i) slot-boundary at SN1 504 with a slot boundary at MN 502 and/or ii) symbol level boundaries at SN1 504 with symbol level boundaries at MN 502.

In some embodiments, the MN (gNB1) 502 and SN1 (gNB2) 504 are originally timing synchronized to different grandmaster atomic clocks and the operation of step 860 of operating SN1 (gNB2) 504 to perform timing synchronization at SN1 504 includes synchronizing SN1 (gNB2) 504 to the grandmaster atomic clock being used by MN (gNB1) 502.

In some embodiments, the step 860 of operating SN1 (gNB2) 504 to perform timing alignment at SN1 (gnB2) 504 includes using the Tstart with information already available in Intended Time Division Duplexing Downlink-Uplink (TDD DL-UL) Configuration New Radio (NR) Information Element (IE) to align a slot boundary of SN1 504 with a slot boundary of MN 502 with regard to communications with UE1 508 and/or to align symbol level boundaries of SN1 504 with symbol level boundaries of MN 502 with regard to communications with UE1 508.

In step 862, steps 2A-12 of TS37.340 V16.8.0 October 2020 clause 10.2.2 are performed.

In step 864 UE 1 508 is operated to use n48 spectrum (licensed) and n46 spectrum (unlicensed) as part of carrier aggregation (CA) operations and n96 spectrum as part of dual connectivity (DC) operations. In steps 866 and 868 UE1 508 and MN (gNB1) 502 are operated to communicate, e.g., send and receive, n48 and n46 wireless signals 870. In steps 872 and 874 UE1 508 and SN1 (gNB2) 504 are operated to communicate, e.g., send and receive, n96 wireless signals 876. Thus, in step 874 SN1 (gNB2) 504 is operated to use the selected channel (e.g., in 6 GHz n96 unlicensed band) to communicate with UE1 508 as part of dual connectivity operations.

A second exemplary embodiment directed to solving previously described self-interference problem will now be described. The second exemplary embodiment utilizes UE capability information. A UE indicates a minimum frequency separation required by the UE such that a potential n46-n96 CA/DC avoids and In-device Co-existence (IDC) situation (problem). With regard to CA n46-n96: for CA, primary and secondary cells are collocated, hence the base station vendor can utilize the requested minimum frequency separation to avoid simultaneous TX/RX for the UE. With regard to DC n46-96: the capability information provided by the UE needs to be, and is, shared with secondary node. For instance, the primary node, provides the individual reported min frequencies from UEs (or a function of those values, e.g., a maximum of the reported values) to the secondary node. The capability information may be, and sometimes is, carried in one or more XnAP IEs, e.g., MR-DC Resource Coordination Information IE. There are related changes in S-NG-RAN node Addition Preparation and exchange of S-Node Addition Request.

In some exemplary embodiments, an MR-DC Resource Coordination IE, in accordance with the present invention, includes one or more novel Information Elements (IEs):

Min Frequency Separation IE:

Presence: O (Optional)

Description: minimum frequency separation (e.g., in units of 20 MHz) that is required between the shared-channel (unlicensed channel) of the M-Node and the channel of S-Node.

Reference Frequency IE:

Presence: O (Optional)

Description: frequency (e.g., a maximum frequency used) in shared-channel (unlicensed channel) of the M-Node to which the minimum frequency separation is to be applied to obtain a frequency (e.g., minimum frequency which may be used) of the S-Node for selecting the channel of S-Node.

In one exemplary embodiment, the master node (MN), e.g., MN 502, uses n46 unlicensed spectrum, the secondary node (SN), e.g., SN1 504, uses n96 unlicensed spectrum, and the MR-DC Resource Coordination IE, including the novel Min frequency separation IE and the Reference frequency IE, is included as part of a Secondary Node Addition Request sent from the MN to the SN in response to a UE's (e.g., UE1 508) resource needs. The SN (504) uses the minimum frequency separation information (specifying a min acceptable separation to avoid IDC problem) and the reference frequency information (specifying a maximum frequency being used in the n46 band for UE1 communications) to determine a minimum frequency (in the n96 band) which is acceptable to avoid an IDC problem for the UE (508). The SN (504) selects a channel in the n96 unlicensed band, which will operate in a range which satisfies the minimum frequency separation requirement, thus avoiding an IDC problem.

Figure 9A:
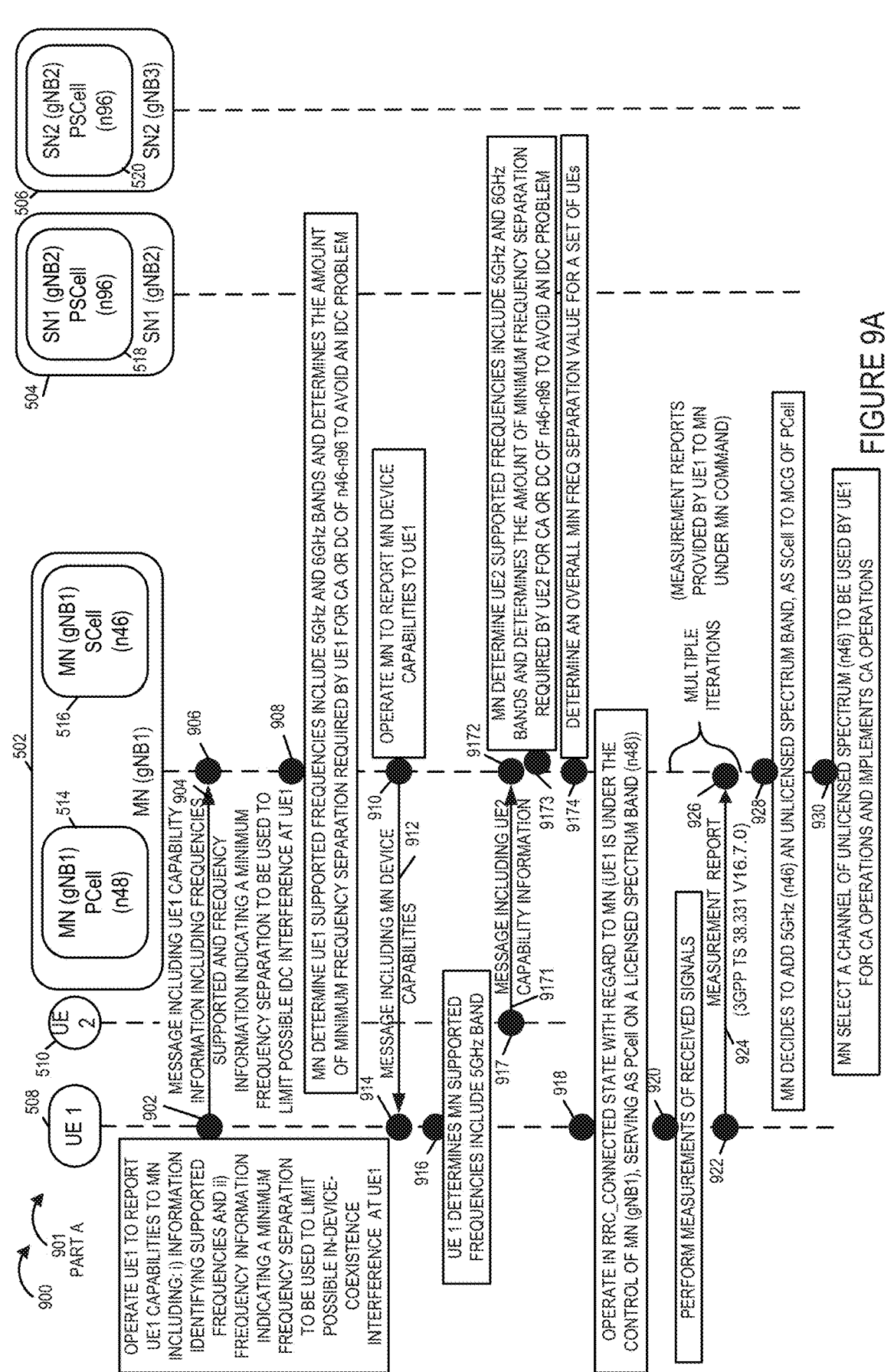
FIG. 9A is a first part of a signaling diagram of an exemplary communications method, in which an in-device co-existence (IDC) problem for a UE, operating in dual connectivity mode and using unlicensed spectrum, is avoided via communicating and using information indicating a minimum frequency separation, in accordance with an exemplary embodiment.
Figure 9B:
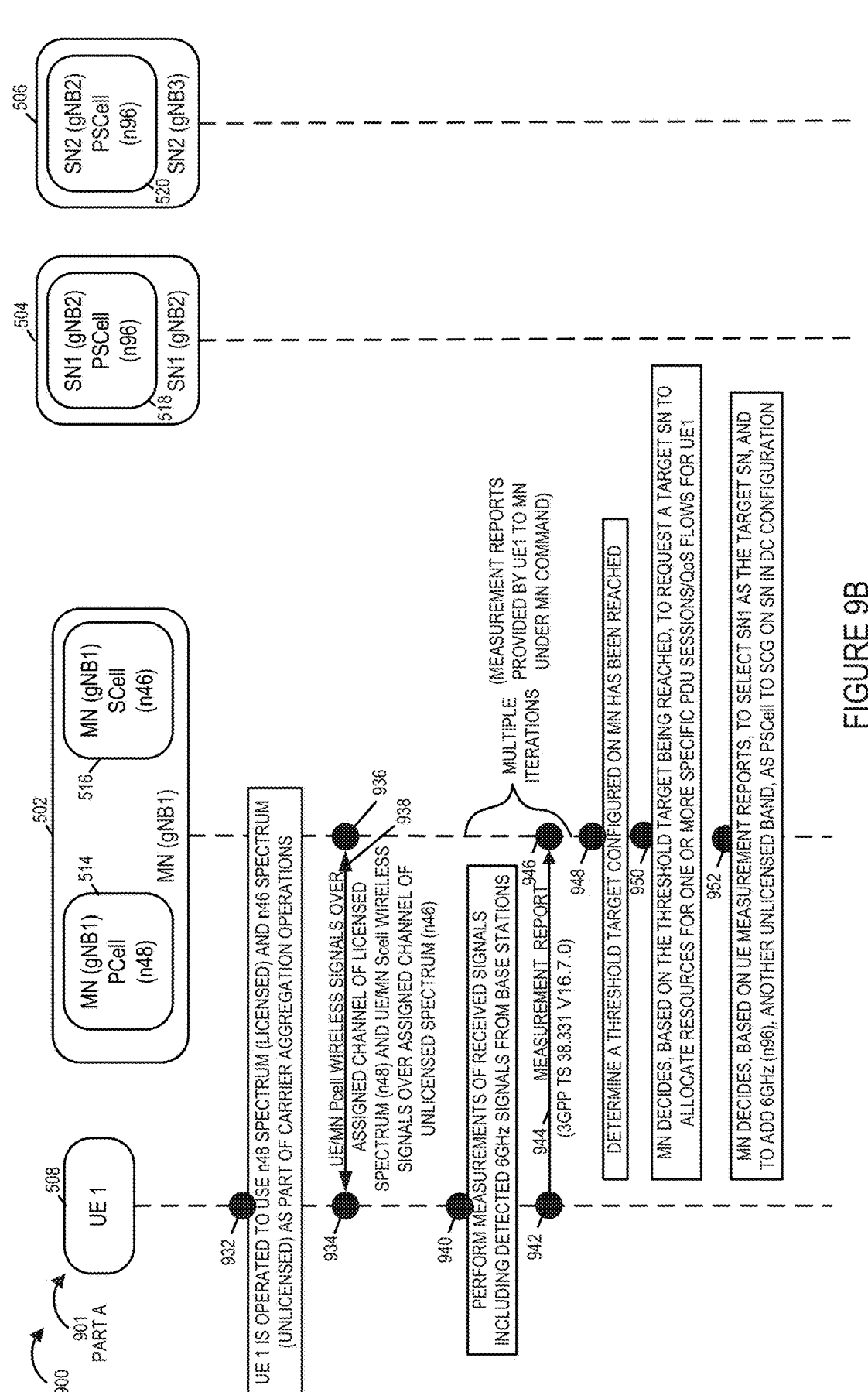
FIG. 9B is a second part of a signaling diagram of an exemplary communications method, in which an in-device co-existence (IDC) problem for a UE, operating in dual connectivity mode and using unlicensed spectrum, is avoided via communicating and using information indicating a minimum frequency separation, in accordance with an exemplary embodiment.
Figure 9C:
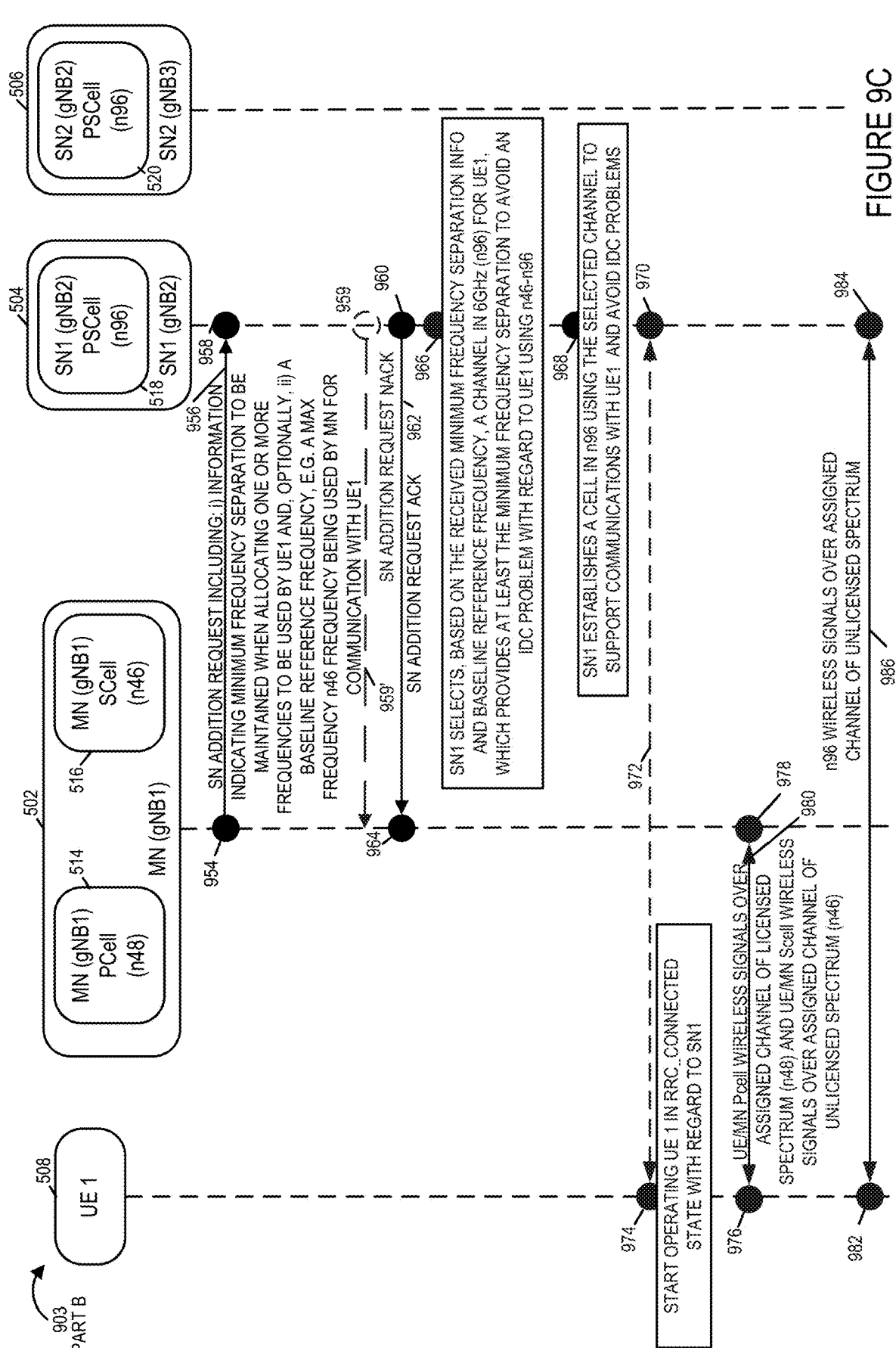
FIG. 9C is a third part of a signaling diagram of an exemplary communications method, in which an in-device co-existence (IDC) problem for a UE, operating in dual connectivity mode and using unlicensed spectrum, is avoided via communicating and using information indicating a minimum frequency separation, in accordance with an exemplary embodiment.
Figure 10A:
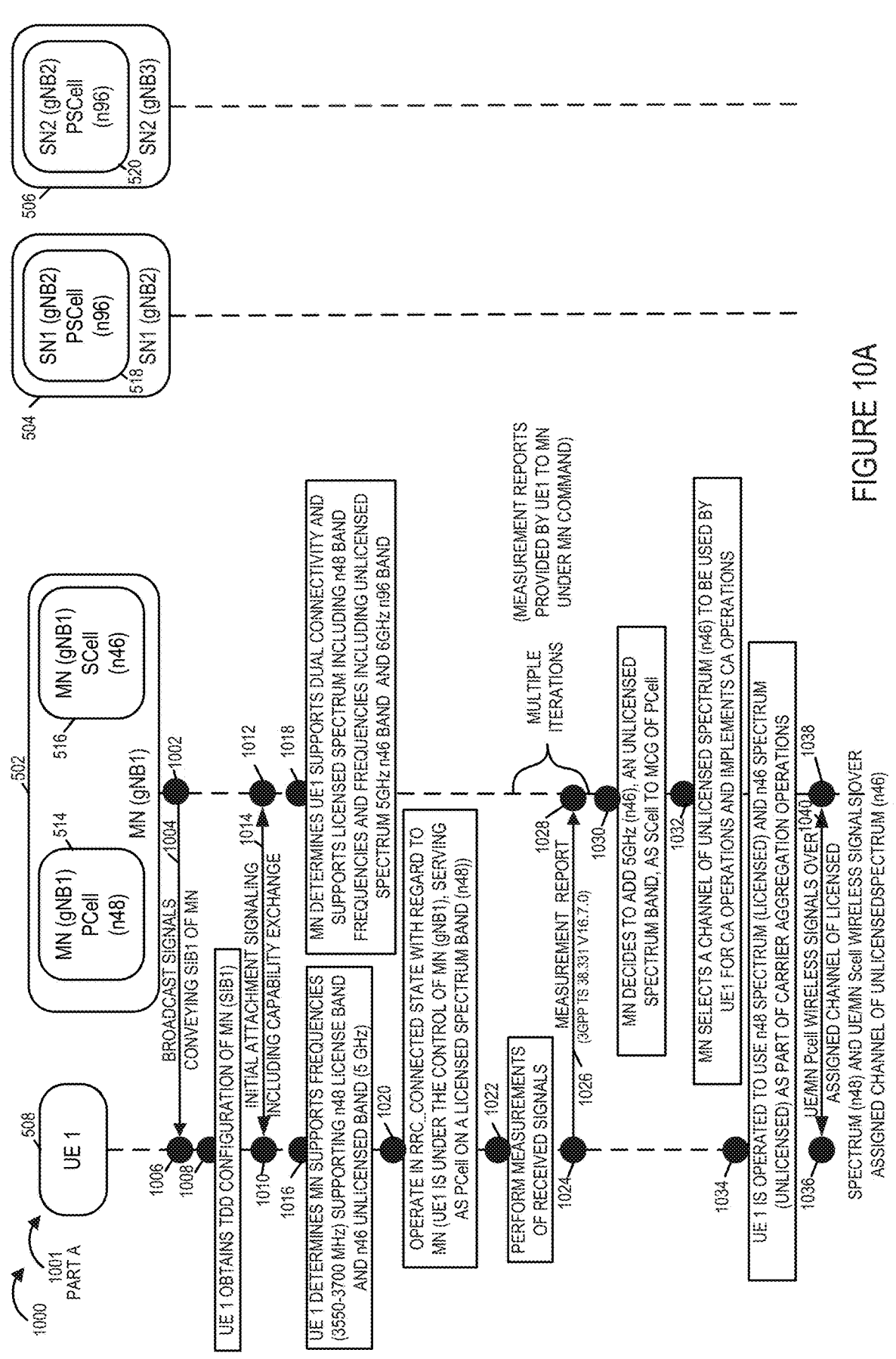
FIG. 10A is a first part of a signaling diagram of an exemplary communications method, in which an in-device co-existence (IDC) problem for a UE, operating in dual connectivity mode and using unlicensed spectrum, is avoided via identifying and using preferred secondary node downlink slots and preferred secondary node downlink slots, in accordance with an exemplary embodiment.
Figure 10B:
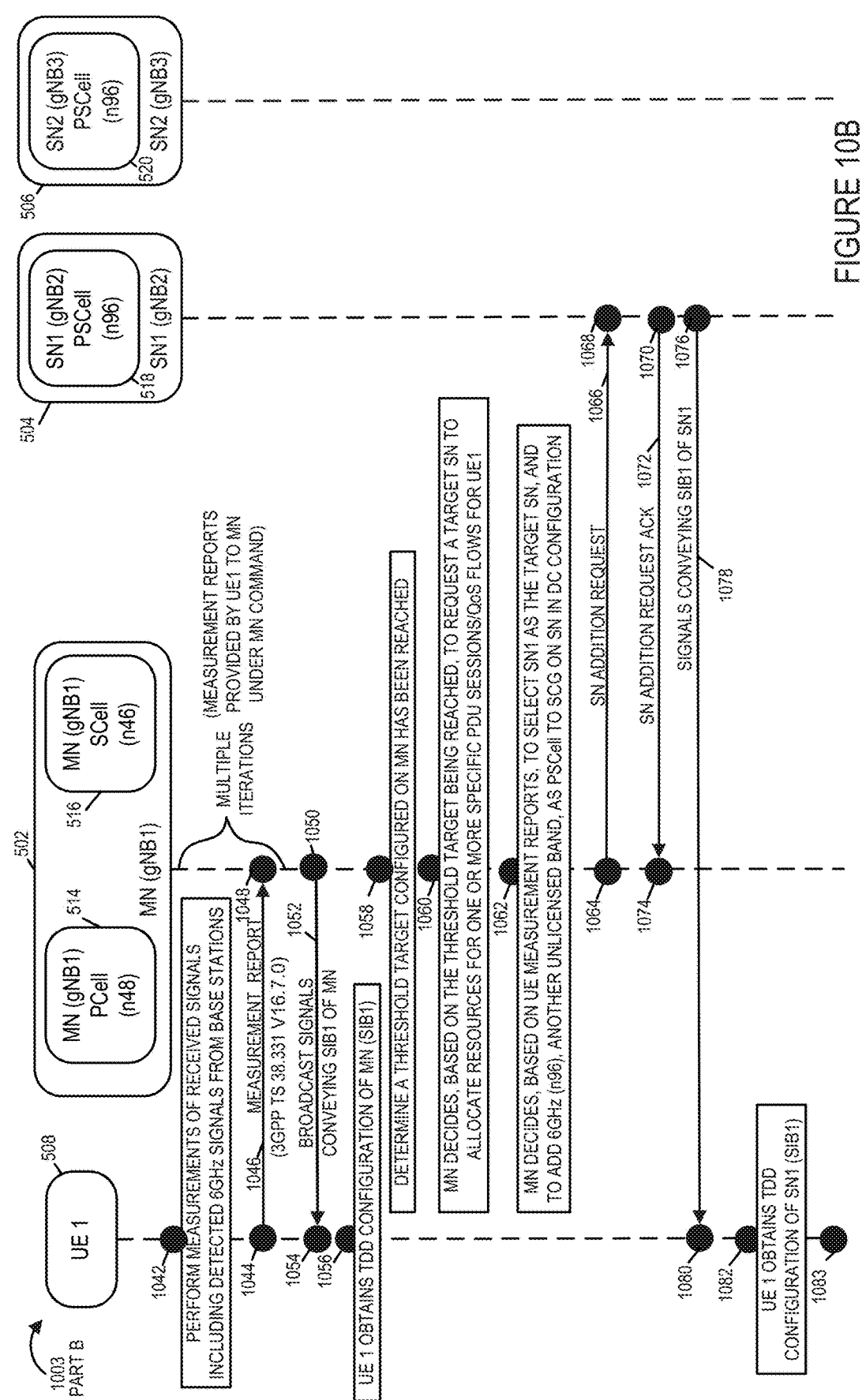
FIG. 10B is a second part of a signaling diagram of an exemplary communications method, in which an in-device co-existence (IDC) problem for a UE, operating in dual connectivity mode and using unlicensed spectrum, is avoided via identifying and using preferred secondary node downlink slots and preferred secondary node downlink slots, in accordance with an exemplary embodiment.
Figure 10C:
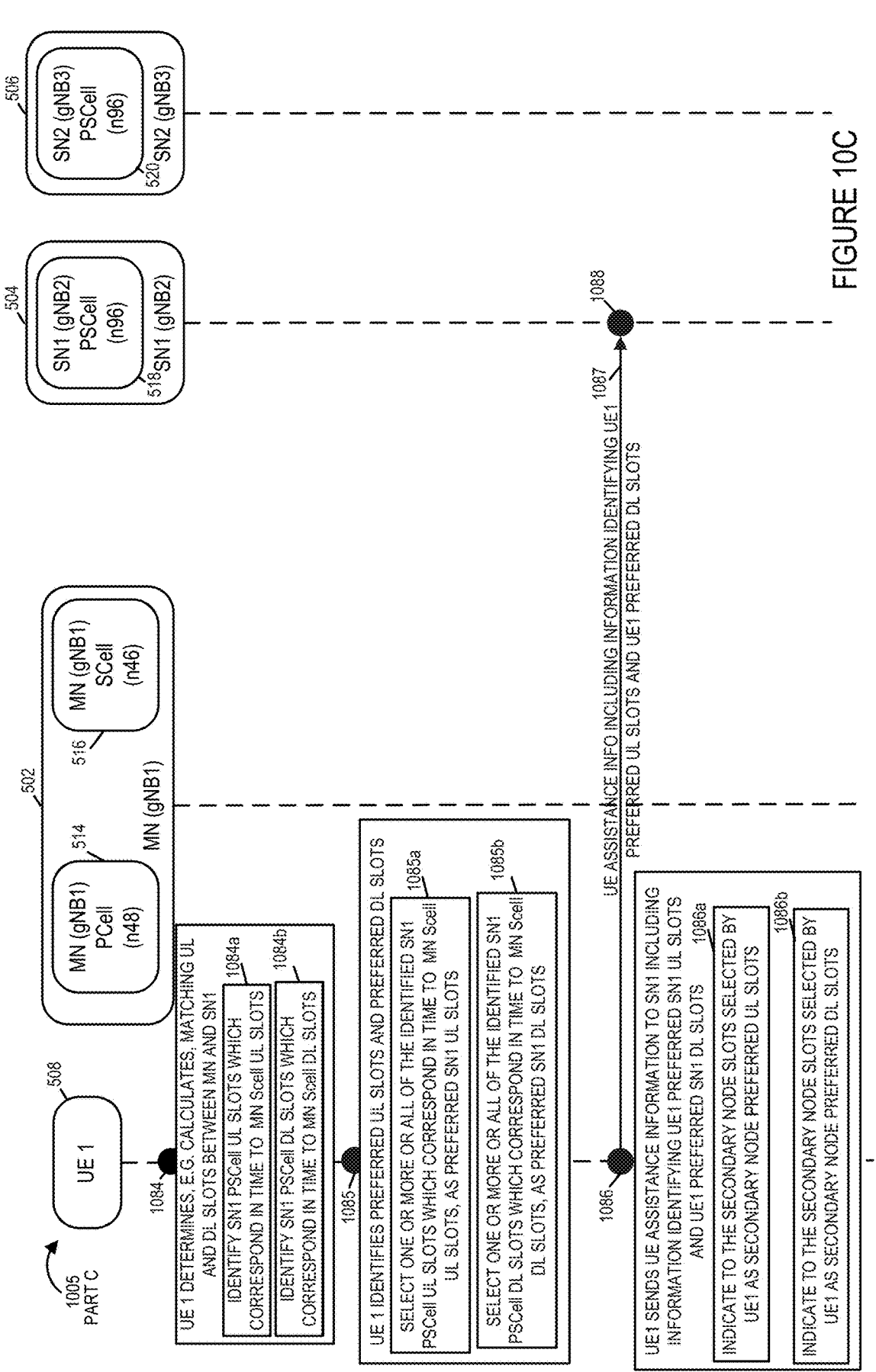
FIG. 10C is a third part of a signaling diagram of an exemplary communications method, in which an in-device co-existence (IDC) problem for a UE, operating in dual connectivity mode and using unlicensed spectrum, is avoided via identifying and using preferred secondary node downlink slots and preferred secondary node downlink slots, in accordance with an exemplary embodiment.
Figure 10D:
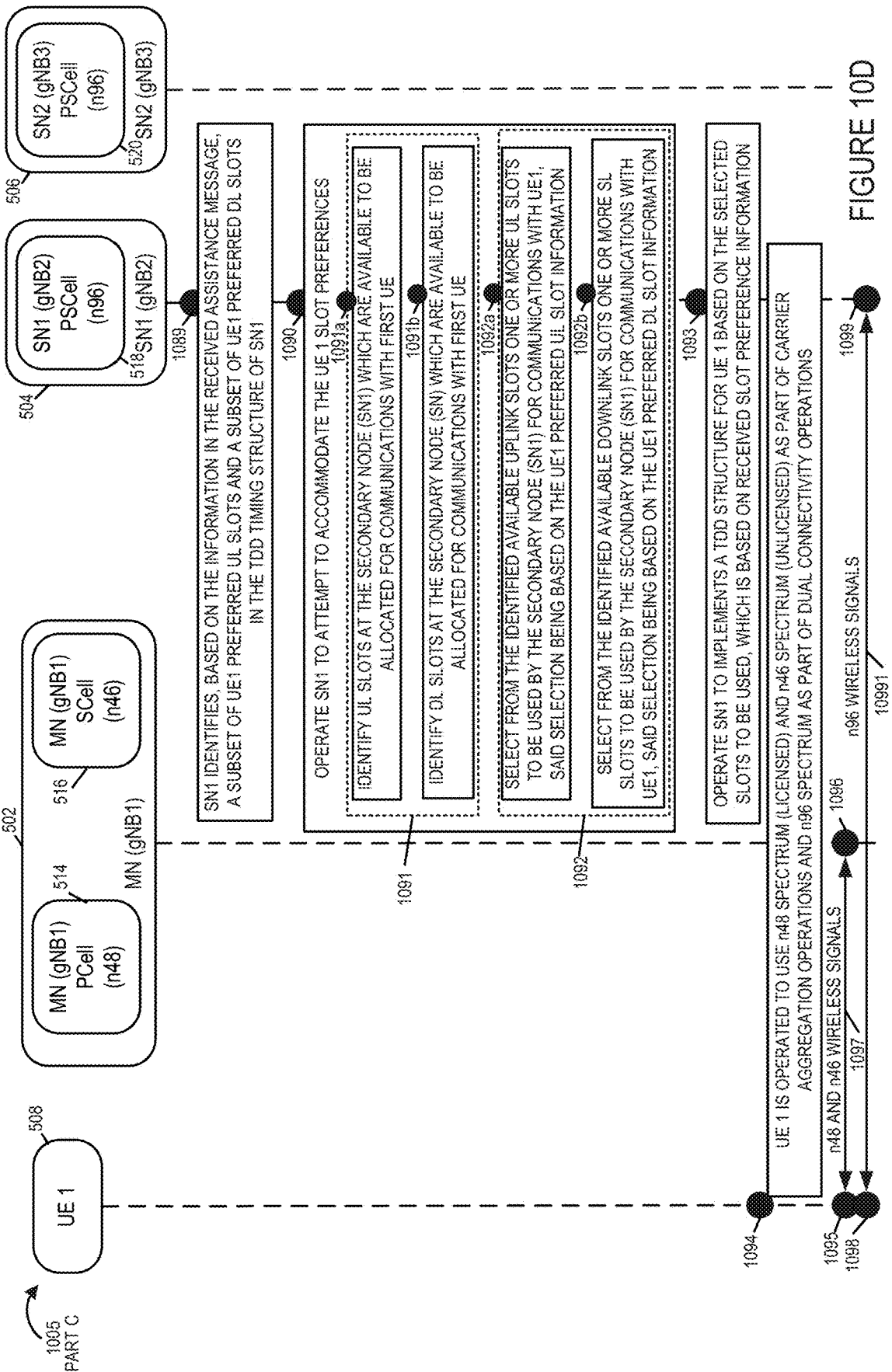
FIG. 10D is a fourth part of a signaling diagram of an exemplary communications method, in which an in-device co-existence (IDC) problem for a UE, operating in dual connectivity mode and using unlicensed spectrum, is avoided via identifying and using preferred secondary node downlink slots and preferred secondary node downlink slots, in accordance with an exemplary embodiment.

FIG. 9, comprising the combination of FIG. 9A, FIG. 9B and FIG. 9C, is a signaling diagram 900 of an exemplary communications method, in which an in-device co-existence (IDC) problem for a UE, operating in dual connectivity mode and using unlicensed spectrum, is avoided via communicating and using information indicating a minimum frequency separation, in accordance with an exemplary embodiment.

In step 902 UE1 508 is operated to report UE1 508 capabilities to MN (gNB1) 502 including: i) information identifying UE 1 supported frequencies and ii) frequency information indicating a minimum frequency separation to be used to limit possible in-device coexistence interference at UE1 508. The frequency information indicating a minimum frequency separation to be used to limit possible in-device coexistence interference at UE1 508 indicates, e.g., minimum frequency separation to be maintained for CA and DC with regard to two unlicensed frequency bands (e.g., n46-n96) to avoid an in-device co-existence (IDC) problem. Thus, in step 902 UE 1 508 generates and sends message 904, including UE 1 capability information including frequencies supported and frequency information indicating a minimum frequency separation to be used to limit possible in-device coexistence interference at UE1 508, e.g., a minimum frequency separation for CA or DC of n46-n96 to avoid an IDC problem, to MN (gNB1) 502. In step 906 MN (gNB1) 502 receives message 904 including UE 1 capability information including frequencies supported and frequency information indicating a minimum frequency separation to be used to limit possible in-device coexistence interference at UE1 508 and recovers and stores the communicated information. In step 908 MN (gNB1) 502 determines UE1 supported frequencies include 5 GHz and 6 GHz bands and determines the amount of minimum frequency separation required by UE 1 508 of CA or DC of n46-n96 to avoid and IDC problem. In step 910 MN (gNB1) 502 is operated to report MN device capabilities to UE 1 508. Thus, in step 910 MN (gNB1) 502 generates and sends message 912 including MN device capabilities to UE 1 508. In step 914 UE 1 508 receives message 912 and recovers the communicated information. In step 916 UE1 508 determines that MN supported frequencies include the 5 GHz band (n46).

In step 917 UE2 510 is operated to report UE2 510 capabilities to MN (gNB1) 502 including: i) information identifying UE 2 supported frequencies and ii) frequency information indicating a minimum frequency separation to be used to limit possible in-device coexistence interference at UE2 510. The frequency information indicating a minimum frequency separation to be used to limit possible in-device coexistence interference at UE2 510 indicates, e.g., minimum frequency separation to be maintained for CA and DC with regard to two unlicensed frequency bands (e.g., n46-n96) to avoid an in-device co-existence (IDC) problem. Thus, in step 917 UE 2 508 generates and sends message 9171, including UE 2 capability information including frequencies supported and frequency information indicating a minimum frequency separation to be used to limit possible in-device coexistence interference at UE2 510, e.g., a minimum frequency separation for CA or DC of n46-n96 to avoid an IDC problem, to MN (gNB1) 502. In step 9172 MN (gNB1) 502 receives message 9171 including UE 2 capability information including frequencies supported and frequency information indicating a minimum frequency separation to be used to limit possible in-device coexistence interference at UE2 510 and recovers and stores the communicated information. In step 9173 MN (gNB1) 502 determines UE1 supported frequencies include 5 GHz and 6 GHz bands and determines the amount of minimum frequency separation required by UE 1 508 of CA or DC of n46-n96 to avoid and IDC problem.

The reported minimum frequency separation to be used to limit possible in-device coexistence interference at UE1 508 may be, and sometime is, different than the reported minimum frequency separation to be used to limit possible in-device coexistence interference at UE2 510. In some embodiments, MN 502 collects reported minimum frequency separation from a plurality of UEs being serviced by MN 502, and in step S174 processes the information and determines an overall minimum frequency separation value for the set of UEs, e.g., the overall minimum frequency separation value for the set of UEs, e.g., including UE 1 508 and UE2 510. In some embodiments the overall minimum frequency separation value for the set of UEs is the largest minimum frequency separation value, e.g., worst case value for the set.

In step 918 UE1 508 is operated in RRC_Connected state with regard to MN. UE 1 508 is under the control of MN (gNB1) 502, serving a PCell on a licensed spectrum band (n48). In step 920 UE 1 508 performs measurement of received signals, e.g., from one or more base stations. In step 922 UE 1 508 generates and sends a measurement report 924 to MN (gNB1) 502 based on the measurements of the received signals. In some embodiments, the measurement report 924 is in accordance with 3GPP TS 38.331 V16.7.0. In step 926 the MN (gNB1) 502 receives the communicated measurement report 924 and recovers the communicated information. Multiple iterations of steps 920, 922 and 924 are performed. Thus, measurements reports are provided by UE 1 508 to MN (gNB1) 502 under MN command.

In step 928 MN (gNB1) 502 decides to add 5 GHz (n46), an unlicensed spectrum band, as SCell to MCG of PCell. In step 930 the MN (gNB1) 502 selects a channel of unlicensed spectrum (n46) to be used for UE 1 508 for carrier aggregation (CA) operations and implements CA operations.

In step 934 the UE 1 508 is operated to use n48 spectrum (licensed) and n46 spectrum (unlicensed) as part of carrier aggregation operations. In step 934 and step 936 UE 1 508 and MN (gNB 1) 502 are operated to send and receive wireless signals 938. The wireless signals include UE1/MN PCell wireless signals over assigned channel of licensed spectrum (n48) and UE1/MN SCell wireless signals over assigned channel of unlicensed spectrum (n46).

In step 940 UE 1 performs measurements of received signals including detected 6 GHz signals from base stations. In step 942 UE 1 508 generates and sends a measurement report 944 to MN (gNB1) 502 based on the measurements of the received signals. In some embodiments, the measurement report 944 is in accordance with 3GPP TS 38.331 V16.7.0. In step 946 the MN (gNB1) 502 receives the communicated measurement report 944 and recovers the communicated information. Multiple iterations of steps 940, 942 and 946 are performed. Thus, measurement reports 944 are provided by UE 1 508 to MN (gNB1) 502 under MN command.

In step 948 the MN (gNB1) 502 determines that a threshold target configured on the MN has been reached. In step 950, the MN (gNB1) 502 decides, based on the threshold target having been reached, to request a target secondary node (SN) to allocate resources for one or more specific protocol data unit (PDU) session/Quality of Service (QoS) flows for UE 1 508. In step 952 the MN (gNB1) 502 decides, based on UE measurement reports, to select SN1 (gNB2) 504, e.g., from among a plurality of potential SNs including SN1 (gNB2) 504 and SN2 (gNB3) 506, as the target SN, and to add 6 GHz (n96), another unlicensed band, as PSCell to SCG on SN in DC configuration.

In step 954 MN (gNB1) 502 generates and send SN addition request message 956 including: minimum frequency separation information to be maintained when allocating one or more frequencies to be used by UE1 508, e.g. a minimum frequency separation information for CA or DC of n46-n96 such that a potential n46-n96 CA or DC avoids an IDC problem and, in some embodiments, ii) a baseline reference frequency, e.g. a maximum frequency, e.g. a maximum n46 frequency, being used by MN for communications with UE1 508, to SN1 (gNB2) 504.

In various embodiments, the minimum frequency separation information included in the SN addition request 956 indicates a frequency separation which is greater than or equal to minimum frequency separation indicated by the UE1 508 device capability information of message 904. In some embodiments, the minimum frequency separation information included in the SN addition request 956 indicates a frequency separation which is greater than the minimum frequency separation indicated by the UE1 508 device capability information of message 904. In some embodiments, the minimum frequency separation information included in the SN addition request 956 indicates the minimum frequency separation indicated by the UE1 508 device capability information of message 904.

In some embodiments, the minimum frequency separation information included in the SN addition request 956 indicates the largest value from a set of received minimum frequency separation values received from a plurality of UEs being service by the MN (gNB1) 502, said plurality of UEs including UE1 508. For example, the minimum frequency separation information included in the SN addition request 956 indicates the overall value determined in step 9174, which is the largest value from the set of UEs including UE1 508 and UE2 510.

In some embodiments, the SN addition request 956 includes a baseline reference frequency with which said minimum frequency is to be maintained. In some embodiments, the baseline reference frequency is a maximum frequency being used by the MN (gNB1) 502 for communication with UE1 508. In some embodiments, the baseline reference frequency is a frequency in a first unlicensed frequency band (e.g., a 5 GHz n46 band).

In some embodiments, in which the baseline reference frequency is not included in the SN addition request 956, the baseline reference frequency is considered, e.g., by default, to be either the edge (e.g., highest frequency) in the first unlicensed frequency band being used by the MN (gNB1) 502 for communications with UE1 508 or the edge (e.g., lowest frequency) in the second unlicensed band to be used by SN1 (gNB2) for communications with UE1 508. In such an embodiment, the MN (gNB1) 502 is able to dynamically change the assigned channel to UE1 508 without SN1 (gNB2) having to consider the effect of the change.

In some embodiments, the minimum frequency separation information, communicated in SN addition request 956, is communicated in a minimum frequency separation information element. In some such embodiments, said minimum frequency separation information element indicates a minimum frequency separation (e.g. in units of 20 MHz) that is required between the channel of a first unlicensed frequency band (e.g. 5 GHz n46) being used for communications between the master node (502) the first UE (UE1 508) and an unlicensed channel of a second unlicensed frequency band (e.g. 6 GHz n96) to be used by the secondary node (SN1 504) for communications between the secondary node (SN1 504) and the first UE (UE1 508). In some embodiments, said minimum frequency separation information element further includes a presence indicator (optional), which is used to indicate presence of the minimum frequency separation information. In some embodiments, said minimum frequency separation information element is included as part of a New Radio (NR) Resource Coordination Information IE of said SN addition request.

In some embodiments, the baseline reference frequency is communicated in a baseline reference frequency IE. In some embodiments, the baseline reference frequency information element is included as part of a New Radio (NR) Resource Coordination Information IE of said SN addition request.

In step 958 SN1 (gNB2) 504 receives the SN addition request 956 including the minimum frequency separation information and, in some embodiments, the baseline reference information, and recovers the communicated information. SN1 504 checks to determine in step 956 if it can satisfy the minimum frequency separation indicated in the minimum frequency separation. SN1 504 will generate a NAK message 959' and send it in step 959 to the MN if it can not satisfy the requested minimum frequency separation. The FIG. 9 example assumes the requested minimum frequency separation can be satisfied and thus NAK message 959' and step 959 are shown with dashed lines since they do not occur in the example which is used for explaining the invention but are included to show the case where the request can not be satisfied. In step 960 SN1 (gNB2) 504, in response to the received SN addition request 956, generates and sends SN addition request acknowledgement (ACK) message 962 to MN (gNB1) 502 since in the example the request including the requested minimum frequency separation can be satisfied. In step 964 MN (gNB1) 502 receives the SN addition request ACK 962.

In step 966 the SN1 (gNB2) 504 selects, based on the received minimum frequency separation information and, in some embodiments, the baseline reference frequency (e.g., a maximum frequency of a first unlicensed band (n46) being used by the MN 502 for communications with UE1 508), a channel in 6 GHz (n96) (which is a second unlicensed band) to be used for communications with UE1 508, said selection providing at least the minimum frequency separation to avoid an IDC problem with regard to UE1 508 using the two unlicensed bands (n46-n96).

In step 968 SN1 (gNB2) 504 establishes a cell (PSCell 918) in 6 GHz unlicensed n96 band using the selected channel to support communications with UE1 508 and avoid IDC problems with regard to n46-n96.

In steps 970 and 972 SN1 (gNB2) 504 and UE 1 508 are operated to communicate signals 972 to establish communications. In step 974 UE 1 508 starts operating in RRC_Connected state with regard to SN1 (gNB2) 504.

In step 975 UE 1 508 is operated to use n48 spectrum (licensed) and n46 spectrum (unlicensed) as part of carrier aggregation (CA) operations and n96 spectrum as part of dual connectivity (DC) operations. In steps 976 and 978 UE1 508 and MN (gNB1) 502 are operated to communicate, e.g., send and receive, n48 and n46 wireless signals 980. In steps 982 and 984 UE1 508 and SN (gNB2) 504 are operated to communicate, e.g., send and receive, n96 wireless signals 986. Thus, in step 978 the MN (gNB1) 502 communicates with UE1 508 over a first channel (within the unlicensed n46 band) while SN1 (gNB2) 504, in step 984, communicates with UE1 508 over a second channel (e.g., the selected channel of step 966, of the unlicensed n96 band), which is separated from said first channel by at least the minimum frequency separation communicated in the SN addition request 956. In some embodiments, the first channel is a channel in a first unlicensed frequency band (e.g., 5 GHz n46 band), and the second channel is a channel in a second unlicensed frequency band (e.g., 6 GHz n96 band).

The master node (MN) gNB1 502 may, and sometimes does, transmits signals to UE1 508 via the first channel of the first frequency band of unlicensed spectrum (n46) while SN1 (gNB2) 504 simultaneously receive signals from UE1 508 via the second channel (selected channel) of the second frequency band of unlicensed spectrum (n96), said concurrent transmission and reception being performed without subjecting UE1 508 to unacceptable IDC interference due to the implemented minimum frequency separation.

The master node (MN) gNB1 502 may, and sometimes does, receives signals from UE1 508 via the first channel of the first frequency band of unlicensed spectrum (n46) while the SN1 (gNB2) 504 simultaneously transmits signals to the UE1 508 via the second channel (selected channel) of the second frequency band of unlicensed spectrum (n96), said concurrent reception and transmission being performed without experiencing unacceptable IDC interference at UE1 508 due to the implemented minimum frequency separation.

The second exemplary embodiment, previously described with respect to FIG. 9, is useful and beneficial for the scenarios where a UE may handle simultaneous TX/RX in n46-n96 if some minimum frequency separation is provided. However, there are scenarios where a UE has to avoid simultaneous TX/RX regardless of the frequency separation. A third exemplary embodiment, described below, provides a solution for such a scenario.

Once a secondary node gets added, the following steps are performed:

i) UE acquires the SCell TDD-Config, ii) UE obtains a subset of the TDD pattern that matches to the PCell TDD-Config and accounting for any delays in channel access that may have caused mismatched TDD-Config between SCell and PCEll, the resulting subset of slots and OS is where the SCell slots/OS are aligned with that of the PCell, ie. both DL or both UL. This avoids simultaneous TX/RX and self-interference at the UE side.

iii) UE adds the aligned TDD patterns to UE Assistance Info IE and sends to SCell; and iv) The SCell scheduler assigns DL/UL for the UE according to the requested subset.

FIG. 10, comprising the combination of FIG. 10A, FIG. 10B, FIG. 10C and FIG. 10D, is a signaling diagram 1000 of an exemplary communications method, in which an in-device co-existence (IDC) problem for a UE, operating in dual connectivity mode and using unlicensed spectrum, is avoided via identifying and using preferred secondary node downlink slots and preferred secondary node downlink slots, in accordance with an exemplary embodiment.

In step 1002 MN 502, which is gNB1, generates and broadcasts signals 1004 including information conveying System Information Block 1 (SIB1) of the MN. In step 1006 user equipment 1 (UE1) 508 receives signals 1004 and recovers the communicated information. In step 1009 UE 1 508 obtains the Time Division Duplexing (TDD) configuration of MN using the recovered information of the SIB1. In steps 1010 and 1012, the UE 508 and MN 502 communicate attachment signaling, said communicated attachment signaling including a capability exchange. In step 1016 UE 1 508 determines MN supported frequencies, e.g., the UE 1 determines that MN 502 supports the n48 licensed band (3550-3700 MHz) and the n46 (5 GHz) unlicensed spectrum band. In step 1018 MN 502 determines that UE 1 508 supports dual connectivity (DC), e.g., the UE 1 508 is a DSDS UE, and the UE 1 508 supports frequencies in the licensed spectrum band (n48), and frequencies included the 5 GHz unlicensed band (n46) and the 6 GHz unlicensed band (n96).

In step 1020 UE 1 508 is operated in RRC_connected state with regard to MN 502. UE 1 508 is under the control of MN (gNB1) 502, serving as PCell 518 on a licensed spectrum band (n48). In step 1020 UE 1 508 performs measurement of received signals. In step 1024 UE 1 508 generates and sends signals 1026 including a measurement report, e.g., in accordance with 3GPP TS 38.331 V16.7.0, to MN 502. In step 1028, MN 502 receives signals 1026 and recovers the communicated measurement report. Step 1022, 1024 and 128 are performed multiple times with the measurement reports being provided by UE 1 508 to MN 502 under MN command.

In step 1030 MN 502 decides to add 5 GHz (n46), an unlicensed spectrum band, as SCell 516 to the Master Cell Group (MCG) of PCell 514, e.g., based on the amount of available licensed spectrum (n48) being insufficient to support the needs of the UEs being serviced by the MN to maintain the QoS levels to which the UEs are subscribed. In step 1032, MN 502 selects a channel of the unlicensed spectrum (n46) to be used by UE 1 508 for carrier aggregation (CA) operations and implements the CAP operations. In some embodiments in step 1032 the MN selects a channel of unlicensed spectrum (n46) to be used by the MN for SCell operation for UE1 for CA operations and then implements CA operations. In step 1034 UE 1 508 is operated to use n48 licensed spectrum and n46 unlicensed spectrum as part of CA operations. In steps 1036 and 1038 the UE 1 508 and MN 502 communicate, e.g., send and/or receive, UE/MN PCell wireless signals of an assigned channel of licensed spectrum (n48) and UE/MN SCell wireless signals of an assigned channel of unlicensed spectrum (n46).

In step 1042 UE 1 508 performs measurements of received signals including detected 6 GHz signals from base stations, e.g., SN1 504, which is gNB2 and SN2 506, which is gNB3. Instep 1044 UE 1 508 generates and sends signals 1046 including a measurement report, e.g., in accordance with 3GPP TS 38.331 V16.7.0, to MN 502. In step 1048 MN 502 receives signals 1046 and recovers the communicated measurement report. Multiple iterations of steps 1042, 1044 and 1048 are performed. The measurements reports are provided by UE 1 508 to MN 502 under MN 502 command.

In step 1050 MN 502 generates and broadcasts signals 1052 conveying SIB1 of MN 502. In step 1054 UE 1 508 receives the broadcast signals and recovers the communicated information. Thus, in step 1054, UE1 508 receives Time Division Duplexing (TDD) information, e.g., TDD configuration information, from MN 502. In step 1056 UE 1 508 obtains the TDD configuration of MN 502 using the information conveyed in SIB1.

In step 1058 MN 502 determines that a threshold target configured on MN has been reached. In step 1060 MN 502 decides, based on the threshold target having been reached, to request a target SN to allocate resources for one or more specific PDU sessions/QoS flows for UE 1 508. In step 1062, MN 502 decides, based on the UE measurement reports, to select gNB2 502 as the target SN, (e.g., from among the UE1 reported potential target SNs 504, 506 in measurement report 1046), and to add 6 GHz (n96), another unlicensed band, as PSCell 518 to secondary carrier group (SCG) on SN in DC configuration.

In step 1064, MN 502 generates and sends an SN addition request 1066 to SN1 (gNB2) 504. In step 1068 SN2 504 receives the SN addition request 1066. In step 1070, SN1 504, in response to the SN addition request, generates and sends an SN addition request ACK 1072 to MN 502. In step 1074 MN 502 receives the SN addition ACK 1072.

In step 1076 SN1 504 generates and transmits, e.g., broadcasts, signals 1076 conveying the SIB1 of SN1 504. In step 1080 UE 1 508 receives signals 1078 and recovers the communicated information, e.g., the SIB1 of SN1. Thus, in step 1080 UE 1 508 receives TDD information from SN1 504. In step 1082 UE 1 508 obtains the Time Division Duplexing (TDD) configuration of SN1 based on the SIB1 received in signals 1078. Then in step 1083 UE1 operates in RRC-Connected state with SN1 and the UE Ass. Info is configured during this state.

In step 1084, UE 1 508 determines, e.g., calculates, matching UL and DL slots between SCell of MN 502 and PSCell of SN1 504. Step 1084 includes step 1084a, in which UE 1 508 identifies SN1 PSCell UL slots which correspond in time (e.g., occur at the same time or overlap in time) to MN SCell UL slots and step 1084b, in which UE 1 508 identifies SN1 PSCell DL slots which correspond in time (e.g., occur at the same time or overlap in time) to MN SCell DL slots.

In step 1085 UE 1 508 identifies preferred DL slots and preferred UL slots with respect to PSCell of SN1 502 and UE 1 508. Step 1085 includes step 1085a, in which UE 1 508 selects one or more or all of the identified SN1 PSCell UL slots which correspond in time to MN SCell UL slots, as preferred SN1 UL slots and step 1085b, in which UE 1 508 selects one or more or all of the identified SN1 PSCell DL slots which correspond in time to MN SCell DL slots, as preferred SN1 DL slots.

In step 1086 UE 1 508 generates and sends signals 1087 including UE assistance information including information identifying UE 1 preferred UL slots and UE 1 preferred DL slots to SN 1 504. Step 1086 includes step 1086a in which UE 1 508 indicates to the second node 504 slots selected by UE 1 as secondary node preferred UL slots and step 1086b in which UE 1 508 indicates to the second node 504 slots selected by UE 1 508 as secondary node preferred DL slots. Steps 1086 to 1092 may be and sometimes are iterated several times, depending on the DL/UL schedules the UE gets from MN.

In some embodiments, the UE slot preference information is communicated to the secondary node (SN1 504) via one or more UE Assistance Information Dual Connectivity (DC) Information Elements (IEs) including: i) a preferred downlink slots information element; or ii) a preferred uplink slots information element. In some embodiments, the preferred downlink slots information element includes a bit-indication of position of slots, where value of 1 in bit-position j indicates that slot j is preferred by the first UE (to be used for UE-specific PDCCH, PDSCH), and the value of 0 indicates dispreference. In some embodiments, the value of the preferred downlink slots information element is an integer value represented by a max number of slots bits.

In some embodiments, the preferred uplink slots information element includes a bit-indication of position of slots, where value of 1 in bit-position j indicates that slot j is preferred by the first UE (to be used for UE-specific PUSCH), and the value of 0 indicates dispreference. IN some embodiments, the value of the preferred uplink slots information element is an integer value represented by a max number of slots bits.

In step 1088 SN 1 (gNB2) 504 receives signals 1087 and recovers the communicated assistance information including information identifying the UE1 SN preferred UL slots and UE1 SN preferred DL slots. For example, in step 1088 SN1 504 receives, from UE1 508, a UE assistance information message including UE1 508 preferred slot information indicating: one or more UL slots (e.g., one or more UL slots which would be preferable from the perspective of UE1 508) and one or more DL slots (e.g., one or more DL slots which would be preferable from the perspective of UE1 508).

In some embodiments, UE1 508 preferred slot information included in the UE assistance information message includes: a first integer value (e.g., the value for preferred-DownlinkSlots IE) indicating which slots in the secondary node (SN1 504) TDD timing structure are UE1 508 preferred downlink slots; and a second integer value (e.g., the value for preferredUplinkSlots IE) indicating which slots in the secondary node (SN1 504) TDD timing structure are UE1 508 preferred uplink slots. In some such embodiments, said first integer value is a value represented by a maxN-rofSlots bits; said second integer value is a value represented by a maxNrofSlots bits; and said maxNrofSlots is the number of slots in the secondary node (SN1 504) TDD timing structure.

In some embodiments, when said first integer value is 0, there are no first UE (UE1 508) preferred downlink slots. In some embodiments, when each of the maxNrofSlots bits representing the first value is 1, each of the slots in the secondary node (SN1 504) TDD timing structure is a first UE (UE1 508) preferred downlink slot. In some embodiments, when said second integer value is 0, there are no first UE (UE1 508) preferred uplink slots. In some embodiments, when each of the maxNrofSlots bits representing the second value is 1, each of the secondary node (SN1504) TDD timing structure slots is a first UE (UE1 508) preferred uplink slot.

In some embodiments, the first integer value (e.g., the value for preferredDownlinkSlots IE) included in the first UE (UE1 508) preferred slot information included in the UE assistance information message indicates positions of preferred downlink slots in a timing structure (secondary node (SN1 504) TDD timing structure).

In some embodiments, the first integer value maps to a set of binary values (each binary value corresponding to a different slot in a sequence of slots in the secondary node (SN1 504) TDD timing structure), each binary value in the set of binary values being used to indicate whether a corresponding slot in the sequence of slots is a preferred DL slot (e.g., binary value=1) or is not a preferred DL slot (i.e. dis-preferred slot) (e.g. binary value=0).

In some embodiments, the second integer value (e.g., the value for preferredUplinkSlots IE) included in the first UE (UE1 508) preferred slot information included in the UE assistance information message indicates positions of preferred uplink slots in a timing structure (secondary node (SN1 504) TDD timing structure).

In some embodiments, the second integer value maps to a set of binary values (each binary value corresponding to a different slot in a sequence of slots in the secondary node (SN1 504) TDD timing structure), each binary value in the set of binary values being used to indicate whether a corresponding slot in the sequence of slots is a preferred UL slot (e.g., binary value=1) or is not a preferred UL slot (i.e. dis-preferred slot) (e.g. binary value=0).

In step 1089 SN1 identifies, based on the information in the received assistance message, a subset of UE1 preferred UL slots and a subset of UE1 preferred DL slots in the TDD timing structure of SN1.

In step 1090 SN1 504 attempts to accommodate the UE 1 slot preferences. SN1 504 may be, and sometimes is, unable to allow each of the preferred slots for UE 1 to be used, e.g., due to interference issues and/or loading issues. Thus SN1 504 selects one or more or all of the slots indicated as UE 1 preferred slots to be used to implement a TDD structure for UE 1. Step 1090 includes step 1091 and step 1092.

In step 1091 SN1 504 identifies UL and DL slots at secondary node SN1 which are available to be allocated for communications with the first UE (UE1 508), e.g., the identified UL and DL slots are potential candidate slots for being used by SN1 for communications with the first UE (UE1 508). Some slots may be unavailable to be allocated for communications with the first UE (UE1), e.g., based on previous allocations, loading and/or interference conditions, as determined by SN1. Step 1091 includes step 1091a, in which SN1 identifies UL slots at the secondary node (SN1) which are available to be allocated for communications with the first UE (UE1), and step 1091b, in which SN1 identifies DL slots at the secondary node (SN1) which are available to be allocated for communications with the first UE (UE1).

In step 1092 SN1 504 selects from the identified UL and DL slots, based on the first UE preferred slot information, UL and DL slots to be used by the secondary node for communications with the first UE (UE1 508). In some embodiments, selecting from the identified UL and DL slots includes selecting at least some of the slots indicated by UE1 508 preferred slots information to be preferred slots. In various embodiments, the preferred UL slots in the secondary node (SN1 504) TDD timing structure correspond to time intervals, of MN 502 TDD timing structure which are for UL communications, and the preferred DL slots in the secondary node (SN1 504) TDD timing structure correspond to time intervals, of MN 502 TDD timing structure which are for DL communications.

Step 1092 includes step 1092a, in which SN1 504 selects from the identified available uplink slots one or more UL slots to be used by the secondary node (SN1) for communications with UE1, said selection being based on the UE1 preferred UL slot information, and step 1092b in which SN1 504 selects from the identified available downlink slots one or more DL slots to be used by the secondary node (SN1) for communications with UE1, said selection being based on the UE1 preferred DL slot information, In step 1093 SN1 504 implements a TDD timing structure for UE 1 508 based on the received slot preference information and other SN1 conditions, e.g., interference and/or loading at SN1. In various embodiments, implementing a TDD structure for UE 1 includes using selected uplink slots (e.g., selected UE preferred UL slots) for uplink communications with UE 1 and using selected downlink slots (e.g., selected UE preferred DL slots) for downlink communications with UE 1, while refraining from using other slots in the SN1 TDD timing structure for communications with UE1.

In step 1094 UE 1 is operated to use n48 spectrum (licensed) and n46 spectrum (unlicensed) as part of carrier aggregation operation and n96 spectrum as part of dual connectivity operations. In steps 1095 and 1096, UE 1 508 and MN 502 are operated to communicate, e.g., send and/or receive, n48 and n46 wireless signals 1097.

In step 1098 and 1099, UE 1 508 and SN 1 504 are operated to communicate, e.g., send and/or receive n96 wireless signals 10991. In step 1098 UE1 508 communicates with SN1 504 using slots allocated to UE1 508 by SN1 504.

Figure 11:
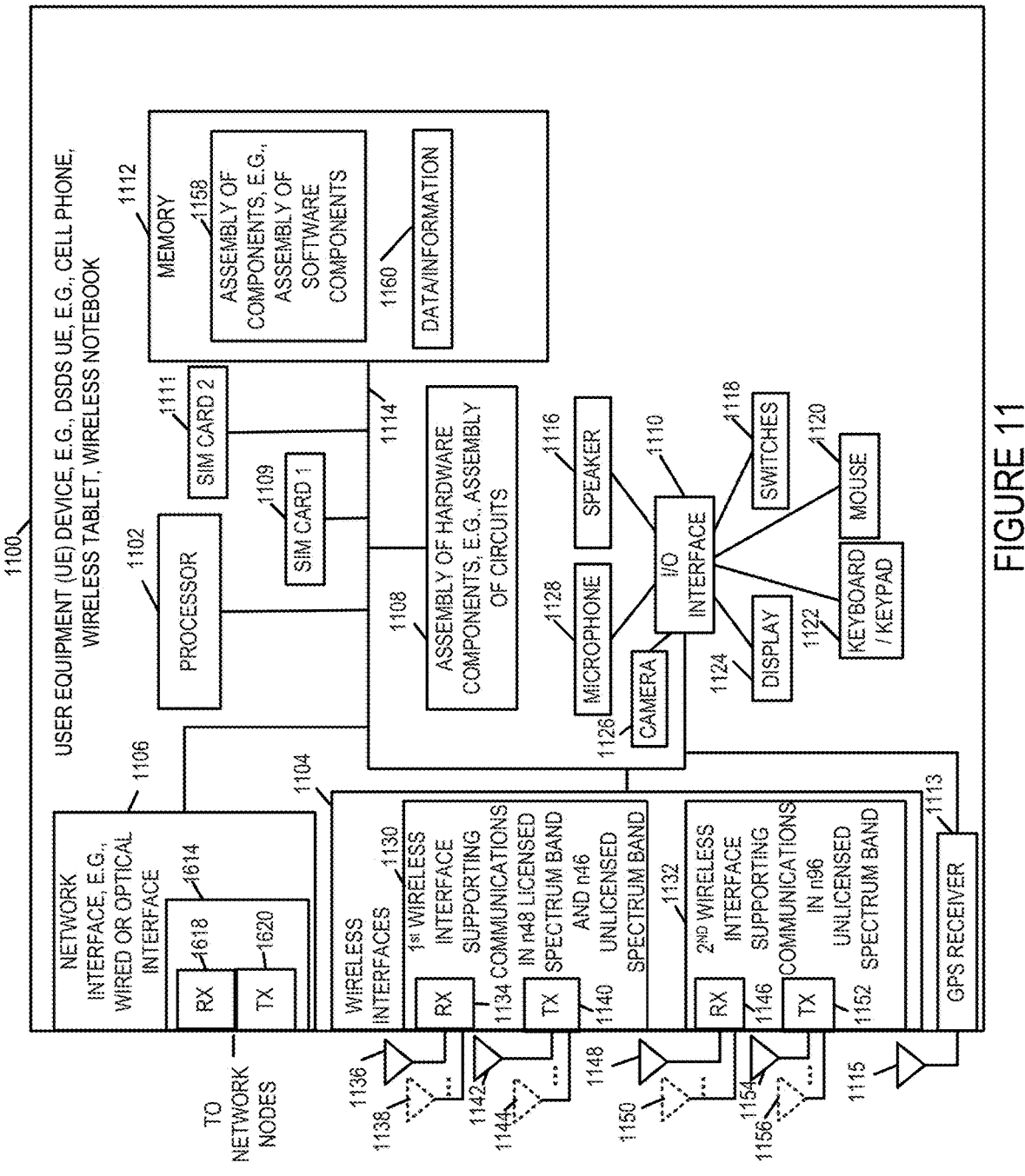
FIG. 11 is a drawing of an exemplary user equipment (UE) device, e.g., a dual Subscriber Identity Module (SIM) dual standby (DSDS) UE supporting dual connectivity, implemented in accordance with an exemplary embodiment.

FIG. 11 is a drawing of an exemplary user equipment (UE) device 1100, e.g., a Dual SIM Dual Standby (DSDS) UE device, e.g., a cell phone, wireless tablet or wireless notebook in accordance with an exemplary embodiment. UE 1100 is, e.g., any of UE 1 508, UE 2 510, . . . , UE N 512 of system 500 of FIG. 5.

UE device 1100 includes a processor 1102, e.g., wireless interfaces 1104, a network interface 1106, e.g., a wired or optical interface, an assembly of hardware components 1108, e.g., an assembly of circuits, an I/O interface 1110, SIM card 1 1109, SIM card 2 1111, memory 1112, and GPS receiver 1113 coupled together via bus 1114 over which the various elements may interchange data and information.

UE device 1100 further includes a plurality of I/O devices includes a speaker 1116, switches 1118, mouse 1120, keyboard/keypad 1122, display 1124, e.g., a touchscreen display, camera 1125 and microphone 1128, coupled to the I/O interface 1110 via which the various I/O devices may communicate with other elements of the UE 1100. GPS receiver 1113 is coupled to GPS antenna 1115, via which GPS signals from GPS satellites are received. Received GPS signals are used by the GPS receiver 1113 to determine time, position, e.g., latitude/longitude, altitude, and velocity. SIM card 1 1109 is, e.g., used in conjunction with 1st wireless interface 1130. SIM card 2 1111 is, e.g., used in conjunction with 2nd wireless interface 1132. Memory 1112 includes assembly of components 1158, e.g., an assembly of software components, e.g., routines, subroutines, software modules, applications, etc., and data/information 1160.

Wireless interfaces 1104 includes a first wireless interface 1130 and a second wireless interface 1132. First wireless interface 1120 supports wireless communications in a licensed spectrum band, e.g., a n48 licensed spectrum band and wireless communications in a first unlicensed spectrum band, e.g., GHz n46 unlicensed spectrum band. First wireless interface 1130 includes a wireless receiver 1134 coupled to one or more receive antennas or antenna elements (1136, . . . 1138), via which the UE 1100 receives wireless signals, e.g., from a master node, and a wireless transmitter 1140 coupled to one or more transmit antenna or antenna elements (1142, . . . 1144), via which the UE 1100 transmits wireless signals, e.g., to the master node.

Second wireless interface 1132 supports wireless communications in a second unlicensed communications band, e.g., a 6 GHz n96 unlicensed spectrum band. Second wireless interface 1132 includes a wireless receiver 1146 coupled to one or more receive antennas or antenna elements ( 1148, . . . 1150), via which the UE 1100 receives wireless signals, e.g., from a secondary node, and a wireless transmitter 1152 coupled to one or more transmit antenna or antenna elements (1154, . . . 1156), via which the UE 1100 transmits wireless signals, e.g., to a secondary node.

Network interface 1106 includes a receiver 1618 and a transmitter 1620. In some embodiments, the receiver 1618 and transmitter 1620 are included as part of a transceiver 1614, e.g., a transceiver chip. Network interface 1106 can, and sometimes does, couple the UE 1110 to network nodes, e.g., when the UE 1110 is located at a site where a wired or optical interface is available to the UE for connection.

Figure 12:
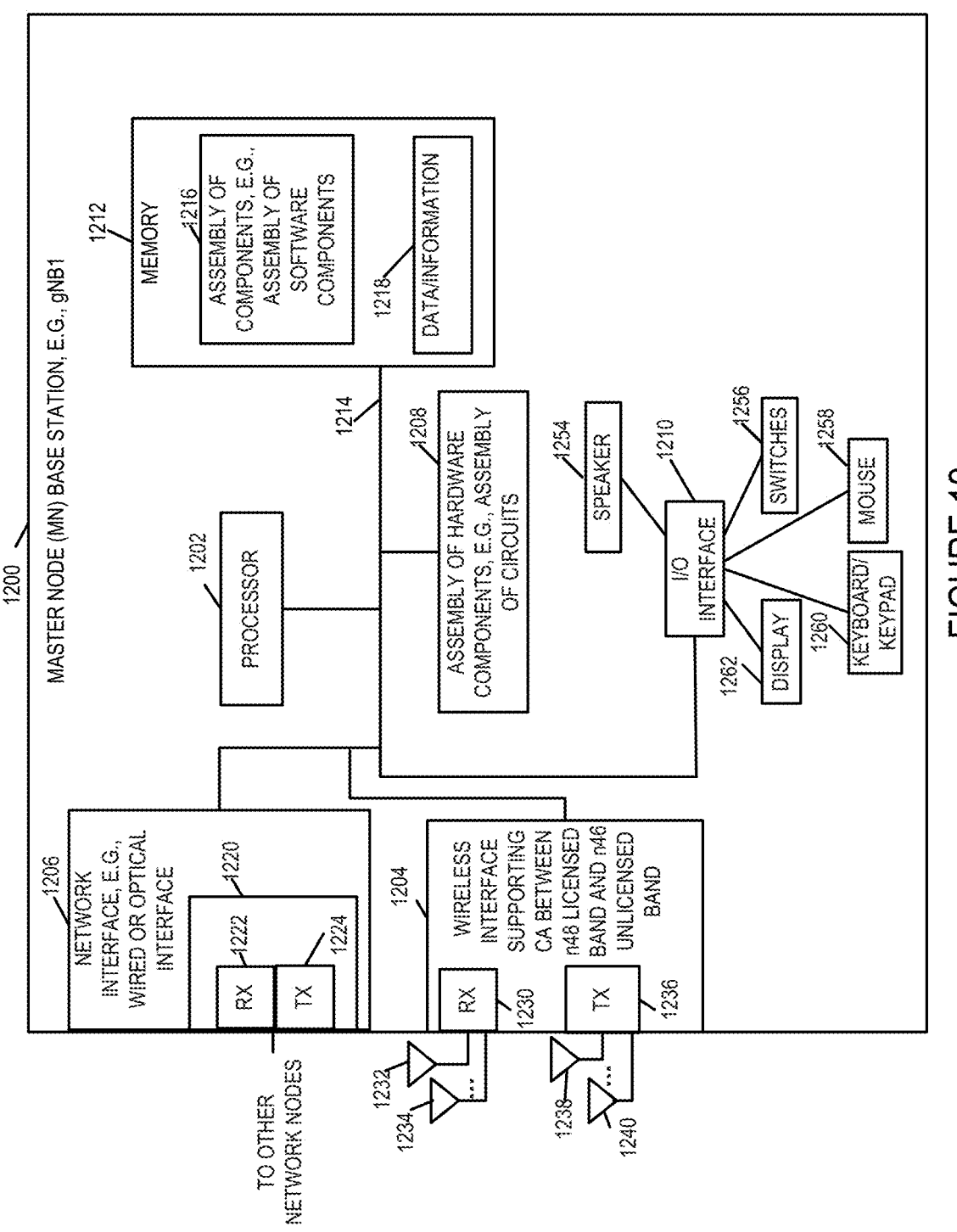
FIG. 12 is a drawing of an exemplary master node (MN), e.g., gNB1, implemented in accordance with an exemplary embodiment.

FIG. 12 is a drawing of an exemplary master node (MN) 1200, e.g., a base station, e.g., gNB1 502 of system 500 of FIG. 5 in accordance with an exemplary embodiment. MN 1200 includes a processor 1202, e.g., a CPU, a wireless interface 1204, a network interface 1206, an assembly of hardware components 1208, e.g., an assembly of circuits, an I/O interface 1210, and memory 1212 coupled together via a bus 1214 over which the various elements may interchange data and information.

Master node 1200 further includes a plurality of I/O devices including speaker 1254, switches 1256, mouse 1258, keyboard/keypad 1260 and display 1262, couple to I/O interface 1210, which couples the various I/O devices to bus 1214 and to other elements in the master node 1200.

Memory 1212 includes assembly of components 1216, e.g., an assembly of software components, e.g., routines, subroutines, software modules, applications, etc. and data/information 1218.

Wireless interface 1204 supports carrier aggregation between a licensed band, e.g., n48 and an unlicensed band, e.g., 5 GHz n46. Wireless interface 1204 includes a wireless receiver 1230 coupled to one or more receive antennas or antenna elements (1232, . . . , 1234) via which the master node base station 1200 may receive wireless signals from UEs. Wireless interface 1204 includes a wireless transmitter 1236 coupled to one or more transmit antennas or antenna elements (1238, . . . , 1240) via which the master node base station 1200 may transmit wireless signals to UEs.

Network interface 1206 includes a receiver 1222 and a transmitter 1224. In some embodiments, the receiver 1222 and transmitter 1224 are included as part of a transceiver 1220, e.g., a transceiver chip. Network interface 1206 can, and sometimes does, couple the master node (MN) base station 1200 to other network nodes.

Figure 13:
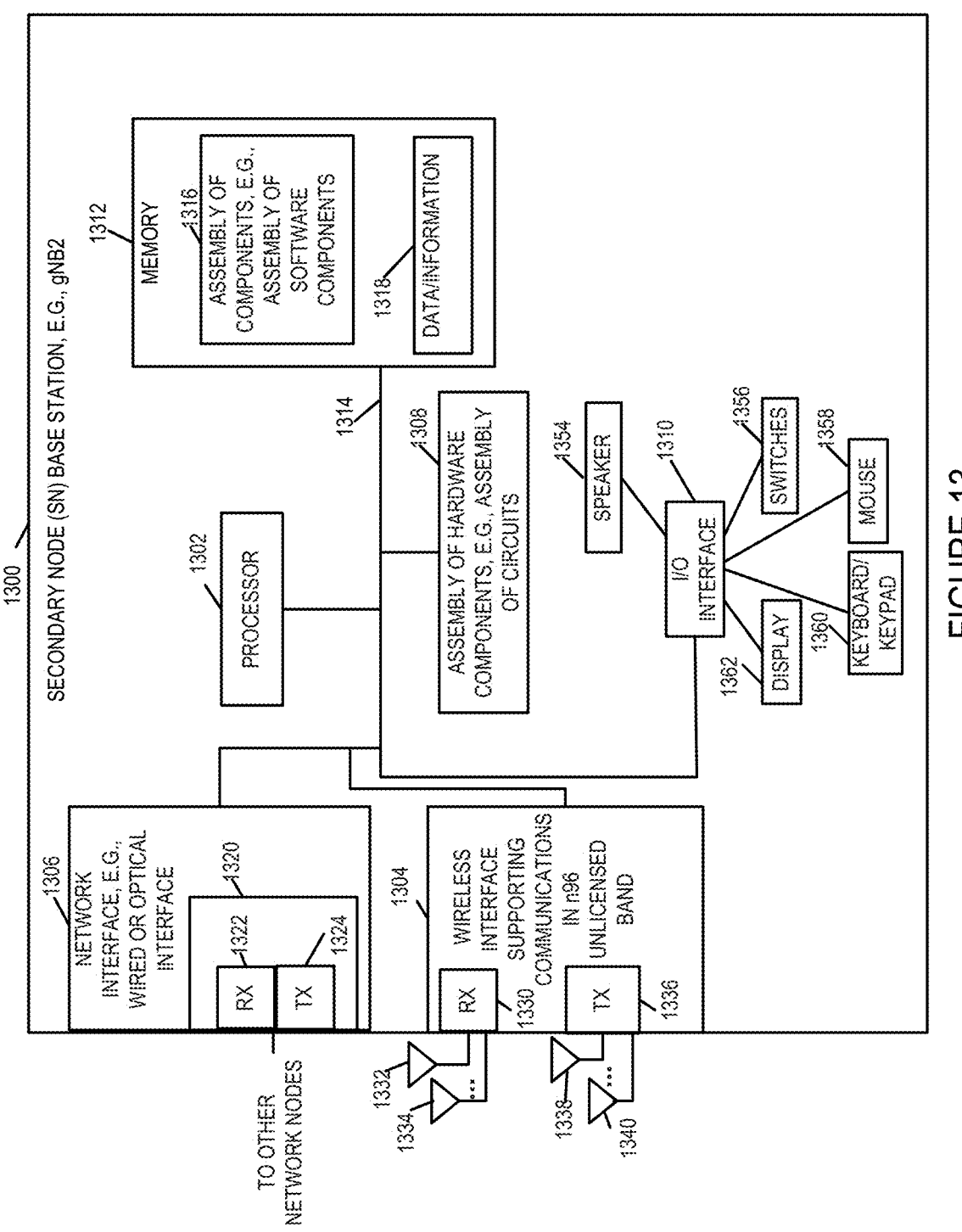
FIG. 13 is drawing of an exemplary secondary node (SN), e.g., gNB2, implemented in accordance with an exemplary embodiment.

FIG. 13 is a drawing of an exemplary secondary node (SN) 1300, e.g., a base station, e.g., gNB2 504 of system 500 of FIG. 5 in accordance with an exemplary embodiment. MN 1300 includes a processor 1302, e.g., a CPU, a wireless interface 1304, a network interface 1306, an assembly of hardware components 1308, e.g., an assembly of circuits, an I/O interface 1310, and memory 1312 coupled together via a bus 1314 over which the various elements may interchange data and information.

Secondary node 1300 further includes a plurality of I/O devices including speaker 1354, switches 1356, mouse 1358, keyboard/keypad 1360 and display 1362, couple to I/O interface 1310, which couples the various I/O devices to bus 1314 and to other elements in the secondary node 1300.

Memory 1312 includes assembly of components 1316, e.g., an assembly of software components, e.g., routines, subroutines, software modules, applications, etc. and data/information 1318.

Wireless interface 1304 supports wireless communications in unlicensed spectrum, e.g., in 6 GHz n96 unlicensed spectrum band. Wireless interface 1204 includes a wireless receiver 1330 coupled to one or more receive antennas or antenna elements (1332, . . . , 1334) via which the secondary node base station 1300 may receive wireless signals from UEs. Wireless interface 1304 includes a wireless transmitter 1336 coupled to one or more transmit antennas or antenna elements (1338, . . . , 1340) via which the secondary node base station 1300 may transmit wireless signals to UEs.

Network interface 1306 includes a receiver 1322 and a transmitter 1324. In some embodiments, the receiver 1322 and transmitter 1324 are included as part of a transceiver 1320, e.g., a transceiver chip. Network interface 1306 can, and sometimes does, couple the secondary node (SN) base station 1300 to other network nodes.

FIG. 14 is a drawing 1400 of an exemplary format for an exemplary UE assistance message including the novel UE Assistance Information Dual Connectivity Information Elements: preferred downlink slots and preferred uplink slots, in accordance with an exemplary embodiment. The Signalling Radio Bearer is: SRB1, SRB3. The Radio Link Control (RLC)-SAP is Acknowledged Mode. The direction of UE assistance message is UE to network.

Dotted line block 1402 includes information defining the exemplary novel UE Assistance Information Dual Connectivity Information Elements: preferred downlink slots and preferred uplink slots, in accordance with an exemplary embodiment. The preferred downlink slots information element in an integer in the range of 0 to maximum number of slots (maxNrofSlots). The preferred Downlink Slots IE conveys a bit-indication of position slots, where the value of 1 in bit position j is preferred by the UE (to be used for UE specific Physical Donwlink Control Channel (PDDCH), Physical Downlink Shared Channel (PDSCH), and the value of 0 indicated dispreference. The preferred uplink slots information element in an integer in the range of 0 to maximum number of slots (maxNrofSlots). The preferred Uplink Slots IE conveys a bit-indication of position slots, where the value of 1 in bit position j is preferred by the UE (to be used for UE specific Physical Uplink Shared Channel (PUSCH), and the value of 0 indicated dispreference.

In one example, there are 14 slots (slot 1 . . . slot 14); the UE preferred downlink slots are: slot 2 and slot 13; and the UE preferred UL slot are: slot 9 and slot 10. The preferred-DownlinkSlots IE=01000000000010. The preferredUplinkSlots IE=00000000110000.

FIG. 15 is a drawing of an exemplary assembly of components 1500, which may be included in a master node (MN) base station, e.g., gNB1, e.g., MN 502 or MN 1200, implementing steps of a method, e.g., steps of the method of FIG. 8, in accordance with an exemplary embodiment.

The components in the assembly of components 1500 can be, and in some embodiments are, implemented fully in hardware within a processor, e.g., processor 1202, e.g., as individual circuits. The components in the assembly of components 1500 can be, and in some embodiments are, implemented fully in hardware within the assembly of hardware components 1208, e.g., as individual circuits corresponding to the different components. In other embodiments some of the components are implemented, e.g., as circuits, within processor 1202 with other components being implemented, e.g., as circuits within assembly of components 1208, external to and coupled to the processor 1202. As should be appreciated the level of integration of components on the processor and/or with some components being external to the processor may be one of design choice. Alternatively, rather than being implemented as circuits, all or some of the components may be implemented in software and stored in the memory 1212 of the MN base station 1200, with the components controlling operation of MN base station 1200 to implement the functions corresponding to the components when the components are executed by a processor e.g., processor 1202. In some such embodiments, the assembly of components 1500 is included in the memory 1212 as part of an assembly of software components 1216. In still other embodiments, various components in assembly of components 1500 are implemented as a combination of hardware and software, e.g., with another circuit external to the processor providing input to the processor which then under software control operates to perform a portion of a component's function.

When implemented in software the components include code, which when executed by a processor, e.g., processor 1202, configure the processor to implement the function corresponding to the component. In embodiments where the assembly of components 1500 is stored in the memory 1212, the memory 1212 is a computer program product comprising a computer readable medium comprising code, e.g., individual code for each component, for causing at least one computer, e.g., processor 1202, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 15 control and/or configure the MN base station 1200 or elements therein such as the processor 1202, to perform the functions of corresponding steps illustrated and/or described in the method of one or more of the flowcharts, signaling diagrams and/or described with respect to any of the Figures. Thus, the assembly of components 1500 includes various components that perform functions of corresponding one or more described and/or illustrated steps of an exemplary method, e.g., steps of the method of signaling diagram 800 of FIG. 8.

Assembly of components 1500 includes a component 1502 configured to operate the master node to receive signals communicating UE device capability information, e.g. information identifying frequency bands supported and information indicating that dual connectivity is supported, and a component 1504 configured to operate the master node to send signals communicating MN device capability information to a UE, e.g. said device capability information including information identifying frequency band supported by the MN.

Assembly of components 1500 includes a component 1506 configured to operate the master node to receive measurements reports from a UE, a component 1508 configured to operate the master node to decide to add and unlicensed spectrum bane, e.g., 5 GHz (n46) as SCell to MCG of PCell, a component 1510 configured to operate the master node to select a channel of an unlicensed spectrum band (n46) to be used by a UE for CA operations and to start using the selected channel of the unlicensed spectrum band, a component 1512 configured to operate the master node to use licensed spectrum (e.g. n48) and unlicensed spectrum (e.g., n46) as part of carrier aggregation operations for communications with a UE, a component 1514 configured to determine that a threshold target configured on the MN has been reached, a component 1516 configured to decide, based on the UE measurement report(s) a particular SN, e.g. SN1, as the target SN, and to a second unlicensed frequency band (e.g. n96) as PSCell on SN in dual connectivity (DC).

Assembly of components 1500 includes a component 1516 to decide, based on the threshold target having been reached, to request a target SN to allocate resources for one or more specific PDU sessions/QoS flows for UE, a component 1518 to select, based on the UE measurement report(s), a particular SN, e.g., SN1, as the target SN and to add a second unlicensed frequency band (e.g., n96) as PSCell on SN in dual connectivity (DC).

Assembly of components 1500 further includes a component 1520 configured to generate a SN addition request include TINFO including, e.g. TSTART and GMFQDN, a component 1522 configured to operate the MN to send the generated SN addition request including TSTART and GMFQDN, to the selected SN, e.g. SN2, a component 1522 configured to operate the MN to send the generated SN addition request including TINFO including, e.g. TSTART and GMFQDN, to the selected SN, e.g. SN1, a component 1524 configured to receive and addition request acknowledgement (ack) from the selected secondary node, e.g. SN1, and a component 1526 configured to operate the MN to communicate with the UE using a licensed spectrum band (e.g., n48) and a first unlicensed spectrum band (e.g., 5 GHz n46), while the UE is communicating with a SN using a second unlicensed spectrum band (e.g. 6 GHz n96).

Figure 16:
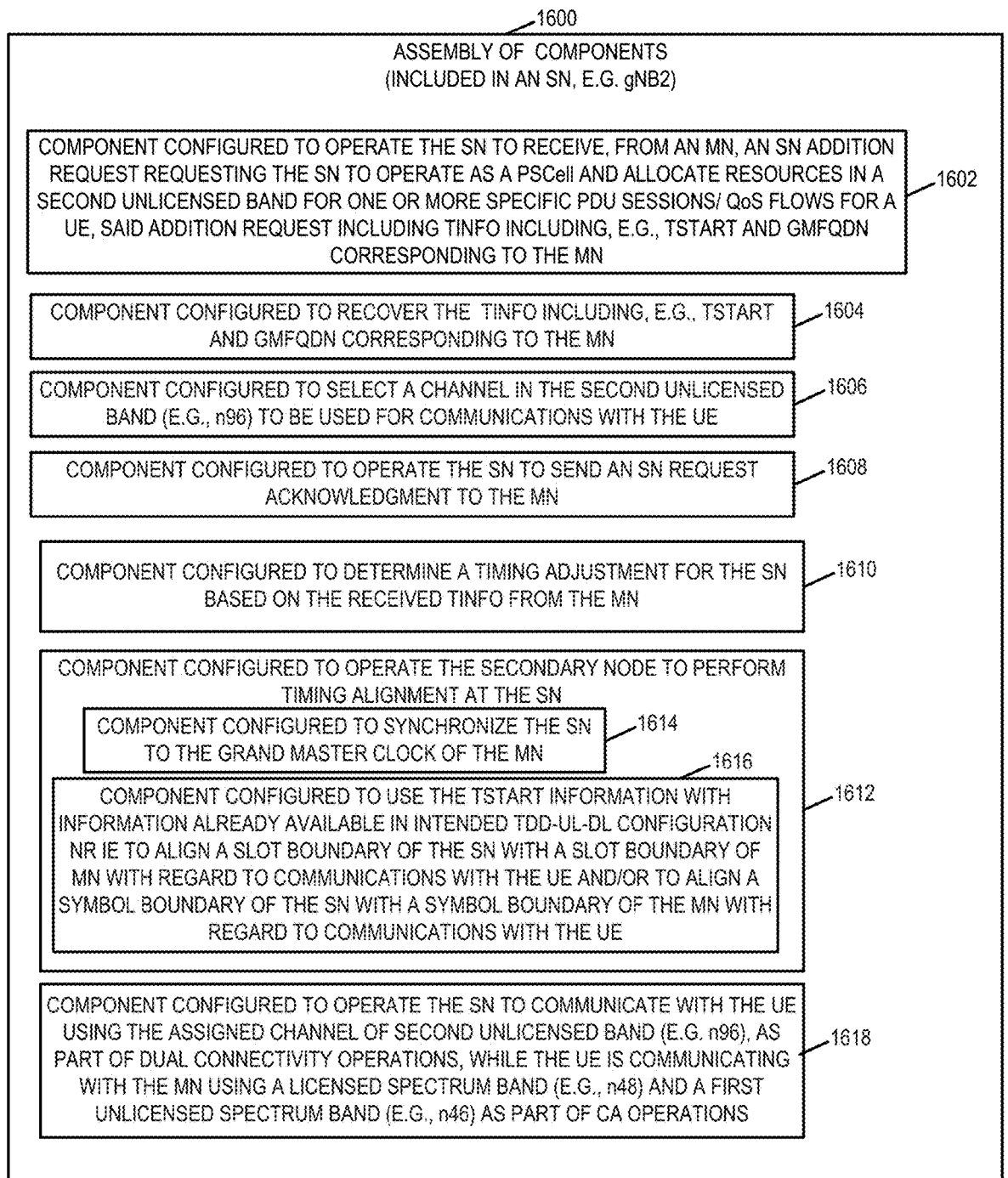
FIG. 16 is a drawing of an exemplary assembly of components which may be included in a secondary node (SN), e.g., a SN of FIG. 13 implementing steps of the exemplary method of FIG. 8.

FIG. 16 is a drawing of an exemplary assembly of components 1600, which may be included in a secondary node (SN), e.g., SN1, e.g., gNB2, e.g., SN base station 504 or SN base station 1300, e.g., implementing steps of a method, e.g., steps of the method of FIG. 8, in accordance with an exemplary embodiment.

The components in the assembly of components 1600 can be, and in some embodiments are, implemented fully in hardware within a processor, e.g., processor 1302, e.g., as individual circuits. The components in the assembly of components 1600 can be, and in some embodiments are, implemented fully in hardware within the assembly of hardware components 1308, e.g., as individual circuits corresponding to the different components. In other embodiments some of the components are implemented, e.g., as circuits, within processor 1302 with other components being implemented, e.g., as circuits within assembly of components 1308, external to and coupled to the processor 1302. As should be appreciated the level of integration of components on the processor and/or with some components being external to the processor may be one of design choice. Alternatively, rather than being implemented as circuits, all or some of the components may be implemented in software and stored in the memory 1312 of the SN base station 1300, with the components controlling operation of SN base station 1300 to implement the functions corresponding to the components when the components are executed by a processor e.g., processor 1302. In some such embodiments, the assembly of components 1600 is included in the memory 1312 as part of an assembly of software components 1316. In still other embodiments, various components in assembly of components 1600 are implemented as a combination of hardware and software, e.g., with another circuit external to the processor providing input to the processor which then under software control operates to perform a portion of a component's function.

When implemented in software the components include code, which when executed by a processor, e.g., processor 1302, configure the processor to implement the function corresponding to the component. In embodiments where the assembly of components 1800 is stored in the memory 1312, the memory 1312 is a computer program product comprising a computer readable medium comprising code, e.g., individual code for each component, for causing at least one computer, e.g., processor 1302, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 16 control and/or configure the SN base station 1300 or elements therein such as the processor 1302, to perform the functions of corresponding steps illustrated and/or described in the method of one or more of the flowcharts, signaling diagrams and/or described with respect to any of the Figures. Thus, the assembly of components 1800 includes various components that perform functions of corresponding one or more described and/or illustrated steps of an exemplary method, e.g., steps of the method of signaling diagram 800 of FIG. 8.

Assembly of components 1600 includes a component 1604 configured to operate the SN to receive from an MN, an SN addition request requesting the SN to operate as a PSCell and allocate resources in a second unlicensed band for one or more specific PDU sessions/QoS flows for a UE, said addition request including TINFO including, e.g. TSTART and GMFQDN corresponding to the MN, a component 1604 configured to recover the TINFO including, e.g. TSTART and GMFQDN corresponding to the MN, a component 1606 configured to select a channel in the second unlicensed band (e.g., n96) to be used for communications with the UE, a component 1608 configured to operate the SN to send an SN request acknowledgment to the MN, a component 1610 configured to determine a timing adjustment for the SN based on the received TINFO for the MN, and a component 1612 configured to operate the secondary node to perform timing alignment at the SN. Component 1612 includes a component 1514 configured to synchronize the SN to the grand master clock of the MN, and a component 1616 configured to use the TSTART information with information already available in intended TDD-UL-DL configuration new radio (NR) information element (IE) to align a slot boundary of the SN with a slot boundary of the MN with regard to communication with the UE and/or to align a symbol boundary of SN with a symbol boundary of the MN with regard to communications with the UE. Assembly of components 1600 further includes a component 1618 configured to operate the SN to communicate with the UE using the assigned channel of the second unlicensed band (e.g., n96), as part of dual connecting operations, while the UE is communicating with MN using a licensed spectrum band (e.g., n48) and a first unlicensed spectrum band (e.g., n46) as part of carrier aggregation (CA) operations.

Figures 17, 17A, 17B:
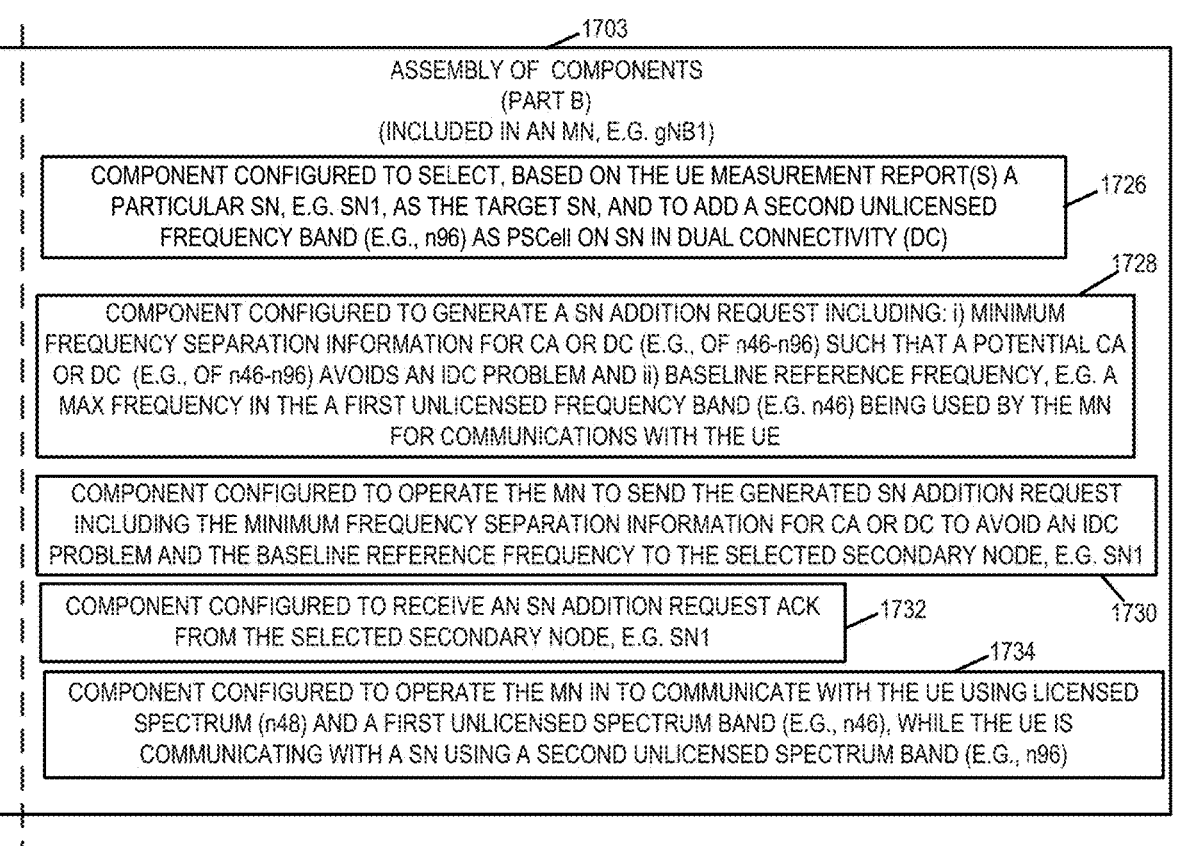
FIG. 17A is a drawing of a first part of an exemplary assembly of components which may be included in a master node (MN), e.g., a MN of FIG. 12 implementing steps of the exemplary method of FIG. 9.
FIG. 17B is a drawing of a second part of an exemplary assembly of components which may be included in a master node (MN), e.g., a MN of FIG. 12 implementing steps of the exemplary method of FIG. 9.
FIG. 17 comprises the combination of FIG. 17A and FIG. 17B.

FIG. 17 is a drawing of an exemplary assembly of components 1700, which may be included in a master node (MN) base station, e.g., gNB1, e.g., MN base station 502 or MN base station 1200, implementing steps of a method, e.g., steps of the method of FIG. 9, in accordance with an exemplary embodiment.

The components in the assembly of components 1700 can be, and in some embodiments are, implemented fully in hardware within a processor, e.g., processor 1202, e.g., as individual circuits. The components in the assembly of components 1700 can be, and in some embodiments are, implemented fully in hardware within the assembly of hardware components 1208, e.g., as individual circuits corresponding to the different components. In other embodiments some of the components are implemented, e.g., as circuits, within processor 1202 with other components being implemented, e.g., as circuits within assembly of components 1208, external to and coupled to the processor 1202. As should be appreciated the level of integration of components on the processor and/or with some components being external to the processor may be one of design choice. Alternatively, rather than being implemented as circuits, all or some of the components may be implemented in software and stored in the memory 1212 of the MN base station 1200, with the components controlling operation of MN base station 1200 to implement the functions corresponding to the components when the components are executed by a processor e.g., processor 1202. In some such embodiments, the assembly of components 1700 is included in the memory 1212 as part of an assembly of software components 1216. In still other embodiments, various components in assembly of components 1570 are implemented as a combination of hardware and software, e.g., with another circuit external to the processor providing input to the processor which then under software control operates to perform a portion of a component's function.

When implemented in software the components include code, which when executed by a processor, e.g., processor 1202, configure the processor to implement the function corresponding to the component. In embodiments where the assembly of components 1500 is stored in the memory 1212, the memory 1212 is a computer program product comprising a computer readable medium comprising code, e.g., individual code for each component, for causing at least one computer, e.g., processor 1202, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 17 control and/or configure the MN base station 1200 or elements therein such as the processor 1202, to perform the functions of corresponding steps illustrated and/or described in the method of one or more of the flowcharts, signaling diagrams and/or described with respect to any of the Figures. Thus, the assembly of components 1700 includes various components that perform functions of corresponding one or more described and/or illustrated steps of an exemplary method, e.g., steps of the method of signaling diagram 900 of FIG. 9.

Assembly of components 1700 includes a component 1702 configured to operate the master node to receive signals, e.g., from a UE, communicating UE device capability information. Component 1702 includes a component 1704 configured to operate the MN to receive signals communicating information identifying frequencies supported by the UE, e.g. information indicating that the UE supports communications in a n48 licensed band, an 5 GHz n48 unlicensed band, and a 6 GHz n96 unlicensed band, a component 1706 configured to operate the MN to receive signals communicating information indicating that a UE supports dual connectivity, e.g. the UE is a DSDS UE, and a component 1708 configured to operate the master node to receive signals communicating a minimum frequency separation for CA and DC, e.g. of n46-n96, such that a potential (n46-n96) CA or (n46-n96) DC avoids an in-device coexistence (IDC) problem.

Assembly of components 1700 further includes a component 1710 configured to operate the master node to determine, based on the received configuration information: i) the UE supports communications in a first unlicensed band (e.g., 5 GHz n46) and a second unlicensed band (e.g. 6 GHz n96), ii) the UE supports dual connectivity, and iii) the amount of frequency separation required by the UE for CA or DC, with regard to the 2 unlicensed bands (e.g. n46-n96) to avoid an IDC problem, and a component 1712 configured to operate the master node to send signal communicating MN device capability information to a UE, e.g. said device capability information including information identifying frequency bands supported by the MN, e.g. n46 and n48.

Assembly of components 1700 further includes a component 1714 configured to operate the master node to receiver measurements reports from a UE, a component 1716 configured to operate the master node to decide to add an unlicensed spectrum band, e.g. 5 GHz, as Scell to MCG of PCell, e.g. in response to a determination that the PCell is unable to satisfy the air link resources needs of the UE, e.g. to maintain a particular level of QoS to which the user of the UE subscribes. Assembly of components 1700 further includes a component 1718 configured to operate the master node to select a channel of unlicensed spectrum band (e.g., n46) to be used by a UE for CA operations and to start using the selected channel of the unlicensed spectrum band, a component 1720 configured to operate the master node to use licensed spectrum (e.g., n48) and unlicensed spectrum (e.g., n48) as part of CA operations for communications with a UE.

Assembly of components 1700 further includes a component 1722 configured to determine that a threshold target configured on the MN has been reached, e.g. an air link resource threshold target on the MN has been reached, a component 1724 configured to decide, based on the threshold target having been reached, to request a target SN to allocate resources for one or more specific PDU sessions/QoS flows for the UE, a components 1726 configured to select, based on the UE measurement reports, a particular SN, e.g. SN1, as the target SN, and to add a second unlicensed frequency band (e.g. n96) as PSCell on SN in dual connectivity, a component 1728 configured to generate an SN addition request including: i) minimum frequency separation information for CA or DC (e.g., of n46-n96) such that a potential CA or DC (e.g., of n46-n96) avoids an IDC problems and ii) a baseline reference frequency, e.g. a maximum frequency in a first unlicensed frequency band (e.g. n46) being used by the MN for communications with the UE, a component 1730 configured to operate the MN to send the generated SN addition request including the minimum frequency separation information for CA or DC to avoid an IDC problem and the baseline reference frequency to the selected secondary node, e.g. SN1. Assembly of components 1700 further includes a component 1732 configured to receive an SN addition request acknowledgment from the selected secondary node, e.g., SN1, and a component 1734 configured to operate the MN to communicate with UE using licensed spectrum (e.g., n48) and spectrum of a first unlicensed spectrum band (e.g., n46), while the UE is communicating with a SN using spectrum of the second unlicensed spectrum band (e.g., n96).

FIG. 18 is a drawing of an exemplary assembly of components 1800, which may be included in a secondary node (SN), e.g., SN1, e.g., gNB2, e.g., SN base station 504 or SN base station 1300, e.g., implementing steps of a method, e.g., steps of the method of FIG. 9, in accordance with an exemplary embodiment. The components in the assembly of components 1800 can be, and in some embodiments are, implemented fully in hardware within a processor, e.g., processor 1302, e.g., as individual circuits. The components in the assembly of components 1800 can be, and in some embodiments are, implemented fully in hardware within the assembly of hardware components 1308, e.g., as individual circuits corresponding to the different components. In other embodiments some of the components are implemented, e.g., as circuits, within processor 1302 with other components being implemented, e.g., as circuits within assembly of components 1308, external to and coupled to the processor 1302. As should be appreciated the level of integration of components on the processor and/or with some components being external to the processor may be one of design choice. Alternatively, rather than being implemented as circuits, all or some of the components may be implemented in software and stored in the memory 1312 of the SN base station 1300, with the components controlling operation of SN base station 1300 to implement the functions corresponding to the components when the components are executed by a processor e.g., processor 1302. In some such embodiments, the assembly of components 1800 is included in the memory 1312 as part of an assembly of software components 1316. In still other embodiments, various components in assembly of components 1800 are implemented as a combination of hardware and software, e.g., with another circuit external to the processor providing input to the processor which then under software control operates to perform a portion of a component's function.

When implemented in software the components include code, which when executed by a processor, e.g., processor 1302, configure the processor to implement the function corresponding to the component. In embodiments where the assembly of components 1800 is stored in the memory 1312, the memory 1312 is a computer program product comprising a computer readable medium comprising code, e.g., individual code for each component, for causing at least one computer, e.g., processor 1302, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 18 control and/or configure the SN base station 1300 or elements therein such as the processor 1302, to perform the functions of corresponding steps illustrated and/or described in the method of one or more of the flowcharts, signaling diagrams and/or described with respect to any of the Figures. Thus, the assembly of components 1800 includes various components that perform functions of corresponding one or more described and/or illustrated steps of an exemplary method, e.g., steps of the method of signaling diagram 900 of FIG. 9.

Assembly of components 1800 includes a component 1802 configured to operate the SN to receive, from an MN, an SN addition request, requesting the SN to operate as a PSCell and allocate resources in a second unlicensed band for one or more specific PDU sessions/QoS flows for a UE, said addition request including: i) minimum frequency separation for CA or DC (e.g. of n46-n96) such that a potential CA or DC (e.g. of n46-n96) avoids an IDC problem and ii) a baseline reference frequency, e.g. a maximum frequency (e.g. in n46 being used by the MN for communications with the UE), a component 1804 configured to recover the minimum frequency separation information and baseline reference frequency information from the received SN addition request, and a component 1806 configured to operate the SN to send an SN addition request acknowledgement to the MN, e.g. indicating to the MN that the SN will implement the request. Assembly of components 1800 further includes a component 1808 configured to select, based on the received minimum frequency separation information and the baseline reference frequency, a channel in the second unlicensed band (e.g. n96) to be used for communications with the UE, said selected channel providing at least the minimum frequency separation from the baseline reference frequency to avoid an IDC problem with regard to the U using concurrently a channel in the first unlicensed spectrum frequency band (e.g. a channel in n46) an a channel in the second unlicensed spectrum frequency band (e.g. a channel in n96). Assembly of components 188 further includes ac component 1810 configured to establish a cell in the second unlicensed frequency band (e.g., n96) using the selected channel to support communications with the UE avoid IDC problems, and a component 1812 configured to operate the SN to communicate with the UE using the selected channel of the second unlicensed band (e.g., n96), as part of dual connectivity operation, while the UE is communicating with the MN using a licensed spectrum band (e.g. n48) and a first unlicensed spectrum band (e.g. n46) as part of CA operations.

FIG. 19 is a drawing of an exemplary assembly of components 1900, comprising the combination of part A 1901 and part B 1903, which may be included in a user equipment (UE) device, e.g., UE 1 508 or UE 1100, implementing steps of a method, e.g., steps of the method of FIG. 10, in accordance with an exemplary embodiment. The components in the assembly of components 1900 can be, and in some embodiments are, implemented fully in hardware within a processor, e.g., processor 1102, e.g., as individual circuits.

The components in the assembly of components 1900 can be, and in some embodiments are, implemented fully in hardware within the assembly of hardware components 1108, e.g., as individual circuits corresponding to the different components. In other embodiments some of the components are implemented, e.g., as circuits, within processor 1102 with other components being implemented, e.g., as circuits within assembly of components 1108, external to and coupled to the processor 1102. As should be appreciated the level of integration of components on the processor and/or with some components being external to the processor may be one of design choice. Alternatively, rather than being implemented as circuits, all or some of the components may be implemented in software and stored in the memory 1112 of the UE 1100, with the components controlling operation of UE 1100 to implement the functions corresponding to the components when the components are executed by a processor e.g., processor 1102. In some such embodiments, the assembly of components 1900 is included in the memory 1112 as part of an assembly of software components 1158. In still other embodiments, various components in assembly of components 1900 are implemented as a combination of hardware and software, e.g., with another circuit external to the processor providing input to the processor which then under software control operates to perform a portion of a component's function.

When implemented in software the components include code, which when executed by a processor, e.g., processor 1102, configure the processor to implement the function corresponding to the component. In embodiments where the assembly of components 1900 is stored in the memory 1112, the memory 1112 is a computer program product comprising a computer readable medium comprising code, e.g., individual code for each component, for causing at least one computer, e.g., processor 1102, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 19 control and/or configure the UE 1100 or elements therein such as the processor 1102, to perform the functions of corresponding steps illustrated and/or described in the method of one or more of the flowcharts, signaling diagrams and/or described with respect to any of the Figures. Thus, the assembly of components 1900 includes various components that perform functions of corresponding one or more described and/or illustrated steps of an exemplary method, e.g., steps of the method of signaling diagram 1000 of FIG. 10.

Assembly of components 1900 includes a component 1902 configured to operate the UE to receive signals, e.g., broadcast signals, from a master node (MN), e.g. gNB1, conveying a system information block 1 (SIB1), a component 1904 configured to obtain, using the received SIB1, the time division duplexing (TDD) configuration of the MN, a component 1906 configured to operate the UE to receive, e.g. a part of an initial attachment signaling exchange, signals from the MN including MN capability information, said MN capability information including information identifying the MN supported frequencies, a component 1908 configured to determine, based on the receive MN capability information, the MN supported frequencies, e.g. the MN supports: i) frequencies (3550-3700 MHz) supporting n48 licensed band and ii) 5 GHz n46 unlicensed band.

Assembly of components 1900 further includes a component 1910 configured to operate the UE in RRC_Connected state with regard to the MN, under control of the MN, serving as PCell on a licensed spectrum band, e.g. n48, a component 1912 configured to perform measurements of received signals, a component 1914 configured to generate a measurement report, a component 1916 configured to send the generated measurement report to the MN, a component 1918 configured to operate the UE to use licensed spectrum, e.g. n48, and a first band of unlicensed spectrum, e.g. n46, as part of carrier aggregation operations, and a component 1920 configured to operate the UE to receive signals, e.g. broadcast signals, from a secondary node (SN), e.g. SN1 504, conveying a system information block 1 (SIB1), a component 1922 configured to obtain, using the received S1B1 from the secondary node, the TDD configuration of the SN, e.g. SN1 504.

Assembly of components 1900 further includes a component 1924 configured to determine, e.g., calculate, matching UL and DL slots between MN and SN1. Component 1924 includes a component 1926 configured to identify SN1 PSCell UL slots which correspond in time to MN SCell UL slots, and a component 1928 configured to identify SN1 PSCell DL slots which correspond in time to MN SCell DL slots. Assembly of components 1900 includes a component 1930 configured to identify preferred UL slots and preferred SL slots. Assembly of components 1930 includes a component 1932 configured to select one or more or all of the identified SN1 PSCell UL slots, which correspond in time to MN SCell UL slots as preferred SN1 UL slots, and a component 1934 configured to select one or more or all of the identified SN1 PSCell DL slots, which correspond in time to MN SCell DL slots as preferred SN1 DL slots.

Assembly of components 1900 includes a component 1936 configured to generate a UE assistance message including information identifying preferred UL slots and UE preferred DL sots. Component 1936 includes a component 1940 configured to include a preferred downlink slots information element (IE) indicating to the secondary node, e.g., SN1 504, slots selected by the UE as the secondary node preferred downlink slots and includes a component 1942 configured to include a preferred uplink slots information element (IE) indicating to the secondary node, e.g., SN1 504, slots selected by the UE as the secondary node preferred uplink slots.

Assembly of components 1900 further includes a component 1944 configured to operate the UE to send to the secondary node, e.g. SN1 504, the generated UE assistance information message including information UE preferred UL slots and UE preferred DL slots, a component 1946 configured to operate the UE to receive information, e.g. from the secondary node, e.g. SN1 504, identifying a TDD structure for the UE to use (with regard to the secondary node), based on the received slot preference information, and a component 1948 configured to operate the UE to use licensed spectrum (e.g. a channel of n48) and a first band of unlicensed spectrum (e.g., a channel of n46) to communicate with the MN, as part of carrier aggregation operations, and to used a second band of unlicensed spectrum (e.g., a channel of n96) to communicate with the second node, e.g. SN1 504, as part of dual connectivity operations.

Figure 20:
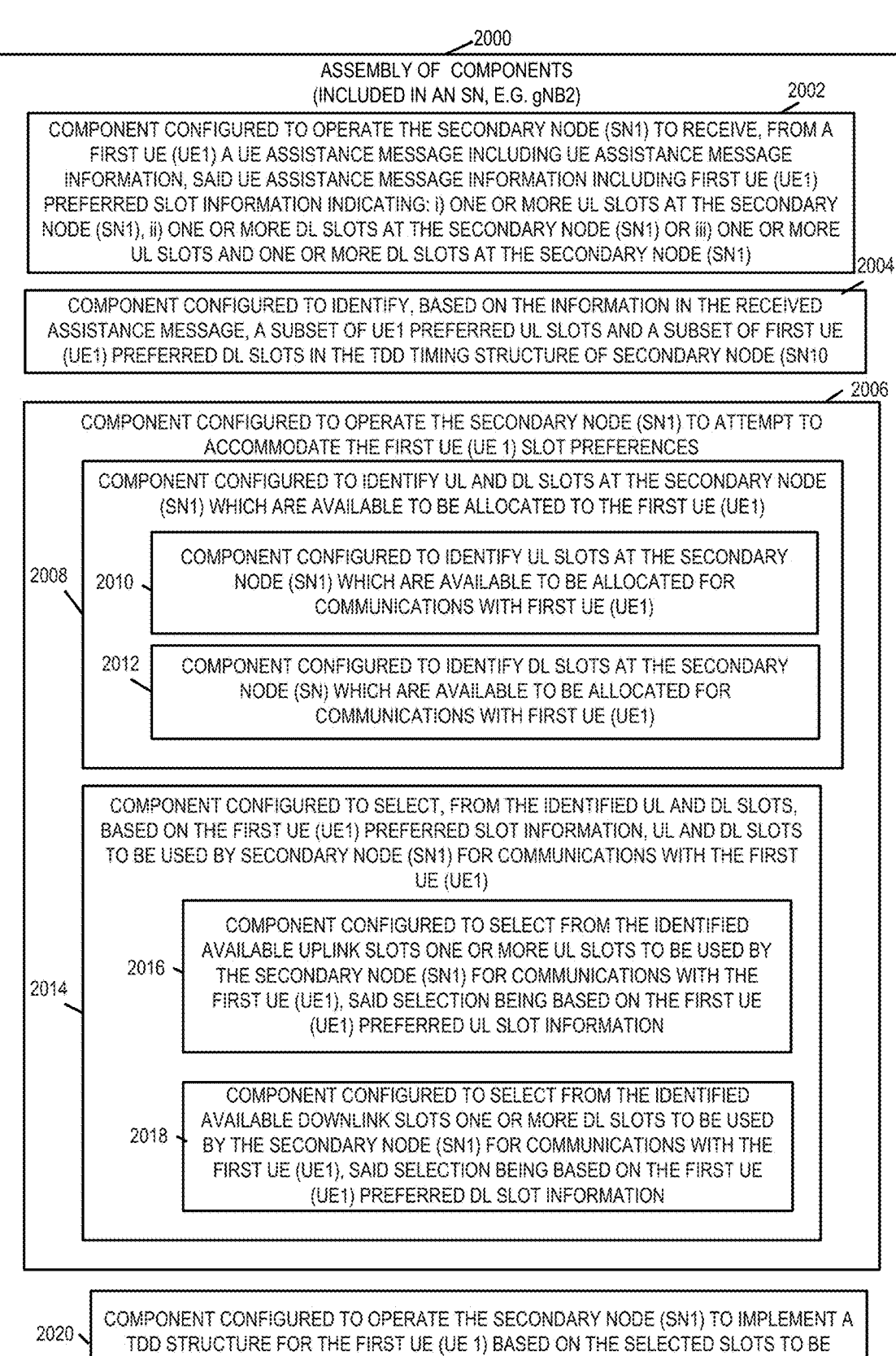
FIG. 20 is a drawing of an exemplary assembly of components which may be included in a secondary node (SN), e.g., a SN of FIG. 13 implementing steps of the exemplary method of FIG. 10.

FIG. 20 is a drawing of an exemplary assembly of components 2000, which may be included in a secondary node (SN), e.g., SN1, e.g., gNB2, e.g., SN base station 504 or SN base station 1300, e.g., implementing steps of a method, e.g., steps of the method of FIG. 10, in accordance with an exemplary embodiment. The components in the assembly of components 2000 can be, and in some embodiments are, implemented fully in hardware within a processor, e.g., processor 1302, e.g., as individual circuits.

The components in the assembly of components 2900 can be, and in some embodiments are, implemented fully in hardware within the assembly of hardware components 1308, e.g., as individual circuits corresponding to the different components. In other embodiments some of the components are implemented, e.g., as circuits, within processor 1302 with other components being implemented, e.g., as circuits within assembly of components 1308, external to and coupled to the processor 1302. As should be appreciated the level of integration of components on the processor and/or with some components being external to the processor may be one of design choice. Alternatively, rather than being implemented as circuits, all or some of the components may be implemented in software and stored in the memory 1312 of the SN base station 1300, with the components controlling operation of SN base station 1300 to implement the functions corresponding to the components when the components are executed by a processor e.g., processor 1302. In some such embodiments, the assembly of components 2000 is included in the memory 1312 as part of an assembly of software components 1316. In still other embodiments, various components in assembly of components 2000 are implemented as a combination of hardware and software, e.g., with another circuit external to the processor providing input to the processor which then under software control operates to perform a portion of a component's function.

When implemented in software the components include code, which when executed by a processor, e.g., processor 1302, configure the processor to implement the function corresponding to the component. In embodiments where the assembly of components 2000 is stored in the memory 1312, the memory 1312 is a computer program product comprising a computer readable medium comprising code, e.g., individual code for each component, for causing at least one computer, e.g., processor 1302, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 20 control and/or configure the SN base station 1300 or elements therein such as the processor 1302, to perform the functions of corresponding steps illustrated and/or described in the method of one or more of the flowcharts, signaling diagrams and/or described with respect to any of the Figures. Thus, the assembly of components 2000 includes various components that perform functions of corresponding one or more described and/or illustrated steps of an exemplary method, e.g., steps of the method of signaling diagram 1000 of FIG. 10.

Assembly of components 2000 includes a component 2002 configured to operate the secondary node (SN1) to receive, from a first UE (UE1) a UE assistance message including UE assistance message information, said UE assistance message information including first UE (UE1) preferred slot information indicating: i) one or more UL slots (e.g., one or more UL slots which would be preferrable from the perspective of the first UE) at the secondary node, ii) one or more DL slots (e.g., one or more DL slots which would be preferrable from the perspective of the first UE) at the second node, or iii) one or more UL slots and one or more SL slots at the secondary node. Assembly of components 2000 further includes a component 2004 configured to identify, based on the information in the received UE assistance message, as subset of first UE (UE1) preferred UL slots and a subset of first UE (UE1) preferred DL slots in the TDD timing structure of the secondary node (SN1), and a component 2006 configured to operate the secondary node (SN1) to attempt to accommodate the first UE (UE1) slot preferences.

Components 2006 includes a component 2008 configured to identify UL and DL slots at the secondary node (SN1) which are available to be allocated to the first UE (UE1) and a component 2014 configured to select, from the identified UL and DL slots, based on the first UE (UE1) preferred slot information, UL and DL slots to be used by secondary node (SN1) for communications with the first UE (UE1). Component 2008 includes a component 2010 configured to identify UL slots at the secondary node (SN1) which are available to be allocated for communications with the first UE (UE1), and components 2012 configured to identify DL slots at the secondary node (SN1) which are available to be allocated for communications with the first UE (UE1). Component 2014 includes a components 2016 configured to select from the identified available uplink slots one or more UL slots to be used by the secondary node (SN1) for communications with the first UE (UE1), said selection being based on the first (UE1) preferred UL slot information and a components 2018 configured to select from the identified available downlink slots one or more DL slots to be used by the secondary node (SN1) for communications with the first UE (UE1), said selection being based on the first (UE1) preferred DL slot information.

Assembly of components 2000 further includes a component 2020 configured to operate the SN (SN1) to implement a TDD structure for the first UE (UE1) based on the selected slots to be used, which is based on the received slot preference information. In various embodiments, the implemented TDD structure uses some or all of the first UE preferred slots and refrains from using slots, which are not first UE preferred slots (sometimes referred to as first UE dispreferred slots), for communications between the secondary node and the first UE.

In various embodiments, first UE preferred DL slots are used for communicating Physical Downlink Control Channel (PDCCH) and Physical Downlink Shared Channel (PDSCH) signals from the secondary node to the first UE. In various embodiments, first UE preferred UL slots are used for communicating Physical Uplink Shared Channel (PUSCH) signals from the first UE to the secondary node.

Figure 21:
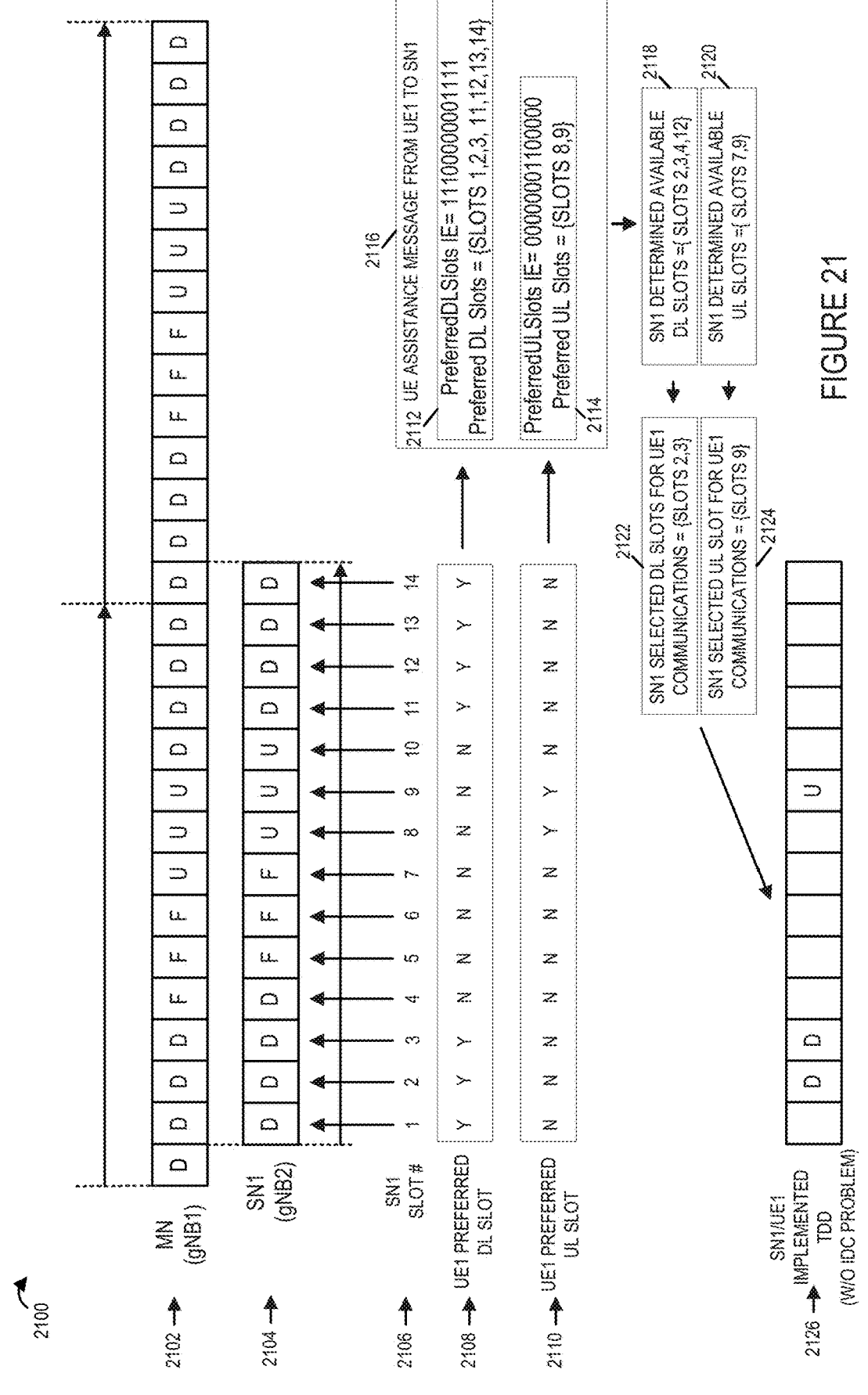
FIG. 21 is a drawing illustrating an example of the exemplary method of the signaling diagram of FIG. 10 to avoid an in-device coexistence (IDC) problem for a UE operating in dual connectivity (DC) with regard to two bands of unlicensed spectrum.

FIG. 21 is a drawing 2100 illustrating an example of the exemplary method of the signaling diagram of FIG. 10 to avoid an in-device coexistence (IDC) problem for a UE, e.g. UE 508, operating in dual connectivity (DC) with regard to two bands of unlicensed spectrum, in which the UE identifies preferred DL and UL slots, communicates the UE preference information to a secondary node, e.g. SN1 504, via a UE assistance message, and the secondary node uses the UE slot preference information to select slots with which to communicate to the UE.

The UE, e.g., UE1 508, acquires TDD configuration information from the master MN, e.g., MN (gNB1) 502. Information 2102 represents 2 iterations of a TDD 14 slot configuration being used by the MN, including downlink slots (D), uplink slots (U) and flexible slots (F).

The UE, e.g., UE1 508, also acquires TDD configuration information from the secondary node, e.g., SN1 (gNB2) 504. Information 2104 represents 1 iteration of a TDD 14 slot configuration being used by the SN, including downlink slots (D), uplink slots (U) and flexible slots (F).

The UE compares the two TDD timing structures, e.g., evaluating for each slot in the SN TDD, whether or not the corresponding time interval of the MN TDD is the same or different.

Row 2106 identifies 14 indexed slots in the SN1 TDD configuration.

For each slot in the SN TDD configuration, the UE determines whether or not the particular SN slot is to be considered by the UE as a preferred downlink slot. Row 2108 indicates the results of the UE's evaluation for each SN slot. If the SN slot is a DL slot, and the corresponding MN configuration (shown above the SN slot) also indicates DL, then the SN slot is considered to be a preferred DL slot by the UE, indicated as a Y. If the SN slot is a DL slot, and the corresponding MN configuration (shown above the SN slot) does not indicate DL, then the slot is not considered to be a preferred DL slot by the UE, indicated as a N, and, in some embodiments, is referred to as a dis-preferred DL slot. If the SN slot is not a DL slot, then the slot is not considered to be a preferred DL slot by the UE, indicated as a N, and, in some embodiments, is referred to as a dis-preferred DL slot. In this example, SN slots #1, 2, 3, 11, 12, 13 and 14 are UE DL preferred slots and SN slots #4, 5, 6, 7, 8, 9 and 10 are UE DL dis-preferred slots.

For each slot in the SN TDD configuration, the UE determines whether or not the particular SN slot is to be considered by the UE as a preferred uplink slot. Row 2110 indicates the results of the UE's evaluation for each SN slot. If the SN slot is an UL slot, and the corresponding MN configuration (shown above the SN slot) also indicates UL, then the SN slot is considered to be a preferred UL slot by the UE, indicated as a Y. If the SN slot is a UL slot, and the corresponding MN configuration (shown above the SN slot) does not indicate UL, then the slot is not considered to be a preferred UL slot by the UE, indicated as a N, and, in some embodiments, is referred to as a dis-preferred UL slot. If the SN slot is not a UL slot, then the slot is not considered to be a preferred UL slot by the UE, indicated as a N, and, in some embodiments, is referred to as a dis-preferred UL slot. In this example, SN slots #8 and 9 are UE UL preferred slots and SN slots #1, 2, 3, 4, 5, 6, 7, 10, 11, 12, 13 and 14 are UE UL dis-preferred slots.

The UE slot preference information is encoded into information elements to be communicated in a UE assistance message from the UE, e.g., UE1 508 to the SN, e.g., SN1 (gNB2) 504, shown as message 2116. The preferredDLSlots IE=11100000001111, which indicates that the UE preferred DL slots are slots 1, 2, 3, 11, 12, 13 and 14, as indicated by box 2112. The preferredULSlots IE=00000001100000, which indicates that the UE preferred DL slots are slots 8 and 9, as indicated by box 2114.

The SN, e.g., SN1 (gNB1) 504 determines available downlink slots, e.g., based on DL slots currently available, loading, expected interference, etc., to be downlink slots 2, 3, 4, and 12 (as indicated in block 2118) from among its overall set of downlink slots of 1, 2, 3, 4, 11, 12, 13, 14 (see SN1 TDD configuration 2104 and SN slot index number in row 2106).

The SN, e.g., SN1 (gNB1) 504 determines available uplink slots, e.g., based on UL slots currently available, loading, expected interference, etc., to be uplink slots 8 and 9 (as indicated in block 2120) from among its overall set of uplink slots of 8, 9 and 10 (see SN1 TDD configuration 2104 and SN slot index number in row 2106).

The SN, e.g., SN1 (gNB1) 504 selects one or more DL slots to be used for communications between the SN and the UE, e.g., UE1 508, said selection including selecting one or more of the UE preferred downlink slots (from information 2112) from among the SN determined available DL slots (information 2118). In this example, the SN selects DL slots 2 and 3 to be used for downlink communications between the SN (SN1 504) and UE (UE1 508).

The SN, e.g., SN1 (gNB1) 504 selects one or more UL slots to be used for communications between the SN and the UE, e.g., UE1 508, said selection including selecting one or more of the UE preferred uplink slots (from information 2114) from among the SN determined available UL slots (information 2120). In this example, the SN selects UL slots 9 to be used for uplink communications between the SN (SN1 504) and UE (UE1 508).

The SN, e.g., SN1 (gNB1) 504, implements a SN1/UE1 TDD configuration to be used for communications between the SN (SN1 504) and the UE (UE1 508), based on the SN selected DL slots (2122) and the SN1 selected UL slots (2124). Row 2126 indicates the SN1/UE1 implemented TDD configuration which utilizes slots 2, 3, and 9. The implemented TDD configuration 2126 avoids an in-device coexistence problem with regard to the UE operating in dual connectivity mode and communicating with a first base station, MN gNB1 504 using a first band of unlicensed spectrum (e.g., n46) and communicating with a second base station, SN (SN1 gNB2 504) using a second band of unlicensed spectrum (e.g., n96).

Figure 22:
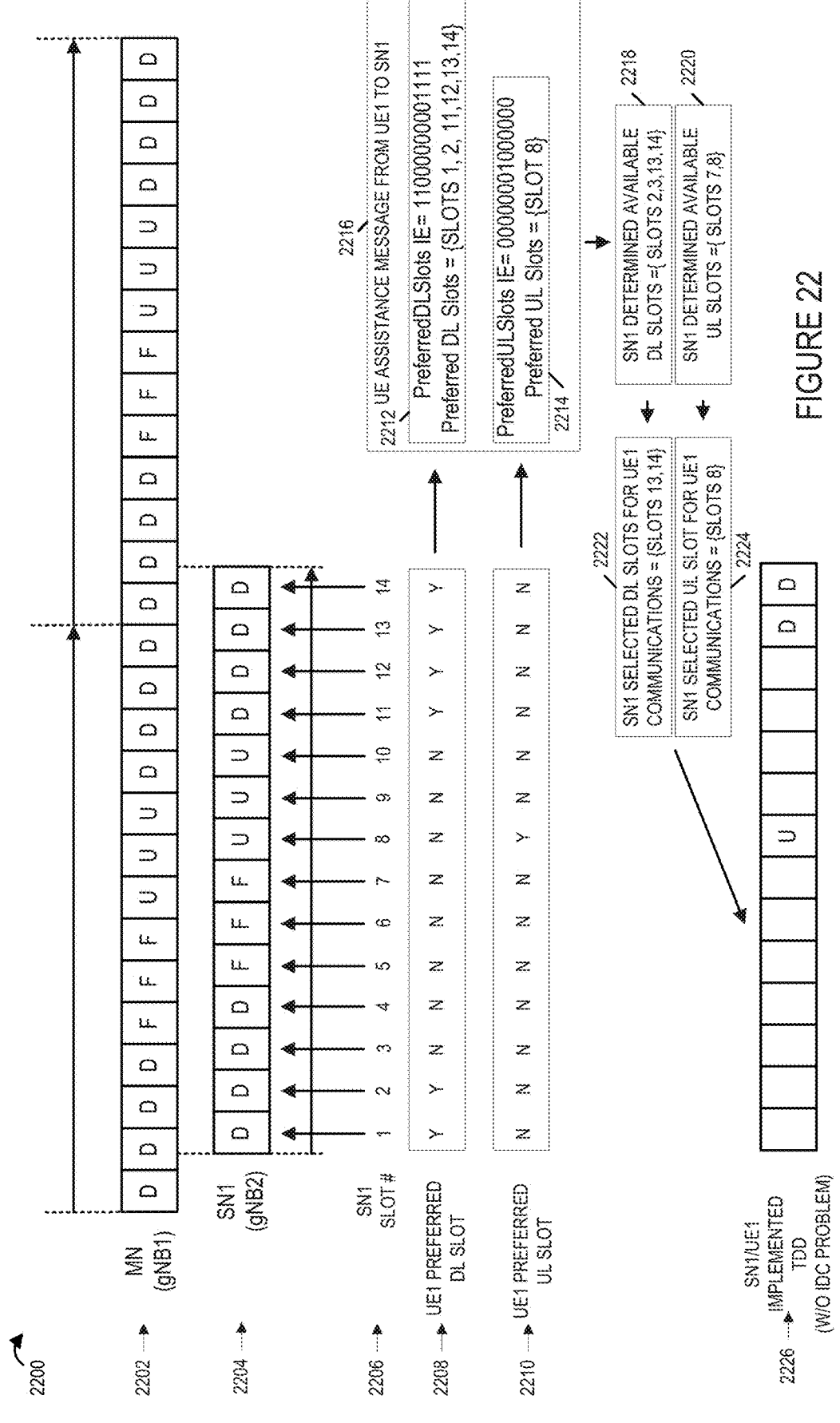
FIG. 22 is a drawing illustrating another example of the exemplary method of the signaling diagram of FIG. 10 to avoid an in-device coexistence (IDC) problem for a UE operating in dual connectivity (DC) with regard to two bands of unlicensed spectrum.

FIG. 22 is a drawing 2200 illustrating another example of the exemplary method of the signaling diagram of FIG. 10 to avoid an in-device coexistence (IDC) problem for a UE, e.g. UE 508, operating in dual connectivity (DC) with regard to two bands of unlicensed spectrum, in which the UE identifies preferred DL and UL slots, communicates the UE preference information to a secondary node, e.g. SN1 504, via a UE assistance message, and the secondary node uses the UE slot preference information to select slots with which to communicate to the UE.

The UE, e.g., UE1 508, acquires TDD configuration information from the master MN, e.g., MN (gNB1) 502. Information 2202 represents 2 iterations of a TDD 14 slot configuration being used by the MN, including downlink slots (D), uplink slots (U) and flexible slots (F).

The UE, e.g., UE1 508, also acquires TDD configuration information from the secondary node, e.g., SN1 (gNB2) 504. Information 2204 represents 1 iteration of a TDD 14 slot configuration being used by the SN, including downlink slots (D), uplink slots (U) and flexible slots (F).

The UE compares the two TDD timing structures, e.g., evaluating for each slot in the SN TDD, whether or not the corresponding time interval of the MN TDD is the same or different. Note that in the example of FIG. 22, the start of an MN slot is offset from the start of an SN slot.

Row 2206 identifies 14 indexed slots in the SN1 TDD configuration.

For each slot in the SN TDD configuration, the UE determines whether or not the particular SN slot is to be considered by the UE as a preferred downlink slot. Row 2208 indicates the results of the UE's evaluation for each SN slot. If the SN slot is a DL slot, and the corresponding MN configuration (shown above the SN slot) also indicates DL (for the full time duration), then the SN slot is considered to be a preferred DL slot by the UE, indicated as a Y. If the SN slot is a DL slot, and the corresponding MN configuration (shown above the SN slot) does not indicate DL (for the full time duration), then the slot is not considered to be a preferred DL slot by the UE, indicated as a N, and, in some embodiments, is referred to as a dis-preferred DL slot. If the SN slot is not a DL slot, then the slot is not considered to be a preferred DL slot by the UE, indicated as a N, and, in some embodiments, is referred to as a dis-preferred DL slot. In this example, SN slots #1, 2, 11, 12, 13 and 14 are UE DL preferred slots and SN slots #3, 4, 5, 6, 7, 8, 9 and 10 are UE DL dis-preferred slots.

For each slot in the SN TDD configuration, the UE determines whether or not the particular SN slot is to be considered by the UE as a preferred uplink slot. Row 2210 indicates the results of the UE's evaluation for each SN slot. If the SN slot is an UL slot, and the corresponding MN configuration (shown above the SN slot) also indicates UL, then the SN slot is considered to be a preferred UL slot by the UE, indicated as a Y. If the SN slot is a UL slot, and the corresponding MN configuration (shown above the SN slot) does not indicate UL, then the slot is not considered to be a preferred UL slot by the UE, indicated as a N, and, in some embodiments, is referred to as a dis-preferred UL slot. If the SN slot is not a UL slot, then the slot is not considered to be a preferred UL slot by the UE, indicated as a N, and, in some embodiments, is referred to as a dis-preferred UL slot. In this example, SN slots #8 is a UE UL preferred slots and SN slots #1, 2, 3, 4, 5, 6, 7, 9, 10, 11, 12, 13 and 14 are UE UL dis-preferred slots.

The UE slot preference information is encoded into information elements to be communicated in a UE assistance message from the UE, e.g., UE1 508 to the SN, e.g., SN1 (gNB2) 504, shown as message 2216. The preferred-DLSlots IE=11000000001111, which indicates that the UE preferred DL slots are slots 1, 2, 11, 12, 13 and 14, as indicated by box 2212. The preferredULSlots IE=00000001000000, which indicates that the UE preferred DL slots are slots 8 as indicated by box 2214.

The SN, e.g., SN1 (gNB1) 504 determines available downlink slots, e.g., based on DL slots currently available, loading, expected interference, etc., to be downlink slots 2, 3, 13 and 14 (as indicated in block 2218) from among its overall set of downlink slots of 1, 2, 3, 4, 11, 12, 13, 14 (see SN1 TDD configuration 2204 and SN slot index number in row 2206).

The SN, e.g., SN1 (gNB1) 504 determines available uplink slots, e.g., based on UL slots currently available, loading, expected interference, etc., to be uplink slots 7 and 8 (as indicated in block 2220) from among its overall set of uplink slots of 8, 9 and 10 (see SN1 TDD configuration 2204 and SN slot index number in row 2206).

The SN, e.g., SN1 (gNB1) 504 selects one or more DL slots to be used for communications between the SN and the UE, e.g., UE1 508, said selection including selecting one or more of the UE preferred downlink slots (from information 2212) from among the SN determined available DL slots (information 2218). In this example, the SN selects DL slots 13 and 14 to be used for downlink communications between the SN (SN1 504) and UE (UE1 508).

The SN, e.g., SN1 (gNB1) 504 selects one or more UL slots to be used for communications between the SN and the UE, e.g., UE1 508, said selection including selecting one or more of the UE preferred uplink slots (from information 2214) from among the SN determined available UL slots (information 2220). In this example, the SN selects UL slot 8 to be used for uplink communications between the SN (SN1 504) and UE (UE1 508).

The SN, e.g., SN1 (gNB1) 504, implements a SN1/UE1 TDD configuration to be used for communications between the SN (SN1 504) and the UE (UE1 508), based on the SN selected DL slots (2222) and the SN1 selected UL slots (2224). Row 2226 indicates the SN1/UE1 implemented TDD configuration which utilizes slots 8, 13, and 14. The implemented TDD configuration 2226 avoids an in-device coexistence problem with regard to the UE operating in dual connectivity mode and communicating with a first base station, MN gNB1 504 using a first band of unlicensed spectrum (e.g., n46) and communicating with a second base station, SN (SN1 gNB2 504) using a second band of unlicensed spectrum (e.g., n96).

Figure 23:
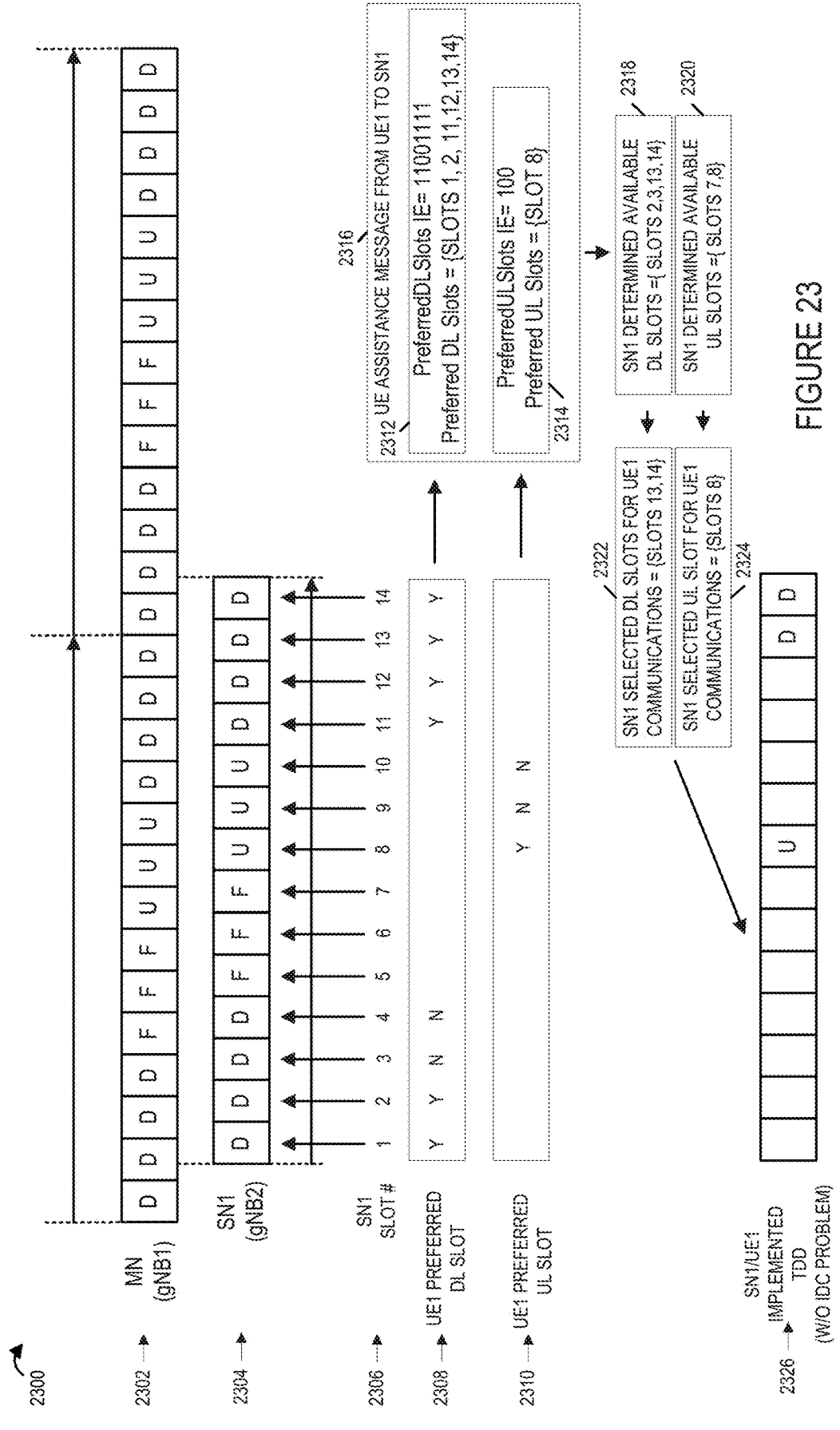
FIG. 23 is a drawing illustrating yet another example of the exemplary method of the signaling diagram of FIG. 10 to avoid an in-device coexistence (IDC) problem for a UE operating in dual connectivity (DC) with regard to two bands of unlicensed spectrum.

FIG. 23 is a drawing 2300 illustrating another example of the exemplary method of the signaling diagram of FIG. 10 to avoid an in-device coexistence (IDC) problem for a UE, e.g. UE 508, operating in dual connectivity (DC) with regard to two bands of unlicensed spectrum, in which the UE identifies preferred DL and UL slots, communicates the UE preference information to a secondary node, e.g. SN1 504, via a UE assistance message, and the secondary node uses the UE slot preference information to select slots with which to communicate to the UE.

The UE, e.g., UE1 508, acquires TDD configuration information from the master MN, e.g., MN (gNB1) 502. Information 2302 represents 2 iterations of a TDD 14 slot configuration being used by the MN, including downlink slots (D), uplink slots (U) and flexible slots (F).

The UE, e.g., UE1 508, also acquires TDD configuration information from the secondary node, e.g., SN1 (gNB2) 504. Information 2304 represents 1 iteration of a TDD 14 slot configuration being used by the SN, including downlink slots (D), uplink slots (U) and flexible slots (F).

The UE compares the two TDD timing structures, e.g., evaluating for each slot in the SN TDD, whether or not the corresponding time interval of the MN TDD is the same or different. Note that in the example of FIG. 23, the start of an MN slot is offset from the start of an SN slot.

Row 2306 identifies 14 indexed slots in the SN1 TDD configuration.

For each downlink slot in the SN TDD configuration, the UE determines whether or not the particular downlink SN slot is to be considered by the UE as a preferred downlink slot. Row 2308 indicates the results of the UE's evaluation for each SN slot. For a SN downlink slot, if the corresponding MN configuration (shown above the SN downlink slot) also indicates DL (for the full time duration), then the SN downlink slot is considered to be a preferred DL slot by the UE, indicated as a Y. If a SN downlink slot if the corresponding MN configuration (shown above the SN downlink slot) does not indicate DL (for the full time duration), then the slot is not considered to be a preferred DL slot by the UE, indicated as a N, and, in some embodiments, is referred to as a dis-preferred DL slot. In this example, SN slots #1, 2, 11, 12, 13 and 14 are UE DL preferred slots and SN slots #3 and 4 are UE DL dis-preferred slots.

For each uplink slot in the SN TDD configuration, the UE determines whether or not the particular SN uplink slot is to be considered by the UE as a preferred uplink slot. Row 2310 indicates the results of the UE's evaluation for each SN uplink slot. For an SN uplink slot, if the corresponding MN configuration (shown above the SN uplink slot) also indicates UL (for the full time duration), then the SN uplink slot is considered to be a preferred UL slot by the UE, indicated as a Y. For an SN uplink slot, if the corresponding MN configuration (shown above the SN uplink slot) does not indicate UL (for the full duration), then the SN uplink slot is not considered to be a preferred UL slot by the UE, indicated as a N, and, in some embodiments, is referred to as a dis-preferred UL slot. In this example, SN slots #8 is a UE UL preferred slot and SN slots #9 and 10 are UE UL dis-preferred slots.

Both the UE (UE1 508) and SN (SN1, gNB2 504) know the number and position of SN UL slots and SN DL slots in the SN TDD configuration 2304. The UE slot preference information is encoded into information elements to be communicated in a UE assistance message from the UE, e.g., UE1 508 to the SN, e.g., SN1 (gNB2) 504, shown as message 2316. The preferredDLSlots IE=11001111, which indicates that the UE preferred DL slots are slots 1, 2, 11, 12, 13 and 14, as indicated by box 2312. The preferredULSlots IE=100, which indicates that the UE preferred DL slot is slot 8 as indicated by box 2314.

The SN, e.g., SN1 (gNB1) 504 determines available downlink slots, e.g., based on DL slots currently available, loading, expected interference, etc., to be downlink slots 2, 3, 13 and 14 (as indicated in block 2318) from among its overall set of downlink slots of 1, 2, 3, 4, 11, 12, 13, 14 (see SN1 TDD configuration 2304 and SN slot index number in row 2306).

The SN, e.g., SN1 (gNB1) 504 determines available uplink slots, e.g., based on UL slots currently available, loading, expected interference, etc., to be uplink slots 7 and 8 (as indicated in block 2320) from among its overall set of uplink slots of 8, 9 and 10 (see SN1 TDD configuration 2304 and SN slot index number in row 2306).

The SN, e.g., SN1 (gNB1) 504 selects one or more DL slots to be used for communications between the SN and the UE, e.g., UE1 508, said selection including selecting one or more of the UE preferred downlink slots (from information 2312) from among the SN determined available DL slots (information 2318). In this example, the SN selects DL slots 13 and 14 to be used for downlink communications between the SN (SN1 504) and UE (UE1 508).

The SN, e.g., SN1 (gNB1) 504 selects one or more UL slots to be used for communications between the SN and the UE, e.g., UE1 508, said selection including selecting one or more of the UE preferred uplink slots (from information 2314) from among the SN determined available UL slots (information 2320). In this example, the SN selects UL slot 8 to be used for uplink communications between the SN (SN1 504) and UE (UE1 508).

The SN, e.g., SN1 (gNB1) 504, implements a SN1/UE1 TDD configuration to be used for communications between the SN (SN1 504) and the UE (UE1 508), based on the SN selected DL slots (2322) and the SN1 selected UL slots (2324). Row 2326 indicates the SN1/UE1 implemented TDD configuration which utilizes slots 8, 13, and 14. The implemented TDD configuration 2326 avoids an in-device coexistence problem with regard to the UE operating in dual connectivity mode and communicating with a first base station, MN gNB1 504 using a first band of unlicensed spectrum (e.g., n46) and communicating with a second base station, SN (SN1 gNB2 504) using a second band of unlicensed spectrum (e.g., n96).

Various exemplary embodiments are listed below and described as numbered example embodiments. In each list of numbered exemplary embodiments, a reference to an earlier numbered embodiment refers to an embodiment in the same list. While lists of numbered embodiments are included in the application to help with understanding of various features and embodiments, they are not limiting, and the invention can and does apply to other embodiments and variations as well.

First Numbered List of Exemplary Method Embodiments

Method Embodiment 1. A communications method, the method comprising: operating (852) a secondary node (SN1) to receive (e.g., from a master node (MN)) a secondary node (SN) addition request corresponding to a first UE (UE 1), said SN addition request including timing information, said timing information including at least one of: i) start time (TSTART) information or ii) Grand Master Fully Qualified Domain Name (GMFQDN) information; and operating (860) the secondary node to perform timing alignment (e.g., shift or define a slot boundary to align it with the start time indicated in the received timing information or shift or define a symbol boundary to align it with a start time indicated in the received timing information) at the secondary node for transmissions to the first UE to align transmission timing at the secondary node for transmission to the first UE, said timing alignment including one or more of: i) slot-boundary alignment or ii) symbol level alignment.

Method Embodiment 1A. The method of Method Embodiment 1, wherein said timing alignment refers to secondary node (SN1) Primary Secondary Cell (PSCell) transmission timing for communication with the first UE being aligned to master node (MN) Secondary Cell (SCell) transmission timing for communication with the first UE.

Method Embodiment 1B. The method of Method Embodiment 1A, wherein the PSCell of the secondary node uses a second unlicensed band (6 GHz—n96) and wherein the SCell of the master node uses a first unlicensed band (5 GHz—n46).

Method Embodiment 1C. The method of Method Embodiment 1B, wherein the first and second unlicensed bands are adjacent unlicensed bands.

Method Embodiment 1D. The method of Method Embodiment 1B, wherein operating (860) the secondary node to perform timing alignment includes aligning downlink (DL) and uplink (UL) communications at the secondary node with downlink (DL) and uplink (UL) communications at a master node (MN) to thereby avoid overlap of DL and UL slots used at the different nodes (MN and SN) and thereby avoiding an in-device coexistence problem (which would otherwise exist at the first UE due to concurrent first UE device communications with the master node using the first unlicensed band and the secondary node using the second unlicensed band (e.g., overlap of DL communications to the first UE in one of the first and second unlicensed bands with UL communications from the first UE in the other one of the first and second unlicensed bands)).

Method Embodiment 1E. The method of Method Embodiment 1D, wherein the first UE supports dual connectivity.

Method Embodiment 1F. The method of Method Embodiment 1E, wherein the first UE includes a first Subscriber Identity Module (SIM) and a second SIM (e.g., the first UE is DSDS UE), said first SIM being used for communications with the MN and said second SIM being used for communications with the SN.

Method Embodiment 2. The communications method of Method Embodiment 1, wherein operating (860) the secondary node to perform timing alignment at the secondary node for transmissions to the first UE includes using the received timing information included in the SN addition request to adjust timing at the secondary node to align one or more of: i) a slot-boundary at the secondary node with a slot boundary at a master node and/or ii) symbol level boundaries at the secondary node with symbol level boundaries at the master node.

Method Embodiment 3. The communications method of Method Embodiment 2, wherein operating (860) the secondary node to perform timing alignment at the secondary node for transmissions to the first UE includes using information available in intended TDD DL-UL configuration NR information element to adjust timing at the secondary node to align or more of: i) a slot-boundary at the secondary node with a slot boundary at a master node and/or ii) symbol level boundaries at the secondary node with symbol level boundaries at the master node.

Method Embodiment 4. The method of Method Embodiment 1, further comprising: operating (854) the secondary node to select a channel in a second unlicensed frequency band (n96) for the first UE (UE1) to use.

Method Embodiment 5. The method of Method Embodiment 1, further comprising: sending (856) a SN addition request acknowledgment to a master node (MN) in response to the received SN addition request including timing information.

Method Embodiment 6. The method of Method Embodiment 5, further comprising: operating (874) the secondary node to use the selected channel in the second unlicensed frequency band (n96) to communicate with the first UE (UE1) as part of dual connectivity operations.

Method Embodiment 7. The method of Method Embodiment 6, further comprising: operating (846) the master node to select the secondary node as a target SN to which the SN addition request is sent, based on first UE measurement reports.

Method Embodiment 7A. The method of Method Embodiment 6, wherein a first UE measurement report to the MN indicates that the first UE has detected a signal in the second unlicensed frequency band (n96) from the secondary node having a received power level at or above a minimum acceptance level.

Method Embodiment 7B. The method of Method Embodiment 7A, wherein said secondary node (SN1) is selected from among a plurality of alternative nodes (504, 506) operating in the second unlicensed frequency band.

Method Embodiment 8. The method of Method Embodiment 7, further comprising: operating (842) the MN to determine that a threshold target configured on the master node has been reached; and operating (844) the MN to decide, based on the threshold target having been reached, to: request a target SN to allocate resources for one or more specific PDU sessions/QoS flows for the first UE.

Method Embodiment 8A. The method of Method Embodiment 8, wherein said threshold target is an air link resource level.

Method Embodiment 8B. The method of Method Embodiment 8A, wherein said MN is unable to allocate enough air link resources to the first UE to satisfy the airlink resource needs of the first UE to maintain a QoS level to which the first UE subscribes without requesting a secondary node to allocate resources to the first UE.

Method Embodiment 9. The method of Method Embodiment 8, wherein said MN is, prior to deciding (844) to request a target SN to allocate resources for one or more specific PDU sessions/QoS flows for the first UE, operated (830) to communicate with the first UE using both licensed spectrum (n48) and unlicensed spectrum (n46) as part of carrier aggregation (CA) operations.

Method Embodiment 9A. The method of Method Embodiment 9, wherein said licensed spectrum and unlicensed spectrum being used as part of carrier aggregation operations are congested.

Method Embodiment 10. The method of Method Embodiment 1, wherein the SN addition request includes an information element (IE) Tinfo, which is exchanged between the master node (MN) and the secondary node (SN1) during Secondary—Next Generation Radio Access Node (S-NG-RAN) Addition Preparation operations.

Method Embodiment 11. The method of Method Embodiment 10, wherein Information Element (IE) Tinfo includes Tstart, where Tstart is the Transmission Start Time in Universal Time Coordinated (UTC) representing the time the MN started its transmission to the first UE.

Method Embodiment 12. The method of Method Embodiment 10, wherein IE Tinfo includes GMFQDN, where GMFQDN is the Fully Qualified Domain Name (FQDN) of grandmaster atomic clock used by the MN.

Method Embodiment 12A The method of Method Embodiment 12, wherein the MN and SN are originally timing synchronized to different grandmaster atomic clocks, and wherein operating (860) the secondary node to perform timing alignment at the secondary node includes synchronizing the secondary node to the grandmaster atomic clock being used by the MN.

Method Embodiment 12B. The method of Method Embodiment 11, wherein operating (860) the secondary node to perform timing alignment at the secondary node includes using the Tstart with information already available in Intended Time Division Duplexing Downlink-Uplink (TDD DL-UL) Configuration New Radio (NR) Information Element (IE) to align a slot boundary of the secondary node with a slot boundary of the master node with regard to communications with the first UE and/or to align symbol level boundaries of the secondary node with symbol level boundaries of master node with regard to communications with the first UE. 1.

First Numbered List of Exemplary System Embodiments

System Embodiment 1. A communication system (500) including a secondary node (SN1) (504 or 1300) comprising: a first processor (1320) configured to: operate (852) the secondary node (SN1) to receive (e.g., from a master node (MN)) a secondary node (SN) addition request corresponding to a first UE (UE 1), said SN addition request including timing information, said timing information including at least one of: i) start time (TSTART) information or ii) Grand Master Fully Qualified Domain Name (GMFQDN) information; and perform (860) timing alignment (e.g., shift or define a slot boundary to align it with the start time indicated in the received timing information or shift or define a symbol boundary to align it with a start time indicated in the received timing information) at the secondary node for transmissions to the first UE to align transmission timing at the secondary node for transmission to the first UE, said timing alignment including one or more of: i) slot-boundary alignment or ii) symbol level alignment.

System Embodiment 1A. The communications system (500) of System Embodiment 1, wherein said timing alignment refers to secondary node (SN1) Primary Secondary Cell (PSCell) transmission timing for communication with the first UE being aligned to master node (MN) Secondary Cell (SCell) transmission timing for communication with the first UE.

System Embodiment 1B. The communications system (500) of System Embodiment 1A, wherein the PSCell of the secondary node uses a second unlicensed band (6 GHz—n96) and wherein the SCell of the master node uses a first unlicensed band (5 GHz—n46).

System Embodiment 1C. The communications system (500) of System Embodiment 1B, wherein the first and second unlicensed bands are adjacent unlicensed bands.

System Embodiment 1D. The communications system (500) of System Embodiment 1B, wherein said first processor (1302) is configured to: align downlink (DL) and uplink (UL) communications at the secondary node with downlink (DL) and uplink (UL) communications at a master node (MN) to thereby avoid overlap of DL and UL slots used at the different nodes (MN and SN) and thereby avoiding an in-device coexistence problem (which would otherwise exist at the first UE due to concurrent first UE device communications with the master node using the first unlicensed band and the secondary node using the second unlicensed band (e.g., overlap of DL communications to the first UE in one of the first and second unlicensed bands with UL communications from the first UE in the other one of the first and second unlicensed bands)), as part of being configured to perform timing alignment.

System Embodiment 1E. The communications system (500) of System Embodiment 1D, wherein the first UE (508 or 1100) supports dual connectivity (DC).

System Embodiment 1F. The communications system (500) of System Embodiment 1E, wherein the first UE (508 or 1100) includes a first Subscriber Identity Module (SIM) (1109) and a second SIM (1111) (e.g., the first UE is DSDS UE), said first SIM being used for communications with the MN and said second SIM being used for communications with the SN.

System Embodiment 2. The communications system (500) of System Embodiment 1, wherein said first processor (1302) is configured to: use the received timing information included in the SN addition request to adjust timing at the secondary node to align one or more of: i) a slot-boundary at the secondary node with a slot boundary at a master node and/or ii) symbol level boundaries at the secondary node with symbol level boundaries at the master node, as part of being configured to perform (860) timing alignment at the secondary node for transmissions to the first UE.

System Embodiment 3. The communications system (500) of System Embodiment 2, wherein said first processor (1302) is configured to: use information available in intended TDD DL-UL configuration NR information element to adjust timing at the secondary node to align or more of: i) a slot-boundary at the secondary node with a slot boundary at a master node and/or ii) symbol level boundaries at the secondary node with symbol level boundaries at the master node, as part of being configured to perform (860) timing alignment at the secondary node for transmissions to the first UE.

System Embodiment 4. The communications system (500) of System Embodiment 1, wherein said first processor (1302) is further configured to: select (874) a channel in a second unlicensed frequency band (n96) for the first UE (UE1) to use.

System Embodiment 5. The communications system (500) of System Embodiment 1, wherein said first processor (1302) is further configured to: operate (856) the secondary node to send a SN addition request acknowledgment to a master node (MN) in response to the received SN addition request including timing information.

System Embodiment 6. The communications system (500) of System Embodiment 5, wherein said first processor (1302) is further configured to: operate (874) the secondary node to use the selected channel in the second unlicensed frequency band (n96) to communicate with the first UE (UE1) as part of dual connectivity operations.

System Embodiment 7. The communications system (500) of System Embodiment 6, further comprising: said master node (MN) (502 or 1200) including: a second processor (1202) configured to: operate (846) the master node to select the secondary node as a target SN to which the SN addition request is sent, based on first UE measurement reports.

System Embodiment 7A. The communications system (500) of System Embodiment 6, wherein a first UE measurement report to the MN indicates that the first UE has detected a signal in the second unlicensed frequency band (n96) from the secondary node having a received power level at or above a minimum acceptance level.

System Embodiment 7B. The communications system (500) of System Embodiment 7A, wherein said secondary node (SN1) is selected from among a plurality of alternative nodes (504, 506) operating in the second unlicensed frequency band.

System Embodiment 8. The communications system (500) of System Embodiment 7, wherein said second processor is further configured to: determine (842) that a threshold target configured on the master node (MN) has been reached; and decide (844), based on the threshold target having been reached, to: request a target SN to allocate resources for one or more specific PDU sessions/QoS flows for the first UE.

System Embodiment 8A. The communications system (500) of System Embodiment 8, wherein said threshold target is an air link resource level.

System Embodiment 8B. The communications system (500) of System Embodiment 8A, wherein said MN is unable to allocate enough air link resources to the first UE to satisfy the airlink resource needs of the first UE to maintain a QoS level to which the first UE subscribes without requesting a secondary node to allocate resources to the first UE.

System Embodiment 9. The communications system (500) of System Embodiment 8, wherein said MN is, prior to deciding (844) to request a target SN to allocate resources for one or more specific PDU sessions/QoS flows for the first UE, operated (830) to communicate with the first UE using both licensed spectrum (n48) and unlicensed spectrum (n46) as part of carrier aggregation (CA) operations.

System Embodiment 9A. The communications system (500) of System Embodiment 9, wherein said licensed spectrum and unlicensed spectrum being used as part of carrier aggregation operations are congested.

System Embodiment 10. The communications system (500) of System Embodiment 1, wherein the SN addition request includes an information element (IE) Tinfo, which is exchanged between the master node (MN) and the secondary node (SN1) during Secondary—Next Generation Radio Access Node (S-NG-RAN) Addition Preparation operations.

System Embodiment 11. The communications system (500) of System Embodiment 10, wherein Information Element (IE) Tinfo includes Tstart, where Tstart is the Transmission Start Time in Universal Time Coordinated (UTC) representing the time the MN started its transmission to the first UE.

System Embodiment 12. The communications system (500) of System Embodiment 10, wherein IE Tinfo includes GMFQDN, where GMFQDN is the Fully Qualified Domain Name (FQDN) of grandmaster atomic clock used by the MN.

System Embodiment 12A The communications system (500) of System Embodiment 12, wherein the MN and SN are originally timing synchronized to different grandmaster atomic clocks, and wherein said first processor (1302) is configured to synchronize the secondary node to the grandmaster atomic clock being used by the MN, as part of being configured to perform (860) timing alignment at the secondary node.

System Embodiment 12B. The communications system (500) of System Embodiment 11, wherein said first processor (1302) is configured to use the Tstart with information already available in Intended Time Division Duplexing Downlink-Uplink (TDD DL-UL) Configuration New Radio (NR) Information Element (IE) to align a slot boundary of the secondary node with a slot boundary of the master node with regard to communications with the first UE and/or to align symbol level boundaries of the secondary node with symbol level boundaries of master node with regard to communications with the first UE, as part of being configured to perform (860) timing alignment at the secondary node.

First Numbered List of Exemplary Non-Transitory Computer Readable Medium Embodiments Non-Transitory Computer Readable Medium Embodiment 1. A non-transitory computer readable medium (1312) including machine executable instructions which when executed by a processor (1302) of a secondary node (504 or 1300) cause the secondary node (504 or 1300) to perform the steps of: operating (852) the secondary node (SN1) to receive (e.g., from a master node (MN)) a secondary node (SN) addition request corresponding to a first UE (UE 1), said SN addition request including timing information, said timing information including at least one of: i) start time (TSTART) information or ii) Grand Master Fully Qualified Domain Name (GMFQDN) information; and operating (860) the secondary node to perform timing alignment (e.g., shift or define a slot boundary to align it with the start time indicated in the received timing information or shift or define a symbol boundary to align it with a start time indicated in the received timing information) at the secondary node for transmissions to the first UE to align transmission timing at the secondary node for transmission to the first UE, said timing alignment including one or more of: i) slot-boundary alignment or ii) symbol level alignment.

Second Numbered List of Exemplary Method Embodiments

Method Embodiment 1. A communications method, the method comprising: receiving (906) at a master node (MN) (e.g., gNB1 502) first UE capability information from a first UE (e.g. UE 508) communicating frequency information indicating a minimum frequency separation to be used to limit possible in-device-coexistence (IDC) interference at the first UE; sending (954) a secondary node (SN) addition request to a secondary node (SN1 504, which is gNB2) including minimum frequency separation information to be maintained when allocating one or more frequencies to be used by the first UE; and operating the MN to communicate (978) with the first UE over a first channel while the secondary node (SN 1) communicates with the first UE over a second channel which is separated from said first channel by at least said minimum frequency separation.

Method Embodiment 1AA. The communications method of Method Embodiment 1, further comprising: operating the secondary node to reject the additional request when the secondary node cannot accommodate the minimum frequency separation to be maintained that is indicated in the minimum frequency separation information.

1AAA. The communications method of Method Embodiment 1AA, wherein operating the secondary node to reject the additional request includes sending a message (e.g., NAK 959) to the MN which sent the secondary node addition request rejecting the request.

Method Embodiment 1A. The communications method of Method Embodiment 1, wherein the first channel is channel in a first unlicensed frequency band (5 GHz n46) and wherein the second channel is a channel in a second unlicensed frequency band (6 GHz n96).

Method Embodiment 1B. The communications method of Method Embodiment 1, wherein the minimum frequency separation information included in the addition request indicates a frequency separation which is greater than or equal to the minimum frequency separation indicated by the first UE device capability information.

Method Embodiment 1B1. The communications method of Method Embodiment 1, wherein the minimum frequency separation information included in the addition request indicates a frequency separation which is greater than the minimum frequency separation indicated by the first UE device capability information.

Method Embodiment 1B2. The communications method of Method Embodiment 1B, wherein the minimum frequency separation information included in the addition request indicates the minimum frequency separation indicated by the first UE device capability information.

Method Embodiment 1B3. The communications method of Method Embodiment 1B, wherein the minimum frequency separation information included in the addition request indicates the largest value from a set of received minimum frequency separation values received from a plurality of UEs being serviced by the master node, said plurality of UEs including the first UE.

Method Embodiment 2. The communications method of Method Embodiment 1, wherein said secondary node addition request further includes a baseline reference frequency with which said minimum frequency separation is to be maintained.

Method Embodiment 3. The method of Method Embodiment 2, wherein said baseline reference frequency is a maximum frequency being used by the MN for communication with the first UE.

Method Embodiment 3A. The method of Method Embodiment 3, wherein the baseline reference frequency is a frequency in a first unlicensed frequency band (5 GHz n46).

Method Embodiment 4. The method of Method Embodiment 3, further comprising: selecting (966), at the secondary node (SN1 504), based on the received minimum frequency separation information and baseline reference frequency, said second channel to be used to communicate with the first UE.

Method Embodiment 5. The method of Method Embodiment 4, further comprising: operating the secondary node (SN1 504) to establish (968) a cell (PSCell 518) which uses the selected channel to support communications with the first UE; and communicating (984) between the secondary node and the first UE using the selected second channel.

Method Embodiment 4A. The method of Method Embodiment 1, further comprising: selecting (966), at the secondary node (SN1 504), based on the received minimum frequency separation information (and the maximum frequency of a first unlicensed band being used by the master node) said second channel (in the second unlicensed band being used by the secondary node) to be used to communicate with the first UE.

Method Embodiment 5A. The method of Method Embodiment 4A, further comprising: operating the secondary node (SN1 504) to establish (968) a cell (PSCell 518) which uses the selected second channel to support communications with the first UE; and communicating (984) between the secondary node and the first UE using the selected second channel.

Method Embodiment 6. The method of Method Embodiment 5, wherein the selected second channel is in a 6 GHz unlicensed band (n96).

Method Embodiment 7. The method of Method Embodiment 1, wherein said minimum frequency separation information is communicated in a minimum frequency separation information element.

Method Embodiment 7A. The method of Method Embodiment 7, wherein said minimum frequency separation information element indicates a minimum frequency separation (e.g. in units of 20 MHz) that is required between the channel of a first unlicensed frequency band (5 GHz n46) being used for communications between the master node the first UE and an unlicensed channel of a second unlicensed frequency band (6 GHz n96) to be used by the secondary node for communications between the secondary node and the first UE.

Method Embodiment 7A1. The method of Method Embodiment 7A, wherein said minimum frequency separation information element further includes a presence indicator (e.g., 0) which indicates presence of the minimum frequency separation.

Method Embodiment 7B. The method of Method Embodiment 7, wherein said minimum frequency separation information element is included as part of a New Radio (NR) Resource Coordination Information Information Element (IE) of said SN addition request.

Method Embodiment 7C. The method of Method Embodiment 2, wherein the baseline reference frequency is communicated in a baseline reference frequency IE.

Method Embodiment 7D. The method of Method Embodiment 7C, wherein said baseline reference frequency information element is included as part of a New Radio (NR) Resource Coordination Information Information Element (IE) of said SN addition request.

Method Embodiment 8. The method of Method Embodiment 1, wherein said the master node transmits signals to the first UE via the first channel of the first frequency band of unlicensed spectrum (n46) while the secondary node simultaneously receive signals from the first UE via the second channel of the second frequency band (n96) of unlicensed spectrum (n96), said concurrent transmission and reception being performed without subjecting the first UE to unacceptable IDC interference due to the implemented minimum frequency separation.

Method Embodiment 8A. The method of Method Embodiment 8, wherein said the master node receives signals from the first UE via the first channel of the first frequency band of unlicensed spectrum (n46) while the secondary node simultaneously transmits signal to the first UE via the second channel of the second frequency band (n96) of unlicensed spectrum (n96), said concurrent reception and transmission being performed without experiencing unacceptable IDC interference due to the implemented minimum frequency separation.

Second Numbered List of Exemplary System Embodiments

System Embodiment 1. A communications system (500) comprising: a master node (MN) (e.g., gNB1 502) including a first processor (1202) configured to operate the MN to: receive (906), at the master node (MN) (e.g., gNB1 502), first UE capability information from a first UE (e.g. UE 508) communicating frequency information indicating a minimum frequency separation to be used to limit possible in-device-coexistence (IDC) interference at the first UE; send (954) a secondary node (SN) addition request to a secondary node (SN1 504, which is gNB2) including minimum frequency separation information to be maintained when allocating one or more frequencies to be used by the first UE; and communicate (978) with the first UE over a first channel while the secondary node (SN 1) communicates with the first UE over a second channel which is separated from said first channel by at least said minimum frequency separation.

System Embodiment 1A. The communications system (500) of System Embodiment 1, wherein the first channel is channel in a first unlicensed frequency band (5 GHz n46) and wherein the second channel is a channel in a second unlicensed frequency band (6 GHz n96).

System Embodiment 1B. The communications system (500) of System Embodiment 1, wherein the minimum frequency separation information included in the addition request indicates a frequency separation which is greater than or equal to the minimum frequency separation indicated by the first UE device capability information.

System Embodiment 1B1. The communications system (500) of System Embodiment 1, wherein the minimum frequency separation information included in the addition request indicates a frequency separation which is greater than the minimum frequency separation indicated by the first UE device capability information.

System Embodiment 1B2. The communications system (500) of System Embodiment 1B, wherein the minimum frequency separation information included in the addition request indicates the minimum frequency separation indicated by the first UE device capability information.

System Embodiment 1B3. The communications system (500) of System Embodiment 1B, wherein the minimum frequency separation information included in the addition request indicates the largest value from a set of received minimum frequency separation values received from a plurality of UEs being serviced by the master node, said plurality of UEs including the first UE.

System Embodiment 2. The communications system (500) of System Embodiment 1, wherein said secondary node addition request further includes a baseline reference frequency with which said minimum frequency separation is to be maintained.

System Embodiment 3. The communications system (500) of System Embodiment 2, wherein said baseline reference frequency is a maximum frequency being used by the MN for communication with the first UE.

System Embodiment 3A. The communications system (500) of System Embodiment 3, wherein the baseline reference frequency is a frequency in a first unlicensed frequency band (5 GHz n46).

System Embodiment 4. The communications system (500) of System Embodiment 3, further comprising said secondary node (SN1 504) including a second processor (1302) configured to: select (966), at the secondary node (SN1 504), based on the received minimum frequency separation information and baseline reference frequency, said second channel to be used to communicate with the first UE.

System Embodiment 5. The communications system (500) of System Embodiment 4, wherein said second processor (1302) is further configured to: operate the secondary node (SN1 504) to establish (968) a cell (PSCell 518) which uses the selected channel to support communications with the first UE; and operate the secondary node to communicate (984) between the secondary node and the first UE using the selected second channel.

System Embodiment 4A. The communication system (500) of System Embodiment 1, wherein said second processor (1302) is further configured to: select (966), at the secondary node (SN1 504), based on the received minimum frequency separation information (and the maximum frequency of a first unlicensed band being used by the master node) said second channel (in the second unlicensed band being used by the secondary node) to be used to communicate with the first UE.

System Embodiment 5A. The communications system (500) of System Embodiment 4A, wherein said second processor (1302) is further configured to: operate the secondary node (SN1 504) to establish (968) a cell (PSCell 518) which uses the selected second channel to support communications with the first UE; and operate the secondary node to communicate (984) between the secondary node and the first UE using the selected second channel.

System Embodiment 6. The communications system (500) of System Embodiment 5, wherein the selected second channel is in a 6 GHz unlicensed band (n96).

System Embodiment 7. The communications system (500) of System Embodiment 1, wherein said minimum frequency separation information is communicated in a minimum frequency separation information element.

System Embodiment 7A. The communications system (500) of System Embodiment 7, wherein said minimum frequency separation information element indicates a minimum frequency separation (e.g. in units of 20 MHz) that is required between the channel of a first unlicensed frequency band (5 GHz n46) being used for communications between the master node the first UE and an unlicensed channel of a second unlicensed frequency band (6 GHz n96) to be used by the secondary node for communications between the secondary node and the first UE.

System Embodiment 7A1. The communications system (500) of System Embodiment 7A, wherein said minimum frequency separation information element further includes a presence indicator (e.g., 0) which indicates presence of the minimum frequency separation.

System Embodiment 7B. The communications system (500) of System Embodiment 7, wherein said minimum frequency separation information element is included as part of a New Radio (NR) Resource Coordination Information Information Element (IE) of said SN addition request.

System Embodiment 7C. The communications system (500) of System Embodiment 2, wherein the baseline reference frequency is communicated in a baseline reference frequency IE.

System Embodiment 7D. The communications system (500) of System Embodiment 7C, wherein said baseline reference frequency information element is included as part of a New Radio (NR) Resource Coordination Information Information Element (IE) of said SN addition request.

System Embodiment 8. The communications system (500) of System Embodiment 1, wherein said first processor (1202) is further configured to operate the master node (MN) to transmit signals to the first UE via the first channel of the first frequency band of unlicensed spectrum (n46) while said second processor (1320) is configured to operate the secondary node to simultaneously receive signals from the first UE via the second channel of the second frequency band (n96) of unlicensed spectrum (n96), said concurrent transmission and reception being performed without subjecting the first UE to unacceptable IDC interference due to the implemented minimum frequency separation.

System Embodiment 8A. The communications system of System Embodiment 8, wherein said the master node receives signals from the first UE via the first channel of the first frequency band of unlicensed spectrum (n46) while the secondary node simultaneously transmits signal to the first UE via the second channel of the second frequency band (n96) of unlicensed spectrum (n96), said concurrent reception and transmission being performed without experiencing unacceptable IDC interference due to the implemented minimum frequency separation.

<center>Second Numbered List of Exemplary<br>Non-Transitory Computer Readable Medium<br>Embodiments</center>

Non-Transitory Computer Readable Medium Embodiment 1. A non-transitory computer readable medium (1212) including machine executable instructions which when executed by a processor (1202) of a master node (502 or 1200) cause the master node (502 or 1200) to perform the steps of: receiving (906) at the master node (MN) (e.g., gNB1 502) first UE capability information from a first UE (e.g. UE 508) communicating frequency information indicating a minimum frequency separation to be used to limit possible in-device-coexistence (IDC) interference at the first UE; sending (954) a secondary node (SN) addition request to a secondary node (SN1 504, which is gNB2) including minimum frequency separation information to be maintained when allocating one or more frequencies to be used by the first UE; and operating the MN to communicate (978) with the first UE over a first channel while the secondary node (SN 1) communicates with the first UE over a second channel which is separated from said first channel by at least said minimum frequency separation.

Third Numbered List of Exemplary Method Embodiments

Method Embodiment 1. A communications method, the method comprising:

receiving (1054) at a first user equipment (UE) (e.g. UE 508) Time Division Duplexing (TDD) information (e.g., TDD configuration information) from a master node (MN) (e.g., gNB1 502); receiving (1080) at the first UE TDD information from a secondary node (e.g., SN1, which is gNB2 504); sending (1086) UE slot preference information to the secondary node (SN1) communicating secondary node slots preferred by the first UE, said UE slot preference information indicating: i) first UE preferred secondary node downlink (DL) slots, ii) UE preferred secondary node uplink (UL) slots or iii) both UE preferred secondary node downlink slots and UE preferred secondary node UL slots; and operating (1096) the first UE to communicate with the secondary node (SN1) using slots allocated to the first UE by the secondary node (SN1).

Method embodiment 1AA. The communications method of Method Embodiment 1A, wherein the UE indicates as a preferred UL or DL slot a slot that avoids simultaneous transmission to one node (MN or SN) while reception with another node (SN or MN) is to be performed by the UE.

Method Embodiment 1A. The method of Method Embodiment 1, wherein UE slot preference information is communicated to the secondary node via one or more UE Assistance Information Dual Connectivity (DC) Information Elements (IEs) including: i) a preferred downlink slots information element; or ii) a preferred uplink slots information element.

Method Embodiment 1B. The method of Method Embodiment 1A, wherein the preferred downlink slots information element includes a bit-indication of position of slots, where value of 1 in bit-position j indicates that slot j is preferred by the first UE (to be used for UE-specific PDCCH, PDSCH), and the value of 0 indicates dispreference.

Method Embodiment 1B1 The method of Method Embodiment 1B, wherein the value of the preferred downlink slots information element is an integer value represented by a max number of slots bits.

Method Embodiment 1C. The method of Method Embodiment 1A, wherein the preferred uplink slots information element includes a bit-indication of position of slots, where value of 1 in bit-position j indicates that slot j is preferred by the first UE (to be used for UE-specific PUSCH), and the value of 0 indicates dispreference.

Method Embodiment 1C1 The method of Method Embodiment 1C, wherein the value of the preferred uplink slots information element is an integer value represented by a max number of slots bits.

Method Embodiment 2. The communications method of Method Embodiment 1, further comprising: identifying (1084*a*) secondary node (SN1) UL slots which correspond in time (e.g., occur at the same time or overlap in time) to MN UL slots.

Method Embodiment 3. The method of Method Embodiment 2, further comprising:

selecting (1085*a*) from identified secondary node (SN1) UL slots which correspond in time to MN UL slots, at least some secondary node UL slots as preferred SN1 UL slots.

Method Embodiment 4. The method of Method Embodiment 3, wherein sending (1086) UE slot preference information to the secondary node (SN1) includes: indicating (1086*a*) to the secondary node slots selected by the first UE as first UE preferred secondary node UL slots.

Method Embodiment 5. The communications method of Method Embodiment 3, further comprising: identifying (1084*b*) secondary node (SN1) DL slots which correspond in time (e.g., occur at the same time or overlap in time) to MN DL slots.

Method Embodiment 6. The method of Method Embodiment 2, further comprising: selecting (1085*b*) from identified secondary node (SN1) DL slots which correspond in time to MN DL slots, at least some secondary node (SN1) DL slots as preferred secondary node (SN1) DL slots.

Method Embodiment 7. The method of Method Embodiment 6, wherein sending (1086) UE slot preference information to the secondary node (SN1) includes: indicating (1086*b*) to the secondary node (SN1) slots selected by the first UE as first UE preferred secondary node DL slots.

First Numbered List of Exemplary Apparatus Embodiments

Apparatus Embodiment 1. A user equipment (UE) (e.g., UE 508 or 1100), the UE comprising: a first SIM (1109); a second SIM (1111); a first wireless interface (1130) (including a first wireless receiver 1134 and a first wireless transmitter 1140); a second wireless interface (1132) (including a second wireless receiver 1146 and a second wireless transmitter 1152); and a processor (1102) configured to: operate the UE to receive (1054) at a first user equipment (UE) (e.g. UE 508) (via first wireless receiver 1134 of the first wireless interface 1130) Time Division Duplexing (TDD) information (e.g. configuration information) from a master node (MN) (e.g., gNB1 502); operate the UE to receive (1080) at the first UE (via second wireless receiver 1146 of the second wireless interface) TDD information from a secondary node (e.g., SN1, which is gNB2 504); operate the UE to send (1086) (via second wireless transmitter 1152 of the second wireless interface 1132) UE slot preference information to the secondary node (SN1) communicating secondary node slots preferred by the first UE, said UE slot preference information indicating: i) first UE preferred secondary node downlink (DL) slots, ii) UE preferred secondary node uplink (UL) slots or iii) both UE preferred secondary node downlink slots and UE preferred secondary node UL slots; and operate (1096) the first UE to communicate (receive wireless signals via second wireless receiver 1146 and send second wireless via second wireless transmitter 1152) with the secondary node (SN1) using slots allocated to the first UE by the secondary node (SN1).

Apparatus Embodiment 1A. The UE (508) of Apparatus Embodiment 1, wherein UE slot preference information is communicated to the secondary node via one or more UE Assistance Information Dual Connectivity (DC) Information Elements (IEs) including: i) a preferred downlink slots information element; or ii) a preferred uplink slots information element.

Apparatus Embodiment 1B. The UE (508) of Apparatus Embodiment 1A, wherein the preferred downlink slots information element includes a bit-indication of position of slots, where value of 1 in bit-position j indicates that slot j is preferred by the first UE (to be used for UE-specific PDCCH, PDSCH), and the value of 0 indicates dispreference.

Apparatus Embodiment 1B1 The UE (508) of Apparatus Embodiment 1B, wherein the value of the preferred downlink slots information element is an integer value represented by a max number of slots bits.

Apparatus Embodiment 1C. The UE (508) of Apparatus Embodiment 1A, wherein the preferred uplink slots information element includes a bit-indication of position of slots, where value of 1 in bit-position j indicates that slot j is preferred by the first UE (to be used for UE-specific PUSCH), and the value of 0 indicates dispreference.

Apparatus Embodiment 1C1 The UE (508) of Apparatus Embodiment 1C, wherein the value preferred uplink slots information element is an integer value represented by a max number of slots bits.

Apparatus Embodiment 2. The UE (508) of Apparatus Embodiment 1, wherein said processor (1102) is further configured to: identify (1084a) secondary node (SN1) UL slots which correspond in time (e.g., occur at the same time or overlap in time) to MN UL slots.

Apparatus Embodiment 3. The UE (508) of Apparatus Embodiment 2, wherein said processor (1102) is further configured to: select (1085a) from identified secondary node (SN1) UL slots which correspond in time to MN UL slots, at least some secondary node UL slots as preferred SN1 UL slots.

Apparatus Embodiment 4. The UE (508) of Apparatus Embodiment 3, wherein said processor (1102) is further configured to: send (1086) (via second wireless transmitter 1152) UE slot preference information to the secondary node (SN1), said UE slot preference information indicating (1086a) to the secondary node slots selected by the first UE as first UE preferred secondary node UL slots, as part of being configured to send (1086) UE slot preference information to the secondary node (SN1).

Apparatus Embodiment 5. The UE (508) of Apparatus Embodiment 3, wherein said processor (1102) is further configured to: identify (1084b) secondary node (SN1) DL slots which correspond in time (e.g., occur at the same time or overlap in time) to MN DL slots.

Apparatus Embodiment 6. The UE (508) of Apparatus Embodiment 2, wherein said processor (1102) is further configured to: select (1085b) from identified secondary node (SN1) DL slots which correspond in time to MN DL slots, at least some secondary node (SN1) DL slots as preferred secondary node (SN1) DL slots.

Apparatus Embodiment 7. The UE (508) of Apparatus Embodiment 6, said processor (1102) is configured to indicate (1086b) to the secondary node (SN1) slots selected by the first UE as first UE preferred secondary node DL slots, as part of being configured to operate the UE to send (1086) UE slot preference information to the secondary node (SN1).

Third Numbered List of Exemplary Non-Transitory Computer Readable Medium Embodiments Non-transitory Computer Readable Medium Embodiment 1. A non-transitory computer readable medium (1112) including machine executable instructions which when executed by a processor (1102) of a first user equipment (UE) (508 or 1100) cause the first UE (508 or 1100) to perform the steps of: receiving (1054) at a first user equipment (UE) (e.g. UE 508) Time Division Duplexing (TDD)

information (e.g., TDD configuration information) from a master node (MN) (e.g., gNB1 502); receiving (1080) at the first UE TDD information from a secondary node (e.g., SN1, which is gNB2 504); sending (1086) UE slot preference information to the secondary node (SN1) communicating secondary node slots preferred by the first UE, said UE slot preference information indicating: i) first UE preferred secondary node downlink (DL) slots, ii) UE preferred secondary node uplink (UL) slots or iii) both UE preferred secondary node downlink slots and UE preferred secondary node UL slots; and operating (1096) the first UE to communicate with the secondary node (SN1) using slots allocated to the first UE by the secondary node (SN1).

Fourth Numbered List of Exemplary Method Embodiments:

Method Embodiment 1. A method of operating a secondary node, the method comprising: receiving (1088), from a first UE, a UE assistance information message, said UE assistance information message including first UE preferred slot information indicating: i) one or more UL slots (e.g., multiple UL slots which would be preferable from the perspective of the first UE) at the secondary node, ii) one or more DL slots (e.g., multiple downlink slots which we be preferable from the perspective of the first UE) at the secondary node or iii) one or more UL slots at the secondary node and one or more DL slots at the secondary node; identifying (1091) UL and DL slots at the secondary node which are available to be allocated for communications with the first UE; and selecting (1092), from the identified UL and DL slots, based on the first UE preferred slot information UL and DL slots to be used by the secondary node for communication with the first UE.

Method Embodiment 2. The method of Method Embodiment 1, wherein the secondary node is a gNB; and wherein the first UE has a connection with a master node which is another gNB.

Method Embodiment 3. The method of Method Embodiment 1, wherein selecting (1092) from the identified UL and DL slots includes selecting at least some of slots indicated by the first UE preferred slot information to be preferred slots.

Method Embodiment 4. The method of Method Embodiment 3, further comprising: implementing (1093) a TDD timing structure for the first UE, said TDD timing structure including UL and DL slots which were selected for communication with the first UE.

Method Embodiment 4A The method of Method Embodiment 1, wherein preferred UL slots in the secondary node TDD timing structure correspond to time intervals of a master node TDD timing structure which are for UL communications; and wherein preferred DL slots in the secondary node TDD timing structure correspond to time intervals of the master node TDD timing structure which are for DL communications.

Method Embodiment 5. The method of Method Embodiment 1, wherein the first UE preferred slot information included in the UE assistance information message includes: a first integer value (e.g., the value for preferredDownlinkSlots IE) indicating which slots in the secondary node TDD timing structure are first UE preferred downlink slots; and a second integer value (e.g., the value for preferredUplinkSlots IE) indicating which slots in the secondary node TDD timing structure are first UE preferred uplink slots.

Method Embodiment 5A. The method of Method Embodiment 5, wherein said first integer value is a value represented by a maxNrofSlots bits; wherein said second integer value is a value represented by a maxNrofSlots bits;

and wherein said maxNrofSlots is the number of slots in the secondary node TDD timing structure.

Method Embodiment 5B. The method of Method Embodiment 5A, wherein when said first integer value is 0, there are no first UE preferred downlink slots; wherein when each of the maxNrofSlots bits representing the first value is 1, each of the slots in the second node TDD timing structure is a preferred downlink slot; wherein when said second integer value is 0, there are no first UE preferred uplink slots; and wherein when each of the maxNrofSlots bits representing the second value is 1, each of the second node TDD timing structure slots is a preferred uplink slot.

Method Embodiment 6. The method of Method Embodiment 5, wherein the first integer value (e.g., the value for preferredDownlinkSlots IE) included in the first UE preferred slot information included in the UE assistance information message indicates positions of preferred downlink slots in a timing structure (secondary node TDD timing structure).

Method Embodiment 7. The method of Method Embodiment 6, wherein the first integer value maps to a set of binary values (each binary value corresponding to a different slot in a sequence of slots in the secondary node TDD timing structure), each binary value in the set of binary values being used to indicate whether a corresponding slot in the sequence of slots is a preferred DL slot (e.g., binary value=1) or is not a preferred DL slot (i.e. dis-preferred slot) (e.g. binary value=0).

Method Embodiment 8. The method of Method Embodiment 5, wherein the second integer value (e.g., the value for preferredUplinkSlots IE) included in the first UE preferred slot information included in the UE assistance information message indicates positions of preferred uplink slots in a timing structure (secondary node TDD timing structure).

Method Embodiment 9. The method of Method Embodiment 8, wherein the second integer value maps to a set of binary values (each binary value corresponding to a different slot in a sequence of slots in the secondary node TDD timing structure), each binary value in the set of binary values being used to indicate whether a corresponding slot in the sequence of slots is a preferred UL slot (e.g., binary value=1) or is not a preferred UL slot (i.e. dis-preferred slot) (e.g. binary value=0).

Second Numbered List of Exemplary Apparatus Embodiments

Apparatus Embodiment 1. A secondary node (e.g., SN1 (gNB2) 504 or SN (gNB2) 1300) comprising: a processor (1302) configured to: operate the secondary node to receive (1088) (via wireless receiver 1330), from a first UE (508), a UE assistance information message, said UE assistance information message including first UE preferred slot information indicating: i) one or more UL slots (e.g., multiple UL slots which would be preferable from the perspective of the first UE) at the secondary node, ii) one or more DL slots (e.g., multiple downlink slots which we be preferable from the perspective of the first UE) at the secondary node or iii) one or more UL slots at the secondary node and one or more DL slots at the secondary node; identify (1091) UL and DL slots at the secondary node which are available to be allocated for communications with the first UE; and select (1092), from the identified UL and DL slots, based on the first UE preferred slot information UL and DL slots to be used by the secondary node for communication with the first UE.

Apparatus Embodiment 2. The secondary node (504 or 1300) of Apparatus Embodiment 1, wherein the secondary node is a gNB; and wherein the first UE has a connection with a master node (502) which is another gNB.

Apparatus Embodiment 3. The secondary node (504 or 1300) of Apparatus Embodiment 1, wherein said processor (1302) is configured to: select at least some of slots indicated by the first UE preferred slot information to be preferred slots, as part of being configured to select (1092) from the identified UL and DL slots, based on the UE preferred slot information, UL and DL slots to be used for communications with the first UE.

Apparatus Embodiment 4. The secondary node (504 or 1300) of Apparatus Embodiment 3, wherein said processor (1302) is further configured to: implement (1093) a TDD timing structure for the first UE, said TDD timing structure including UL and DL slots which were selected for communication with the first UE. (In some embodiments, implementing a TDD timing structure for the first UE includes refraining from using slots in a secondary node TDD timing structure which have not been selected for communications with the first UE, when communicating with the first UE.)

Apparatus Embodiment 4A The secondary node (504 or 1300) of Apparatus Embodiment 1, wherein preferred UL slots in the secondary node TDD timing structure correspond to time intervals of a master node TDD timing structure which are for UL communications; and wherein preferred DL slots in the secondary node TDD timing structure correspond to time intervals of the master node TDD timing structure which are for DL communications.

Apparatus Embodiment 5. The secondary node (504 or 1300) of Apparatus Embodiment 1, wherein the first UE preferred slot information included in the UE assistance information message includes: a first integer value (e.g., the value for preferredDownlinkSlots IE) indicating which slots in the secondary node TDD timing structure are first UE preferred downlink slots; and a second integer value (e.g., the value for preferredUplinkSlots IE) indicating which slots in the secondary node TDD timing structure are first UE preferred uplink slots.

Apparatus Embodiment 5A. The secondary node (504 or 1300) of Apparatus Embodiment 5, wherein said first integer value is a value represented by a maxNrofSlots bits; wherein said second integer value is a value represented by a maxNrofSlots bits; and wherein said maxNrofSlots is the number of slots in the secondary node TDD timing structure.

Apparatus Embodiment 5B. The secondary node (504 or 1300) of Apparatus Embodiment 5A, wherein when said first integer value is 0, there are no first UE preferred downlink slots; wherein when each of the maxNrofSlots bits representing the first value is 1, each of the slots in the second node TDD timing structure is a preferred downlink slot; wherein when said second integer value is 0, there are no first UE preferred uplink slots; and wherein when each of the maxNrofSlots bits representing the second value is 1, each of the second node TDD timing structure slots is a preferred uplink slot.

Apparatus Embodiment 6. The secondary node (504 or 1300) of Apparatus Embodiment 5, wherein the first integer value (e.g., the value for preferredDownlinkSlots IE) included in the first UE preferred slot information included in the UE assistance information message indicates positions of preferred downlink slots in a timing structure (secondary node TDD timing structure).

Apparatus Embodiment 7. The secondary node (504 or 1300) of Apparatus Embodiment 6, wherein the first integer value maps to a set of binary values (each binary value corresponding to a different slot in a sequence of slots in the secondary node TDD timing structure), each binary value in the set of binary values being used to indicate whether a corresponding slot in the sequence of slots is a preferred DL slot (e.g., binary value=1) or is not a preferred DL slot (i.e. dis-preferred slot) (e.g. binary value=0).

Apparatus Embodiment 8. The secondary node (504 or 1300) of Apparatus Embodiment 5, wherein the second integer value (e.g., the value for preferredUplinkSlots IE) included in the first UE preferred slot information included in the UE assistance information message indicates positions of preferred uplink slots in a timing structure (secondary node TDD timing structure).

Apparatus Embodiment 9. The secondary node (504 or 1300) of Apparatus Embodiment 8, wherein the second integer value maps to a set of binary values (each binary value corresponding to a different slot in a sequence of slots in the secondary node TDD timing structure), each binary value in the set of binary values being used to indicate whether a corresponding slot in the sequence of slots is a preferred UL slot (e.g., binary value=1) or is not a preferred UL slot (i.e. dis-preferred slot) (e.g. binary value=0).

Fourth Numbered List of Exemplary
Non-Transitory Computer Readable Medium
Embodiments Non-Transitory Computer Readable Medium Embodiment 1. A non-transitory computer readable medium (1112) including machine executable instructions which when executed by a processor (1102) of a secondary node (UE) (504 or 1300) cause the secondary node (504 or 1300) to perform the steps of: receiving (1088), from a first UE, a UE assistance information message, said UE assistance information message including first UE preferred slot information indicating: i) one or more UL slots (e.g., multiple UL slots which would be preferable from the perspective of the first UE) at the secondary node, ii) one or more DL slots (e.g., multiple downlink slots which we be preferable from the perspective of the first UE) at the secondary node or iii) one or more UL slots at the secondary node and one or more DL slots at the secondary node; identifying (1091) UL and DL slots at the secondary node which are available to be allocated for communications with the first UE; and selecting (1092), from the identified UL and DL slots, based on the first UE preferred slot information UL and DL slots to be used by the secondary node for communication with the first UE.

Various embodiments are directed to apparatus, e.g., master nodes, e.g., master node base stations, secondary nodes, e.g. secondary node base stations, user equipments (UEs), e.g. UEs supporting dual connectivity, base stations, e.g. sector base stations, such as gNB, ng-eNBs, eNBs, etc. supporting beamforming, UEs, base stations supporting massive MIMO such as CBSDs supporting massive MIMO, network management nodes, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, etc., other network communications devices such as routers, switches, etc., mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), an AFC system, an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices. Various embodiments are also directed to methods, e.g., method of controlling and/or operating e.g., a master node, e.g., a master node base station, a secondary node, e.g. secondary node base station, a user equipment (UE), e.g. a UE supporting dual connectivity, a base station, e.g. a sector base station, such as gNB, ng-eNB, eNB, etc., supporting beamforming, UEs, a base station supporting massive MIMO such as a CBSD supporting massive MIMO, a network management node, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, network communications devices such as routers, switches, etc., user devices, base stations, e.g., eNB and CBSDs, gateways, servers (HSS server), MMEs, an AFC system, cable networks, cloud networks, nodes, servers, cloud service servers, customer premises equipment devices, controllers, network monitoring nodes and/or servers and/or cable or network equipment devices. Various embodiments are directed to communications networks which are partners, e.g., a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., e.g., a master node, e.g., a master node base station, a secondary node, e.g. a secondary node base station, a user equipment (UE), e.g. a UE supporting dual connectivity, a base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, base stations such as NRU gNB base station, etc., a user device such as a station (STA), e.g., WiFi STA, a user equipment (UE) device, LTE LAA device, etc., an RLAN device, other network communications devices a network communications device such as router, switch, etc., a MVNO base station such as a CBRS base station, e.g., a CBSD, a device such as a cellular base station e.g., an eNB, a MNO HSS server, a MVNO HSS server, a UE device, a relay device, e.g. a MME, a AFC system, etc., said device including a processor configured to implement one, multiple or all of the steps of one or more methods of the invention.

In some embodiments, the processor or processors, e.g., CPUs, of one or more devices, e.g., e.g., a master node, e.g., a master node base station, a secondary node, e.g. a secondary node base station, a user equipment (UEs), e.g. a UE supporting dual connectivity, a base station, e.g. a sector base station, such as gNB, ng-eNB, eNB, etc., supporting beamforming, a UE, a base station supporting massive MIMO such as a CBSD supporting massive MIMO, a network management device, communications nodes such as e.g., access points (APs), e.g., WiFi APs, base stations such as NRU gNB base stations, etc., user devices such as stations (STAs), e.g., WiFi STAs, user equipment (UE) devices, LTE LAA devices, etc., various RLAN devices, network communications devices such as routers, switches, etc., a MVNO base station such as a CBRS base station, e.g. a CBSD, an device such as a cellular base station e.g., an eNB, a MNO HSS server, a MVNO HSS device server, a UE device, a relay device, e.g. a MME, a AFC system, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration.

Accordingly, some but not all embodiments are directed to a device, e.g., a master node, e.g., a master node base station, a secondary node, e.g. a secondary node base station, a user equipment (UE), e.g. a UE supporting dual connectivity, base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, a base station such as NRU gNB base station, etc., a user device such as station (STA), e.g., WiFi STA, a user equipment (UE) device, an LTE LAA device, etc., a RLAN device, a network communications device such as router, switch, etc., administrator device, security device, a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., a communications node such as a master node, e.g., a master node base station, a secondary node, e.g. a secondary node base station, a user equipment (UE), e.g. a UE supporting dual connectivity, a base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, a base station such as NRU gNB base station, etc., a user device such as a station (STA), e.g., WiFi STA, a user equipment (UE) device, a LTE LAA device, a RLAN device, a router, switch, etc., administrator device, security device, a AFC system, a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a master node, e.g., a master node base station, a secondary node, e.g. a secondary node base station, a user equipment (UE), e.g. a UEs supporting dual connectivity, a base station, e.g., a sector base station, such as gNB, ng-eNB, eNB, etc., supporting beamforming, a UE, a base station supporting massive MIMO such as a CBSD supporting massive MIMO, a network management node or device, a communications device such as a communications nodes such as e.g., an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, MNVO base station, e.g., a CBSD, an MNO cellular base station, e.g., an eNB or a gNB, a UE device or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
receiving, at a first node, first user equipment (UE) capability information from a first UE, said first UE capability information communicating first frequency information indicating a first minimum frequency separation to be used to limit possible in-device-coexistence (IDC) interference at the first UE;
sending a message from the first node to a second node, said message including second frequency information indicating a second minimum frequency separation to be maintained when the second node allocates one or more frequencies to be used by the first UE, said second minimum frequency separation being greater than or equal to the first minimum frequency separation; and
operating the first node to communicate with the first UE over a first channel while the second node communicates with the first UE over a second channel which is separated from said first channel by at least said second minimum frequency separation.

2. The method of claim 1,
wherein said first node is a first base station; and
wherein said second node is a second base station.

3. The communications method of claim 1, wherein said message includes a baseline reference frequency with which said second minimum frequency separation is to be maintained.

4. The method of claim 3, wherein said baseline reference frequency is a maximum frequency being used by the first node for communication with the first UE.

5. The method of claim 4, further comprising:
selecting, at the second node, based on the second minimum frequency separation and the baseline reference frequency, said second channel to be used to communicate with the first UE.

6. The method of claim 5, further comprising:
operating the second node to establish a cell which uses the selected second channel to support communications with the first UE; and
communicating between the second node and the first UE using the selected second channel; and
wherein the selected second channel is in a 6 GHz unlicensed band.

7. The method of claim 1, wherein said information indicating a second minimum frequency separation is communicated in a minimum frequency separation information element.

8. The method of claim 7, wherein said minimum frequency separation information element indicates a minimum frequency separation that is required between a channel of a first unlicensed frequency band being used for communications between the first node and the first UE and a channel of a second unlicensed frequency band to be used by the second node for communications between the second node and the first UE.

9. The method of claim 1, further comprising:
operating the first node to transmits signals to the first UE via the first channel of the first frequency band of unlicensed spectrum while the second node simultaneously receives signals from the first UE via the second channel of the second frequency band of unlicensed spectrum, said concurrent transmission and reception being performed without subjecting the first UE to unacceptable IDC interference due to the second minimum frequency separation.

10. The method of claim 9, further comprising:
operating the first node to receive signals from the first UE via the first channel of the first frequency band of unlicensed spectrum while the second node simultaneously transmits signals to the first UE via the second channel of the second frequency band of unlicensed spectrum, said concurrent reception and transmission being performed without experiencing unacceptable IDC interference due to the second minimum frequency separation.

11. A communications system comprising:
a first node including a memory and a first processor coupled to said memory, the first processor being configured to operate the first node to:
receive, at the first node, first user equipment (UE) capability information from a first UE, said first UE capability information communicating first frequency information indicating a first minimum frequency separation to be used to limit possible in-device-coexistence (IDC) interference at the first UE;
send a message from the first node to a second node, said message including second frequency information indicating a second minimum frequency separation to be maintained when the second node allocates one or more frequencies to be used by the first UE, said second minimum frequency separation being greater than or equal to the first minimum frequency separation; and
operate the first node to communicate with the first UE over a first channel while the second node communicates with the first UE over a second channel which is separated from said first channel by at least said second minimum frequency separation.

12. The communications system of claim 11,
wherein said first node is a first base station; and
wherein said second node is a second base station.

13. The communications system of claim 11, wherein said message further includes a baseline reference frequency with which said second minimum frequency separation is to be maintained.

14. The communications system of claim 13, wherein said baseline reference frequency is a maximum frequency being used by the first node for communication with the first UE.

15. The communications system of claim 14, further comprising said second node including a second processor configured to:
select, at the second node, based on the second minimum frequency separation and the baseline reference frequency, said second channel to be used to communicate with the first UE.

16. The communications system of claim 14, wherein said second processor is further configured to:
operate the second node to establish a cell which uses the selected second channel to support communications with the first UE; and operate the second node to communicate between the second node and the first UE using the selected second channel; and wherein the selected second channel is in a 6 GHz unlicensed band.

17. The communications system of claim 11, wherein said information indicating a second minimum frequency separation is communicated in a minimum frequency separation information element.

18. The communications system of claim 11, wherein said first processor is further configured to operate the first node to transmit signals to the first UE via the first channel of the first frequency band of unlicensed spectrum while the second node simultaneously receives signals from the first UE via the second channel of the second frequency band of unlicensed spectrum, said concurrent transmission and reception being performed without subjecting the first UE to unacceptable IDC interference due to the implemented second minimum frequency separation.

19. The communications system of claim 18, wherein said first processor is further configured to operate the first node to receive signals from the first UE via the first channel of the first frequency band of unlicensed spectrum while the second processor is further configured to operate the second node to simultaneously transmit signals to the first UE via the second channel of the second frequency band of unlicensed spectrum, said concurrent reception and transmission being performed without experiencing unacceptable IDC interference due to the implemented second minimum frequency separation.

20. A non-transitory computer readable medium including machine executable instructions which when executed by a processor of a first node causes the first node to perform the steps of:

receiving, at the first node, first user equipment (UE) capability information from a first UE, said first UE capability information communicating first frequency information indicating a first minimum frequency separation to be used to limit possible in-device-coexistence (IDC) interference at the first UE;

sending a message from the first node to a second node, said message including second frequency information indicating a second minimum frequency separation to be maintained when the second node allocates one or more frequencies to be used by the first UE, said second minimum frequency separation being greater than or equal to the first minimum frequency separation; and operating the first node to communicate with the first UE over a first channel while the second node communicates with the first UE over a second channel which is separated from said first channel by at least said second minimum frequency separation.

\* \* \* \* \*